(12) United States Patent
Owen et al.

(10) Patent No.: US 12,511,009 B2
(45) Date of Patent: Dec. 30, 2025

(54) REPRESENTATIONS OF MESSAGES IN A THREE-DIMENSIONAL ENVIRONMENT

(71) Applicant: Apple Inc., Cupertino, CA (US)

(72) Inventors: James J. Owen, San Francisco, CA (US); Christine E. Welch, Sunnyvale, CA (US); Jesse Chand, San Francisco, CA (US); Lucie Belanger, Beloeil (CA); Wendy F. Eduarte, Detroit, MI (US); Dorian D. Dargan, Danville, CA (US); William A. Sorrentino, III, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/305,201

(22) Filed: Apr. 21, 2023

(65) Prior Publication Data

US 2023/0350539 A1 Nov. 2, 2023

Related U.S. Application Data

(60) Provisional application No. 63/363,378, filed on Apr. 21, 2022.

(51) Int. Cl.
*G06F 3/04815* (2022.01)
*G06F 3/0485* (2022.01)
(Continued)

(52) U.S. Cl.
CPC ........ *G06F 3/04815* (2013.01); *G06F 3/0485* (2013.01); *G06T 15/506* (2013.01); *H04N 13/111* (2018.05)

(58) Field of Classification Search
CPC ............... G06F 21/6245; G06F 11/261; G06F 16/90324; G06F 16/954; G06F 21/36;
(Continued)

(56) References Cited

U.S. PATENT DOCUMENTS

| 1,173,824 A | 2/1916 | Mckee |
| 5,515,488 A | 5/1996 | Hoppe et al. |

(Continued)

FOREIGN PATENT DOCUMENTS

| CA | 3033344 A1 | 2/2018 |
| CN | 104714771 A | 6/2015 |

(Continued)

OTHER PUBLICATIONS

AquaSnap Window Manager: dock, snap, tile, organize [online], Nurgo Software, Available online at: <https://www.nurgo-software.com/products/aquasnap>, [retrieved on Jun. 27, 2023], 5 pages.

(Continued)

*Primary Examiner* — Rayeez R Chowdhury

(74) *Attorney, Agent, or Firm* — Kubota & Basol LLP

(57) ABSTRACT

In some embodiments, a computer system modifies the visual appearances of user interface objects based on their spatial arrangement relative to the viewpoint of the user in a three-dimensional environment. In some embodiments, a computer system displays, via a display generation component, a representation of a message in a three-environment at a first distance from a viewpoint of the user, and then changes the distance of the representation of the message to be a second distance from the viewpoint of the user. In some embodiments, a computer system is configured to transition virtual objects from a three-dimensional appearance to a two-dimensional appearance and/or from a two-dimensional appearance to a three-dimensional appearance.

58 Claims, 46 Drawing Sheets

(51) Int. Cl.
*G06T 15/50* (2011.01)
*H04N 13/111* (2018.01)

(58) Field of Classification Search
CPC .. G06F 2221/2133; G06F 3/011; G06F 3/017;
G06F 3/04812; G06F 3/04815; G06F
3/0485; G06F 30/30; G06F 30/31; G06F
30/33; G06F 30/3308; G06F 16/5846;
G06F 16/5866; G06F 21/32; G06F
3/0484; G06F 16/951; G06F 16/313;
G06F 16/374; G06F 16/7328; G06F
16/9538; G06F 16/9577
See application file for complete search history.

(56) References Cited

U.S. PATENT DOCUMENTS

| | | |
|---|---|---|
| 5,524,195 A | 6/1996 | Clanton et al. |
| 5,610,828 A | 3/1997 | Kodosky et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,108,004 A | 8/2000 | Medl |
| 6,112,015 A | 8/2000 | Planas et al. |
| 6,154,559 A | 11/2000 | Beardsley |
| 6,323,846 B1 | 11/2001 | Westerman et al. |
| 6,456,296 B1 | 9/2002 | Cataudella et al. |
| 6,570,557 B1 | 5/2003 | Westerman et al. |
| 6,584,465 B1 | 6/2003 | Zhu et al. |
| 6,677,932 B1 | 1/2004 | Westerman |
| 6,756,997 B1 | 6/2004 | Ward et al. |
| 7,035,903 B1 | 4/2006 | Baldonado |
| 7,137,074 B1 | 11/2006 | Newton et al. |
| 7,230,629 B2 | 6/2007 | Reynolds et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 8,793,620 B2 | 7/2014 | Stafford |
| 8,803,873 B2 | 8/2014 | Yoo et al. |
| 8,805,690 B1 | 8/2014 | Lebeau et al. |
| 8,866,880 B2 | 10/2014 | Tan et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,185,062 B1 | 11/2015 | Yang et al. |
| 9,201,500 B2 | 12/2015 | Srinivasan et al. |
| 9,256,785 B2 | 2/2016 | Qvarfordt |
| 9,348,458 B2 | 5/2016 | Hotelling et al. |
| 9,400,559 B2 | 7/2016 | Latta et al. |
| 9,448,635 B2 | 9/2016 | Macdougall et al. |
| 9,465,479 B2 | 10/2016 | Cho et al. |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,681,112 B2 | 6/2017 | Son |
| 9,684,372 B2 | 6/2017 | Xun et al. |
| 9,734,402 B2 | 8/2017 | Jang et al. |
| 9,778,814 B2 | 10/2017 | Ambrus et al. |
| 9,851,866 B2 | 12/2017 | Goossens et al. |
| 9,886,087 B1 | 2/2018 | Wald et al. |
| 9,933,833 B2 | 4/2018 | Tu et al. |
| 9,933,937 B2 | 4/2018 | Lemay et al. |
| 9,934,614 B2 | 4/2018 | Ramsby et al. |
| 10,049,460 B2 | 8/2018 | Romano et al. |
| 10,203,764 B2 | 2/2019 | Katz et al. |
| 10,307,671 B2 | 6/2019 | Barney et al. |
| 10,353,532 B1 | 7/2019 | Holz et al. |
| 10,394,320 B2 | 8/2019 | George-svahn et al. |
| 10,431,216 B1 | 10/2019 | Lemon et al. |
| 10,530,731 B1 | 1/2020 | Wu et al. |
| 10,534,439 B2 | 1/2020 | Raffa et al. |
| 10,664,048 B2 | 5/2020 | Cieplinski et al. |
| 10,664,050 B2 | 5/2020 | Alcaide et al. |
| 10,699,488 B1 | 6/2020 | Terrano |
| 10,732,721 B1 | 8/2020 | Clements |
| 10,754,434 B2 | 8/2020 | Hall et al. |
| 10,768,693 B2 | 9/2020 | Powderly et al. |
| 10,861,242 B2 | 12/2020 | Lacey et al. |
| 10,890,967 B2 | 1/2021 | Stellmach et al. |
| 10,956,724 B1 | 3/2021 | Terrano |
| 10,983,663 B2 | 4/2021 | Iglesias |
| 11,055,920 B1 | 7/2021 | Bramwell et al. |
| 11,079,995 B1 | 8/2021 | Hulbert et al. |
| 11,082,463 B2 | 8/2021 | Felman |
| 11,112,875 B1 | 9/2021 | Zhou et al. |
| 11,199,898 B2 | 12/2021 | Blume et al. |
| 11,200,742 B1 | 12/2021 | Post et al. |
| 11,294,472 B2 | 4/2022 | Tang et al. |
| 11,294,475 B1 | 4/2022 | Pinchon et al. |
| 11,340,756 B2 | 5/2022 | Faulkner et al. |
| 11,348,300 B2 | 5/2022 | Zimmermann et al. |
| 11,461,973 B2 | 10/2022 | Pinchon |
| 11,496,571 B2 | 11/2022 | Berliner et al. |
| 11,573,363 B2 | 2/2023 | Zou et al. |
| 11,574,452 B2 | 2/2023 | Berliner et al. |
| 11,720,171 B2 | 8/2023 | Pastrana Vicente et al. |
| 11,726,577 B2 | 8/2023 | Katz |
| 11,733,824 B2 | 8/2023 | Iskandar et al. |
| 11,762,457 B1 | 9/2023 | Ikkai et al. |
| 11,765,114 B2 | 9/2023 | Jon et al. |
| 12,099,695 B1 | 9/2024 | Smith et al. |
| 12,113,948 B1 | 10/2024 | Smith et al. |
| 2001/0047250 A1 | 11/2001 | Schuller et al. |
| 2002/0015024 A1 | 2/2002 | Westerman et al. |
| 2002/0044152 A1 | 4/2002 | Abbott et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0243926 A1 | 12/2004 | Trenbeath et al. |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0190059 A1 | 9/2005 | Wehrenberg |
| 2005/0198143 A1 | 9/2005 | Moody et al. |
| 2006/0017692 A1 | 1/2006 | Wehrenberg et al. |
| 2006/0033724 A1 | 2/2006 | Chaudhri et al. |
| 2006/0080702 A1 | 4/2006 | Diez et al. |
| 2006/0197753 A1 | 9/2006 | Hotelling |
| 2006/0283214 A1 | 12/2006 | Donadon et al. |
| 2008/0211771 A1 | 9/2008 | Richardson |
| 2009/0064035 A1 | 3/2009 | Shibata et al. |
| 2009/0164219 A1 | 6/2009 | Yeung et al. |
| 2009/0233356 A1 | 9/2009 | Barnes et al. |
| 2010/0097375 A1 | 4/2010 | Tadaishi et al. |
| 2010/0150526 A1* | 6/2010 | Rose ............... G06T 13/00 345/473 |
| 2010/0188503 A1 | 7/2010 | Tsai et al. |
| 2011/0018895 A1 | 1/2011 | Buzyn et al. |
| 2011/0018896 A1 | 1/2011 | Buzyn et al. |
| 2011/0169927 A1 | 7/2011 | Mages et al. |
| 2011/0216060 A1 | 9/2011 | Weising et al. |
| 2011/0254865 A1 | 10/2011 | Yee et al. |
| 2011/0310001 A1 | 12/2011 | Madau et al. |

(56) References Cited

U.S. PATENT DOCUMENTS

| | | |
|---|---|---|
| 2012/0086624 A1 | 4/2012 | Thompson et al. |
| 2012/0113223 A1 | 5/2012 | Hilliges et al. |
| 2012/0151416 A1* | 6/2012 | Bell ................. G06F 3/0482 |
| | | 715/848 |
| 2012/0170840 A1 | 7/2012 | Caruso et al. |
| 2012/0218395 A1 | 8/2012 | Andersen et al. |
| 2012/0257035 A1 | 10/2012 | Larsen |
| 2013/0127850 A1 | 5/2013 | Bindon |
| 2013/0211843 A1 | 8/2013 | Clarkson |
| 2013/0229345 A1 | 9/2013 | Day et al. |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0326364 A1 | 12/2013 | Latta et al. |
| 2013/0342564 A1 | 12/2013 | Kinnebrew et al. |
| 2013/0342570 A1 | 12/2013 | Kinnebrew et al. |
| 2014/0002338 A1 | 1/2014 | Raffa et al. |
| 2014/0024324 A1 | 1/2014 | Mumick |
| 2014/0028548 A1 | 1/2014 | Bychkov et al. |
| 2014/0075361 A1 | 3/2014 | Reynolds et al. |
| 2014/0108942 A1 | 4/2014 | Freeman et al. |
| 2014/0125584 A1 | 5/2014 | Xun et al. |
| 2014/0198017 A1 | 7/2014 | Lamb et al. |
| 2014/0258942 A1 | 9/2014 | Kutliroff et al. |
| 2014/0282272 A1 | 9/2014 | Kies et al. |
| 2014/0320404 A1 | 10/2014 | Kasahara |
| 2014/0347391 A1 | 11/2014 | Keane et al. |
| 2015/0035822 A1 | 2/2015 | Arsan et al. |
| 2015/0035832 A1 | 2/2015 | Sugden et al. |
| 2015/0042679 A1 | 2/2015 | Järvenpää |
| 2015/0067580 A1 | 3/2015 | Um et al. |
| 2015/0123890 A1 | 5/2015 | Kapur et al. |
| 2015/0177937 A1 | 6/2015 | Poletto et al. |
| 2015/0187093 A1 | 7/2015 | Chu et al. |
| 2015/0205106 A1 | 7/2015 | Norden |
| 2015/0220152 A1 | 8/2015 | Tait et al. |
| 2015/0227285 A1* | 8/2015 | Lee .................. G06F 3/0488 |
| | | 715/765 |
| 2015/0242095 A1 | 8/2015 | Sonnenberg |
| 2015/0255067 A1 | 9/2015 | White et al. |
| 2015/0287403 A1 | 10/2015 | Holzer Zaslansky et al. |
| 2015/0317832 A1 | 11/2015 | Ebstyne et al. |
| 2015/0331576 A1 | 11/2015 | Piya et al. |
| 2015/0332091 A1 | 11/2015 | Kim et al. |
| 2015/0350141 A1 | 12/2015 | Yang et al. |
| 2015/0370323 A1 | 12/2015 | Cieplinski et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0026242 A1 | 1/2016 | Burns et al. |
| 2016/0026253 A1 | 1/2016 | Bradski et al. |
| 2016/0062636 A1 | 3/2016 | Jung et al. |
| 2016/0093108 A1 | 3/2016 | Mao et al. |
| 2016/0098094 A1 | 4/2016 | Minkkinen |
| 2016/0133052 A1 | 5/2016 | Choi et al. |
| 2016/0171304 A1 | 6/2016 | Golding et al. |
| 2016/0196692 A1 | 7/2016 | Kjallstrom et al. |
| 2016/0239165 A1 | 8/2016 | Chen et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0306434 A1 | 10/2016 | Ferrin |
| 2016/0313890 A1 | 10/2016 | Walline et al. |
| 2016/0350973 A1 | 12/2016 | Shapira et al. |
| 2016/0379409 A1 | 12/2016 | Gavriliuc et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0046872 A1* | 2/2017 | Geselowitz ........... G06T 15/205 |
| 2017/0060230 A1 | 3/2017 | Faaborg et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0153866 A1 | 6/2017 | Grinberg et al. |
| 2017/0206691 A1 | 7/2017 | Harrises et al. |
| 2017/0228130 A1 | 8/2017 | Palmaro |
| 2017/0285737 A1 | 10/2017 | Khalid et al. |
| 2017/0315715 A1 | 11/2017 | Fujita et al. |
| 2017/0344223 A1 | 11/2017 | Holzer et al. |
| 2017/0357390 A1 | 12/2017 | Alonso Ruiz et al. |
| 2017/0358141 A1 | 12/2017 | Stafford et al. |
| 2018/0045963 A1 | 2/2018 | Hoover et al. |
| 2018/0075658 A1 | 3/2018 | Lanier et al. |
| 2018/0081519 A1 | 3/2018 | Kim |
| 2018/0095634 A1 | 4/2018 | Alexander |
| 2018/0095635 A1 | 4/2018 | Valdivia et al. |
| 2018/0101223 A1 | 4/2018 | Ishihara et al. |
| 2018/0114364 A1 | 4/2018 | Mcphee et al. |
| 2018/0150997 A1 | 5/2018 | Austin |
| 2018/0158222 A1 | 6/2018 | Hayashi |
| 2018/0181199 A1 | 6/2018 | Harvey et al. |
| 2018/0188802 A1 | 7/2018 | Okumura |
| 2018/0210628 A1 | 7/2018 | Mcphee et al. |
| 2018/0239144 A1 | 8/2018 | Woods et al. |
| 2018/0288206 A1 | 10/2018 | Stimpson et al. |
| 2018/0300023 A1 | 10/2018 | Hein |
| 2018/0315248 A1 | 11/2018 | Bastov et al. |
| 2018/0322701 A1 | 11/2018 | Pahud et al. |
| 2018/0348861 A1 | 12/2018 | Uscinski et al. |
| 2019/0034076 A1 | 1/2019 | Vinayak et al. |
| 2019/0050062 A1 | 2/2019 | Chen et al. |
| 2019/0080572 A1 | 3/2019 | Kim et al. |
| 2019/0088149 A1 | 3/2019 | Fink et al. |
| 2019/0094979 A1 | 3/2019 | Hall et al. |
| 2019/0101991 A1 | 4/2019 | Brennan |
| 2019/0130633 A1 | 5/2019 | Haddad et al. |
| 2019/0130733 A1* | 5/2019 | Hodge ............... G06Q 10/0639 |
| 2019/0146128 A1 | 5/2019 | Cao et al. |
| 2019/0204906 A1 | 7/2019 | Ross et al. |
| 2019/0227763 A1 | 7/2019 | Kaufthal |
| 2019/0251884 A1 | 8/2019 | Burns et al. |
| 2019/0258365 A1 | 8/2019 | Zurmoehle et al. |
| 2019/0310757 A1 | 10/2019 | Lee et al. |
| 2019/0324529 A1 | 10/2019 | Stellmach et al. |
| 2019/0339770 A1 | 11/2019 | Kurlethimar et al. |
| 2019/0346678 A1 | 11/2019 | Nocham |
| 2019/0362557 A1 | 11/2019 | Lacey et al. |
| 2019/0370492 A1 | 12/2019 | Falchuk et al. |
| 2019/0371072 A1 | 12/2019 | Lindberg et al. |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2020/0004401 A1 | 1/2020 | Hwang et al. |
| 2020/0043243 A1 | 2/2020 | Bhushan et al. |
| 2020/0082602 A1 | 3/2020 | Jones |
| 2020/0089314 A1 | 3/2020 | Poupyrev et al. |
| 2020/0098140 A1 | 3/2020 | Jagnow et al. |
| 2020/0098173 A1 | 3/2020 | Mccall |
| 2020/0117213 A1 | 4/2020 | Tian et al. |
| 2020/0128232 A1 | 4/2020 | Hwang et al. |
| 2020/0159017 A1 | 5/2020 | Lin et al. |
| 2020/0225747 A1 | 7/2020 | Bar-Zeev et al. |
| 2020/0225830 A1 | 7/2020 | Tang et al. |
| 2020/0226814 A1 | 7/2020 | Tang et al. |
| 2020/0356221 A1 | 11/2020 | Behzadi et al. |
| 2020/0357374 A1 | 11/2020 | Verweij et al. |
| 2020/0387228 A1 | 12/2020 | Ravasz et al. |
| 2021/0074062 A1 | 3/2021 | Madonna et al. |
| 2021/0090337 A1 | 3/2021 | Ravasz et al. |
| 2021/0096726 A1 | 4/2021 | Faulkner et al. |
| 2021/0125414 A1 | 4/2021 | Berkebile |
| 2021/0191600 A1 | 6/2021 | Lemay et al. |
| 2021/0295602 A1 | 9/2021 | Scapel et al. |
| 2021/0303074 A1 | 9/2021 | Vanblon et al. |
| 2021/0319617 A1 | 10/2021 | Ahn et al. |
| 2021/0327140 A1 | 10/2021 | Rothkopf et al. |
| 2021/0339134 A1 | 11/2021 | Knoppert |
| 2021/0350564 A1 | 11/2021 | Peuhkurinen et al. |
| 2021/0352172 A1 | 11/2021 | Kim et al. |
| 2021/0375022 A1 | 12/2021 | Lee et al. |
| 2021/0407506 A1 | 12/2021 | Drummond et al. |
| 2022/0011855 A1 | 1/2022 | Hazra et al. |

(56) References Cited

U.S. PATENT DOCUMENTS

| | | |
|---|---|---|
| 2022/0030197 A1 | 1/2022 | Ishimoto |
| 2022/0070241 A1 | 3/2022 | Yerli |
| 2022/0083197 A1 | 3/2022 | Rockel et al. |
| 2022/0092862 A1 | 3/2022 | Faulkner et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121344 A1 | 4/2022 | Pastrana Vicente et al. |
| 2022/0137705 A1 | 5/2022 | Hashimoto et al. |
| 2022/0155909 A1 | 5/2022 | Kawashima et al. |
| 2022/0157083 A1 | 5/2022 | Jandhyala et al. |
| 2022/0187907 A1 | 6/2022 | Lee et al. |
| 2022/0191570 A1 | 6/2022 | Reid et al. |
| 2022/0197403 A1* | 6/2022 | Hughes .................. G06F 3/011 |
| 2022/0229524 A1 | 7/2022 | Mckenzie et al. |
| 2022/0229534 A1 | 7/2022 | Terre et al. |
| 2022/0245888 A1 | 8/2022 | Singh et al. |
| 2022/0253149 A1 | 8/2022 | Berliner et al. |
| 2022/0255995 A1 | 8/2022 | Berliner et al. |
| 2022/0276720 A1 | 9/2022 | Yasui |
| 2022/0317776 A1 | 10/2022 | Sundstrom et al. |
| 2022/0326837 A1 | 10/2022 | Dessero et al. |
| 2022/0413691 A1 | 12/2022 | Becker et al. |
| 2023/0004216 A1 | 1/2023 | Rodgers et al. |
| 2023/0008537 A1 | 1/2023 | Henderson et al. |
| 2023/0021861 A1 | 1/2023 | Fujiwara et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0092282 A1 | 3/2023 | Boesel et al. |
| 2023/0093979 A1 | 3/2023 | Stauber et al. |
| 2023/0133579 A1 | 5/2023 | Chang et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168788 A1 | 6/2023 | Faulkner et al. |
| 2023/0185426 A1 | 6/2023 | Rockel et al. |
| 2023/0186577 A1 | 6/2023 | Rockel et al. |
| 2023/0206921 A1 | 6/2023 | Edelsburg et al. |
| 2023/0244857 A1 | 8/2023 | Weiss et al. |
| 2023/0273706 A1 | 8/2023 | Smith et al. |
| 2023/0274504 A1 | 8/2023 | Ren et al. |
| 2023/0308610 A1 | 9/2023 | Henderson et al. |
| 2023/0315385 A1 | 10/2023 | Akmal et al. |
| 2023/0316634 A1 | 10/2023 | Chiu et al. |
| 2023/0325004 A1 | 10/2023 | Burns et al. |
| 2023/0359199 A1 | 11/2023 | Adachi et al. |
| 2023/0384907 A1 | 11/2023 | Boesel et al. |
| 2023/0388357 A1 | 11/2023 | Faulkner et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0095984 A1 | 3/2024 | Ren et al. |
| 2024/0103613 A1 | 3/2024 | Chawda et al. |
| 2024/0103684 A1 | 3/2024 | Yu et al. |
| 2024/0103707 A1 | 3/2024 | Henderson et al. |
| 2024/0104836 A1 | 3/2024 | Dessero et al. |
| 2024/0104873 A1 | 3/2024 | Pastrana Vicente et al. |
| 2024/0104877 A1 | 3/2024 | Henderson et al. |
| 2024/0111479 A1 | 4/2024 | Paul |
| 2024/0119682 A1 | 4/2024 | Rudman et al. |
| 2024/0221291 A1 | 7/2024 | Henderson et al. |
| 2024/0291953 A1 | 8/2024 | Cerra et al. |
| 2024/0310971 A1 | 9/2024 | Kawashima et al. |

FOREIGN PATENT DOCUMENTS

| | | | |
|---|---|---|---|
| CN | 105264461 | A | 1/2016 |
| CN | 105264478 | A | 1/2016 |
| CN | 106575149 | A | 4/2017 |
| CN | 108633307 | A | 10/2018 |
| CN | 110476142 | A | 11/2019 |
| CN | 110673718 | A | 1/2020 |
| EP | 2741175 | A2 | 6/2014 |
| EP | 2947545 | A1 | 11/2015 |
| EP | 3503101 | A1 | 6/2019 |
| EP | 3588255 | A1 | 1/2020 |
| EP | 3654147 | A1 | 5/2020 |
| JP | H10-51711 | A | 2/1998 |
| JP | 2005-215144 | A | 8/2005 |
| JP | 2006146803 | A | 6/2006 |
| JP | 2012-234550 | A | 11/2012 |
| JP | 2013-196158 | A | 9/2013 |
| JP | 2013-254358 | A | 12/2013 |
| JP | 2013-257716 | A | 12/2013 |
| JP | 2014-514652 | A | 6/2014 |
| JP | 2015-515040 | A | 5/2015 |
| JP | 2015-118332 | A | 6/2015 |
| JP | 2016-194744 | A | 11/2016 |
| JP | 2017-027206 | A | 2/2017 |
| JP | 2017-058528 | A | 3/2017 |
| JP | 2018-005516 | A | 1/2018 |
| JP | 2018-005517 | A | 1/2018 |
| JP | 2018-106499 | A | 7/2018 |
| JP | 2019-169154 | A | 10/2019 |
| JP | 2022-053334 | A | 4/2022 |
| KR | 10-2016-0012139 | A | 2/2016 |
| KR | 10-2019-0100957 | A | 8/2019 |
| WO | 2010/026519 | A1 | 3/2010 |
| WO | 2013/169849 | A2 | 11/2013 |
| WO | 2014/105276 | A1 | 7/2014 |
| WO | 2019/142560 | A1 | 7/2019 |
| WO | 2019/217163 | A1 | 11/2019 |
| WO | 2020/066682 | A1 | 4/2020 |
| WO | 2021/202783 | A1 | 10/2021 |
| WO | 2022/06639 | P9 | 3/2022 |
| WO | 2022/046340 | A1 | 3/2022 |
| WO | 2022/055822 | A1 | 3/2022 |
| WO | 2022066535 | A2 | 3/2022 |
| WO | 2022/146938 | A1 | 7/2022 |
| WO | 2022146936 | A1 | 7/2022 |
| WO | 2022/164881 | A1 | 8/2022 |
| WO | 2023/141535 | A1 | 7/2023 |

OTHER PUBLICATIONS

Corrected Notice of Allowability received for U.S. Appl. No. 17/448,875, mailed on Apr. 24, 2024, 4 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 18/154,757, mailed on Aug. 30, 2024, 2 pages.
Corrected Notice of Allowability received for U.S. Appl. No. 18/421,827, mailed on Aug. 29, 2024, 2 pages.
Corrected Notice of Allowability received for U.S. Appl. No. 18/465,098, mailed on Mar. 13, 2024, 3 pages.
Corrected Notice of Allowance received for U.S. Appl. No. 17/478,593, mailed on Dec. 21, 2022, 2 pages.
European Search Report received for European Patent Application No. 21791153.6, mailed on Mar. 22, 2024, 5 pages.
European Search Report received for European Patent Application No. 21801378.7, mailed on Jul. 10, 2024, 5 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Final Office Action received for U.S. Appl. No. 17/448,875, mailed on Mar. 16, 2023, 24 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 18/182,300, mailed on Feb. 16, 2024, 32 pages.

(56) References Cited

OTHER PUBLICATIONS

Final Office Action received for U.S. Appl. No. 18/375,280, mailed on Jul. 12, 2024, 19 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.
International Search Report received for PCT Application No. PCT/US2023/019458, mailed on Aug. 8, 2023, 7 pages.
International Search Report received for PCT Application No. PCT/US2023/060943, mailed on Jun. 6, 2023, 7 pages.
International Search Report received for PCT Patent Application No. PCT/US2023/074979, mailed on Feb. 26, 2024, 6 pages.
International Search Report received for PCT Patent Application No. PCT/US2021/050948, mailed on Mar. 4, 2022, 6 pages.
International Search Report received for PCT Patent Application No. PCT/US2023/074950, mailed on Jan. 3, 2024, 9 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2023/074257, mailed on Nov. 21, 2023, 5 pages.
Lin et al., "Towards Naturally Grabbing and Moving Objects in VR", IS&T International Symposium on Electronic Imaging and The Engineering Reality of Virtual Reality, 2016, 6 pages.
McGill et al., "Expanding the Bounds of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/580,495, mailed on Aug. 15, 2024, 28 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/327,318, mailed on Sep. 16, 2024, 13 pages.
Notice of Allowance received for U.S. Appl. No. 18/154,757, mailed on Aug. 26, 2024, 12 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 18/154,757, mailed on Jan. 23, 2024, 10 pages.
Notice of Allowance received for U.S. Appl. No. 18/154,757, mailed on May 10, 2024, 12 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Notice of Allowance received for U.S. Appl. No. 17/932,999, mailed on Sep. 12, 2024, 9 pages.
Restriction Requirement received for U.S. Appl. No. 17/932,999, mailed on Oct. 3, 2023, 6 pages.
Search Report received for Chinese Patent Application No. 202310873465.7, mailed on Feb. 1, 2024, 5 pages (2 pages of English Translation and 3 pages of Official Copy).
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bolt et al., "Two-Handed Gesture in Multi-Modal Natural Dialog", Uist '92, 5th Annual Symposium on User Interface Software and Technology. Proceedings of the ACM Symposium on User Interface Software and Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
Chatterjee et al., "Gaze+Gesture: Expressive, Precise and Targeted Free-Space Interactions", ICMI '15, Nov. 9-13, 2015, 8 pages.
Notice of Allowance received for U.S. Appl. No. 18/295,137, mailed on Feb. 14, 2025, 10 pages.
Corrected Notice of Allowability received for U.S. Appl. No. 18/463,739, mailed on Oct. 4, 2024, 2 pages.

(56) References Cited

OTHER PUBLICATIONS

Extended European Search Report received for European Patent Application No. 24159868.9, mailed on Oct. 9, 2024, 13 pages.

* cited by examiner

REPRESENTATIONS OF MESSAGES IN A THREE-DIMENSIONAL ENVIRONMENT

CROSS-REFERENCE TO RELATED APPLICATIONS

This application claims the benefit of U.S. Provisional Application No. 63/363,378, filed Apr. 21, 2022, the content of which is incorporated herein by reference in its entirety for all purposes.

TECHNICAL FIELD

The present disclosure relates generally to computer systems that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system modifies the visual appearances of user interface objects based on their spatial arrangement relative to the viewpoint of the user in a three-dimensional environment. In some embodiments, a computer system displays a representation of a message in a three-environment at a first distance from a viewpoint of the user and then changes the distance of the representation of the message to be a second distance from the viewpoint of the user based on input directed to the representation of the message. In some embodiments, a computer system transitions virtual objects from a three-dimensional appearance to a two-dimensional appearance and from a two-dimensional appearance to a three-dimensional appearance based on movement of the virtual objects.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The present disclosure relates to user interfaces for providing an extended reality (XR) experience to a user, in accordance with some embodiments.

The systems, methods, and graphical user interfaces (GUIs) described herein improve user interface interactions with virtual/augmented reality environments in multiple ways.

In some embodiments, a computer system displays a three-dimensional environment including a plurality of user interface objects, such as representations of messages. In some embodiments, the computer system displays those objects with three-dimensional visual effects such as virtual lighting effects. In some embodiments, when the spatial arrangement of those objects relative to the viewpoint of the user changes, the computer system updates the three-dimensional visual effects to have different visual appearances. In some embodiments, such changes of relative spatial arrangement occur in response to movement of the viewpoint, movement of the user interface objects and/or movement of a container of those user interface objects in the three-dimensional environment.

In some embodiments, a computer system displays, via a display generation component, a messaging user interface including a plurality of representations of messages including a first representation of a first message. The first representation of the first message is optionally displayed at a first distance from a viewpoint of the user. The computer system optionally changes a distance of the representation of the message to be a second distance from the viewpoint of the user in response to receiving input directed to the first representation of the first message. The first representation of the first message is optionally a two-dimensional object at the first distance from the viewpoint of the user and a three-dimensional object at the second distance from the viewpoint of the user.

In some embodiments, a computer system displays a user interface region having a plurality of user interface objects. In some embodiments, the plurality of user interface objects include a three-dimensional user interface object having a visual appearance including having a value of a three-dimensional property at a first location in the user interface region. In response to an input to scroll the three-dimensional user interface object in a direction towards a boundary of the user interface region, the three-dimensional user interface object is scrolled to a second location, different from the first location in the user interface region in accordance with the input to scroll. In some embodiments, the three-dimensional user interface object at the second location includes the three-dimensional property with a value different from the three-dimensional property value at the first location.

Figure 11A:
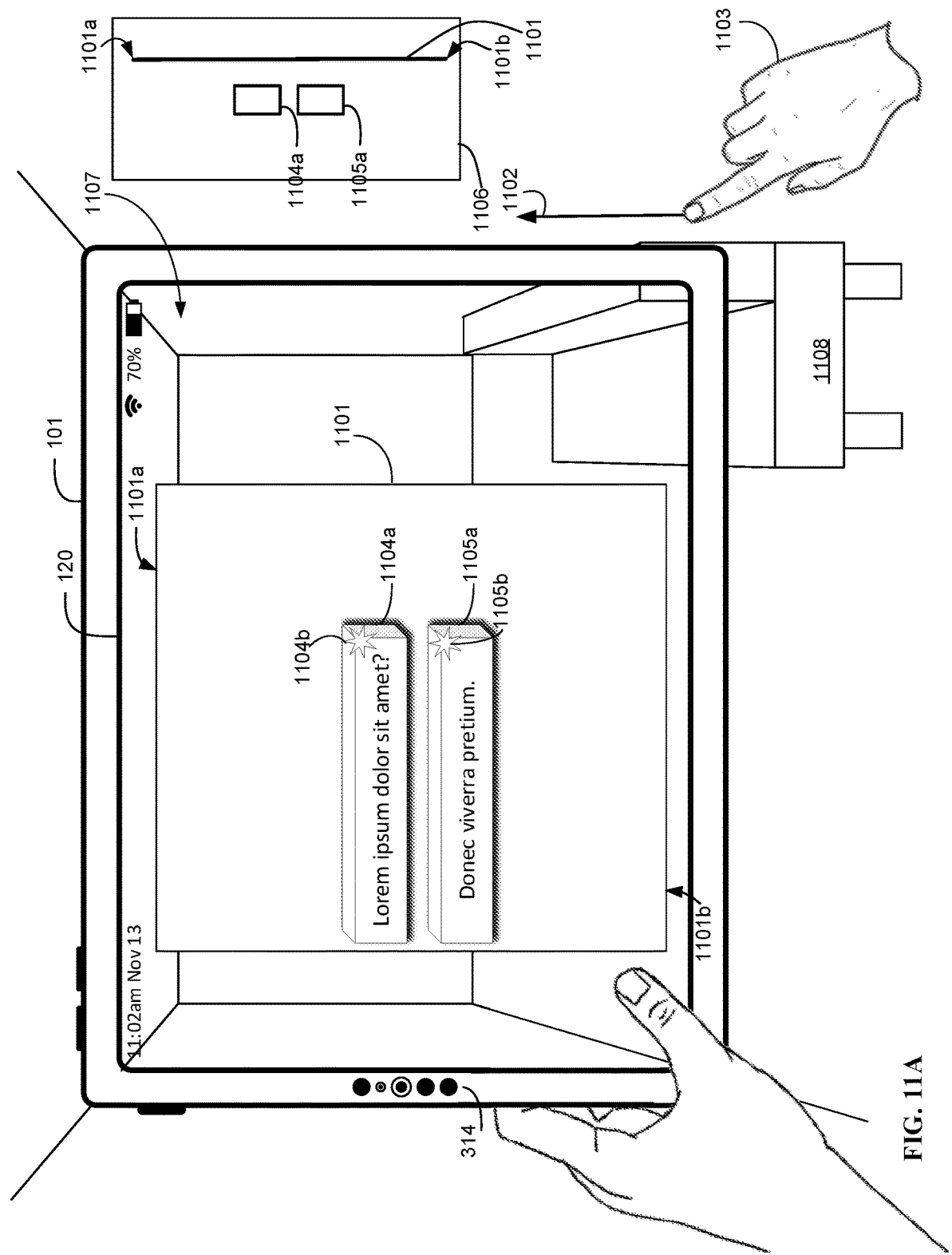
FIGS. 11A-11C illustrate examples of a computer system transitioning virtual objects from a three-dimensional appearance to a two-dimensional appearance and from a two-dimensional appearance to a three-dimensional appearance in accordance with some embodiments.
Figure 11B:
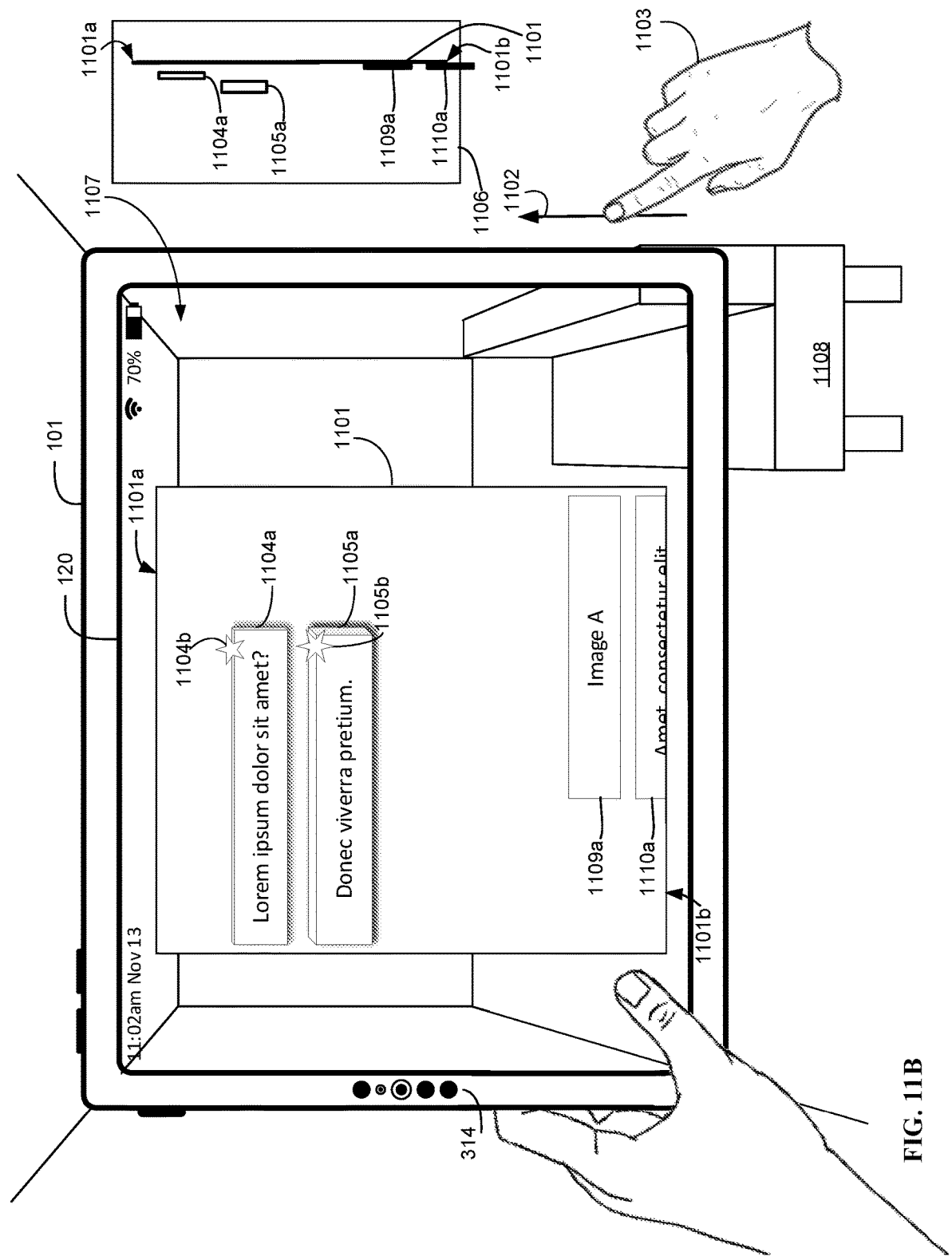
Figure 11C:
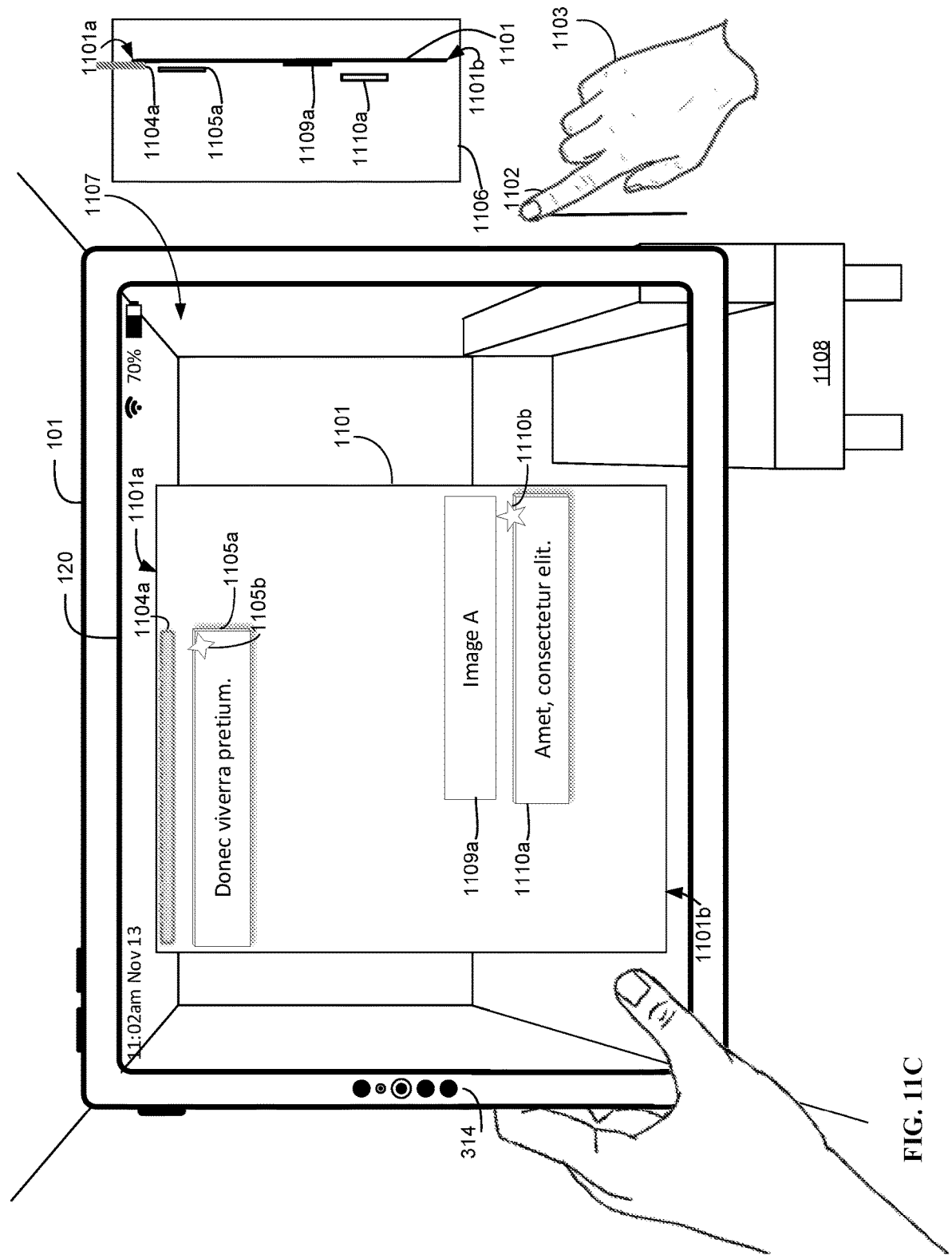
Figure 12A:
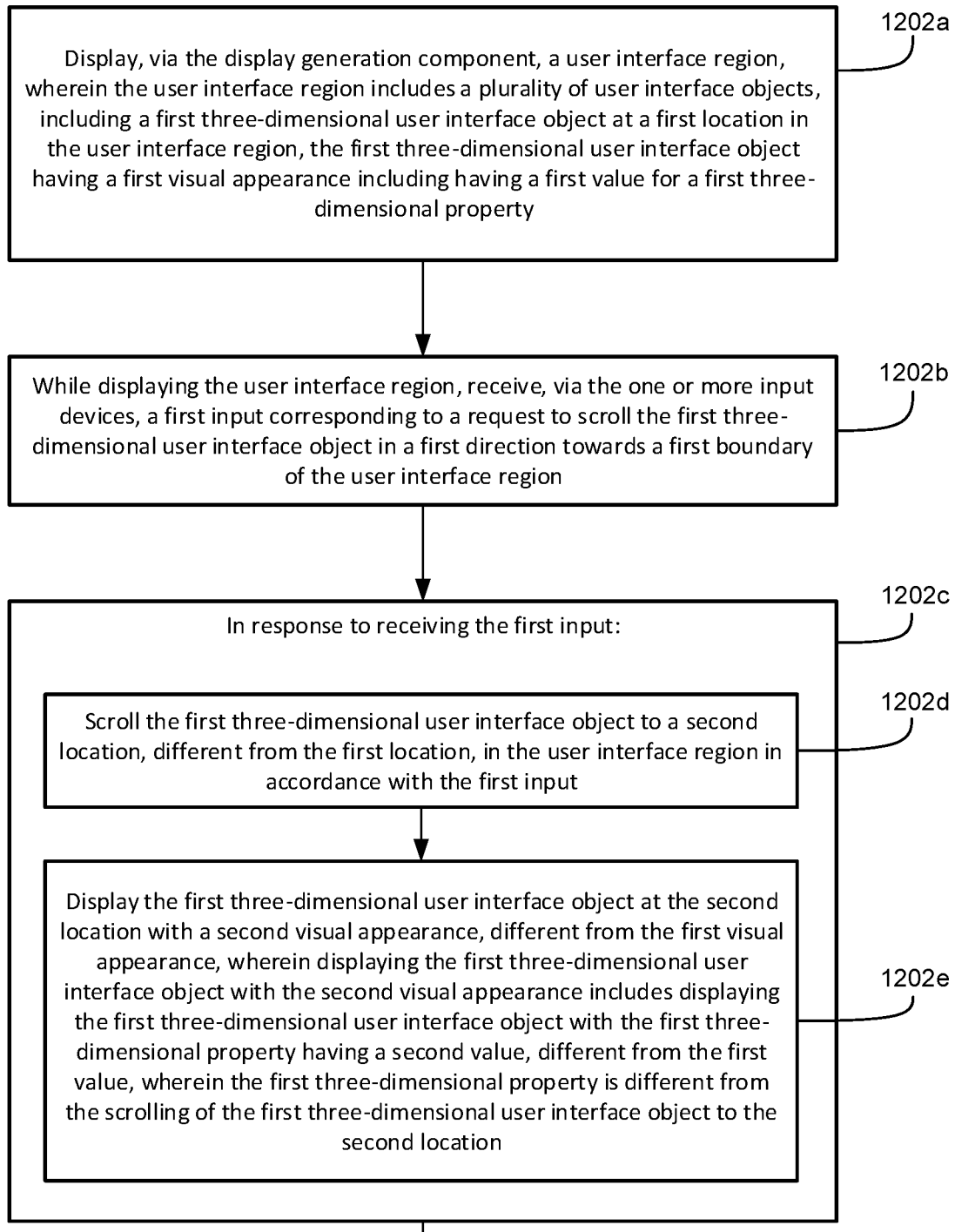
FIGS. 12A-12I is a flowchart illustrating an exemplary method of transitioning virtual objects from a three-dimensional appearance to a two-dimensional appearance and from a two-dimensional appearance to a three-dimensional appearance in accordance with some embodiments.
Figure 12B:
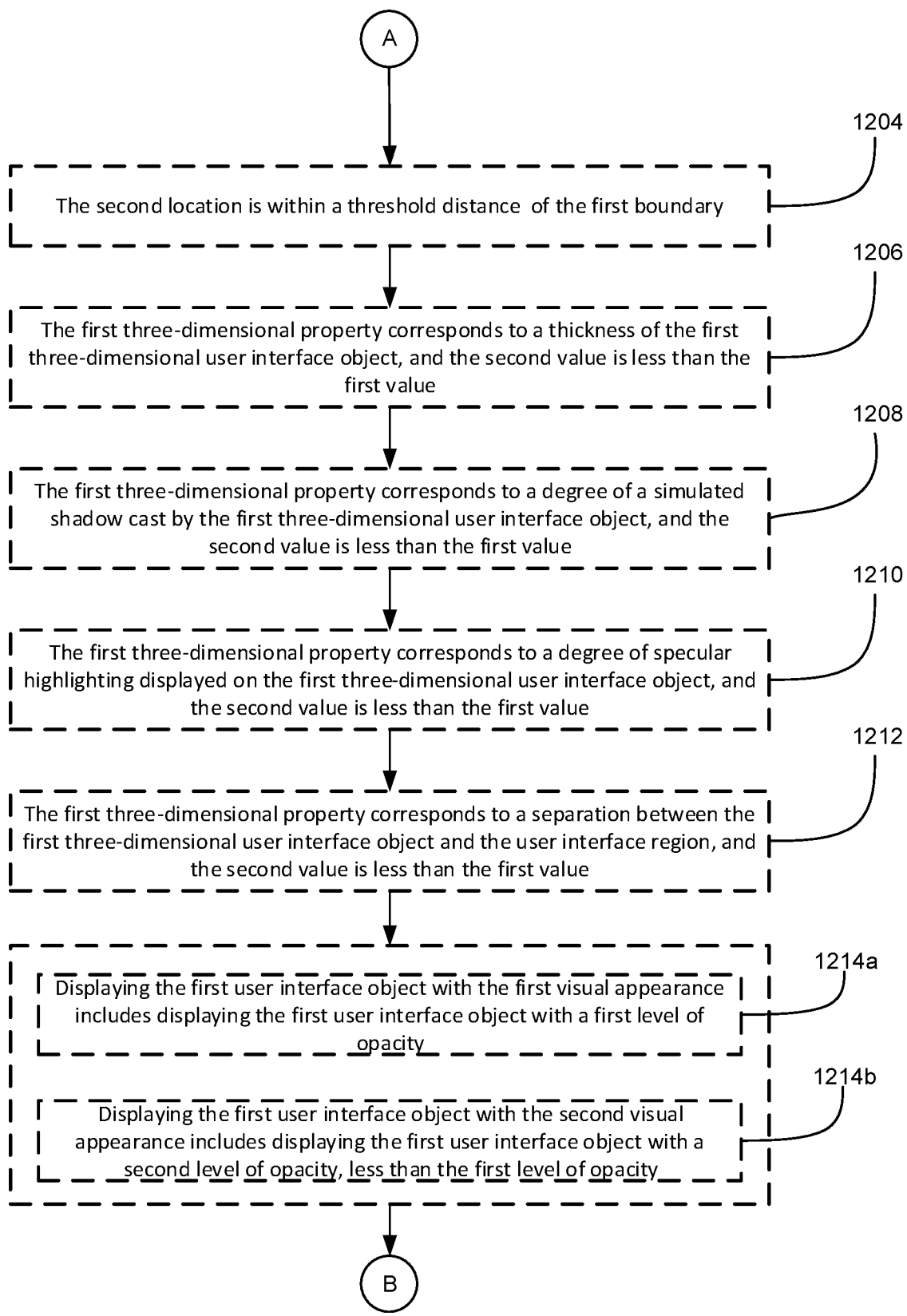
Figure 12C:
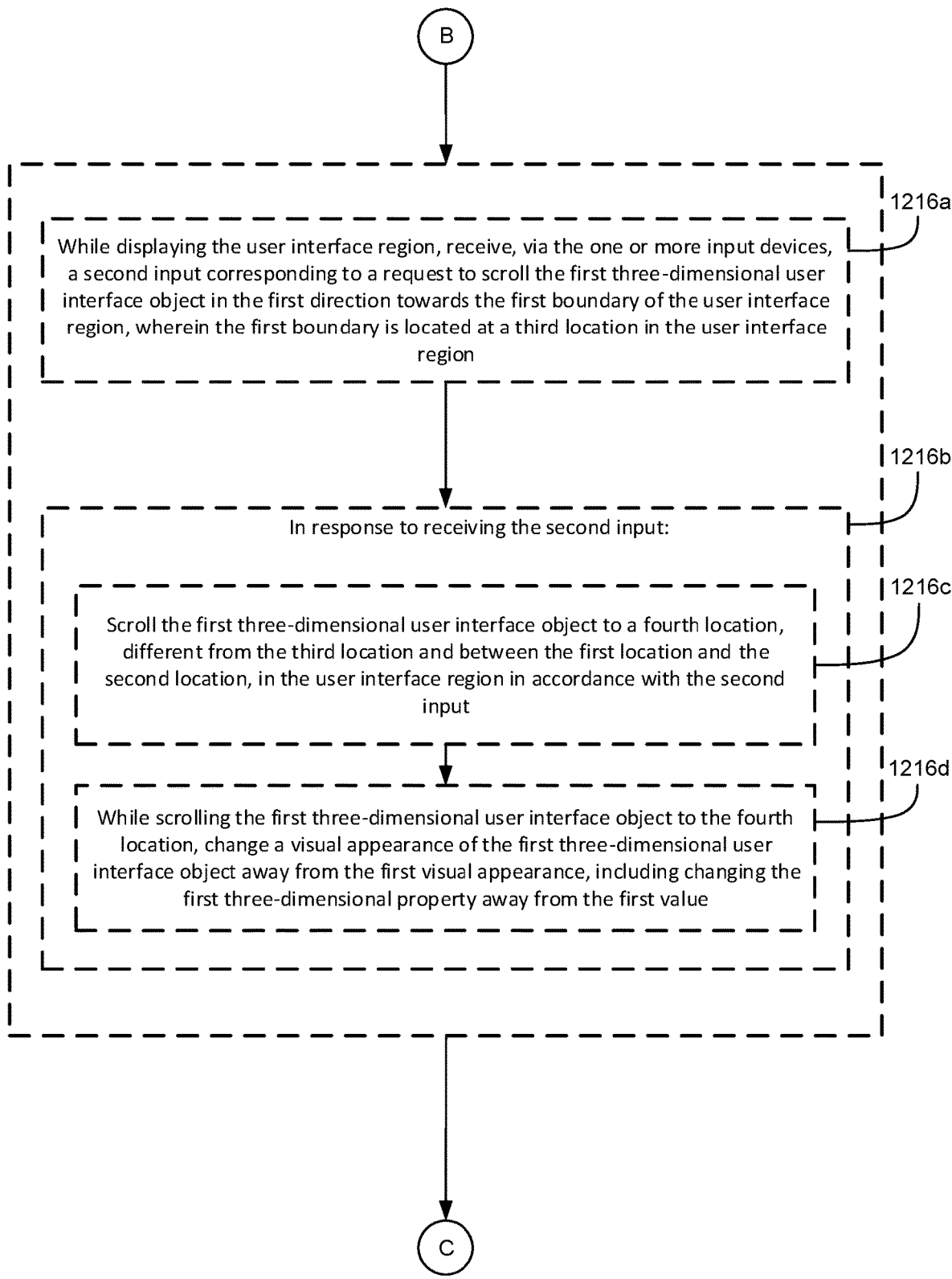
Figure 12D:
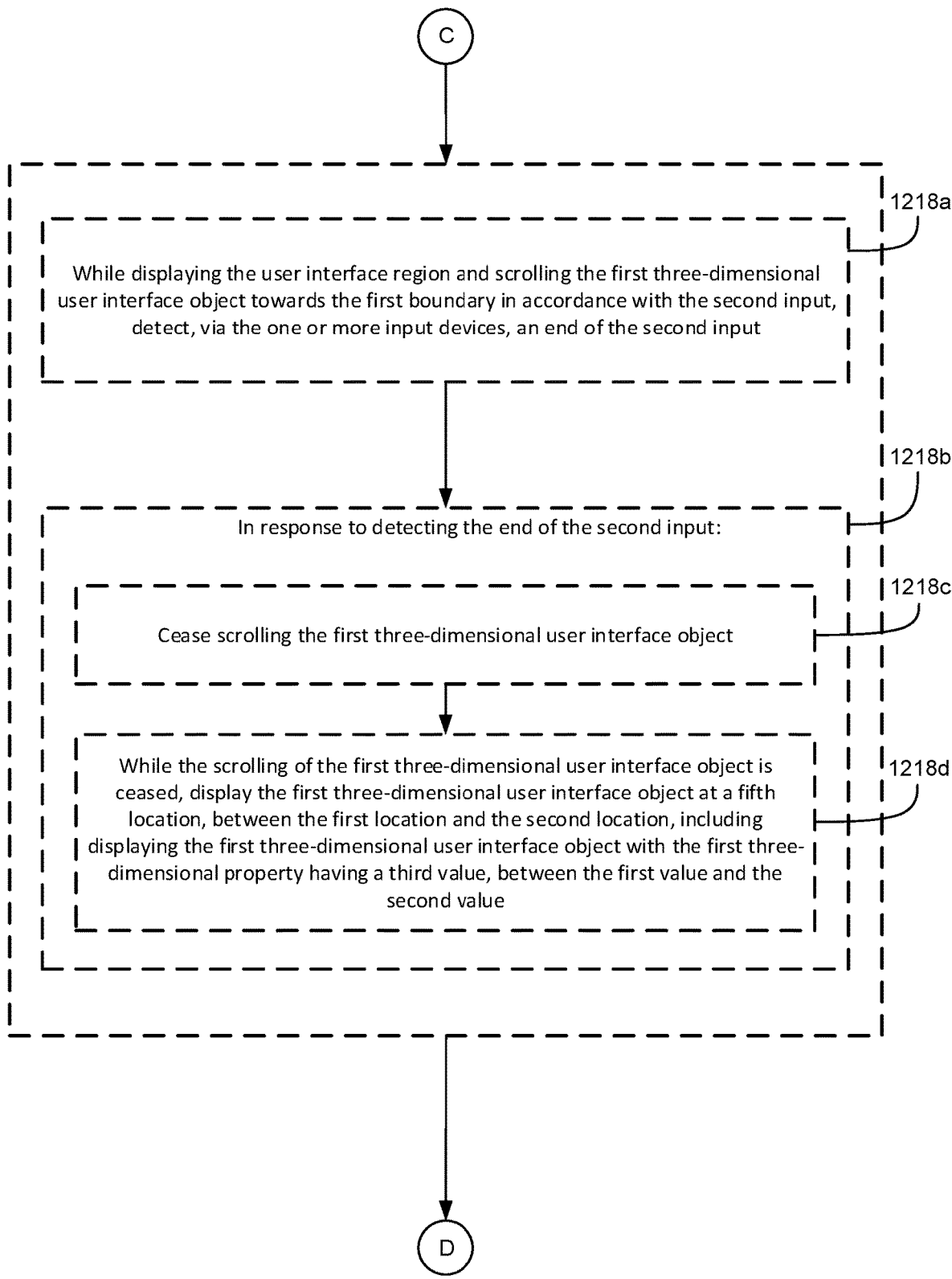
Figure 12E:
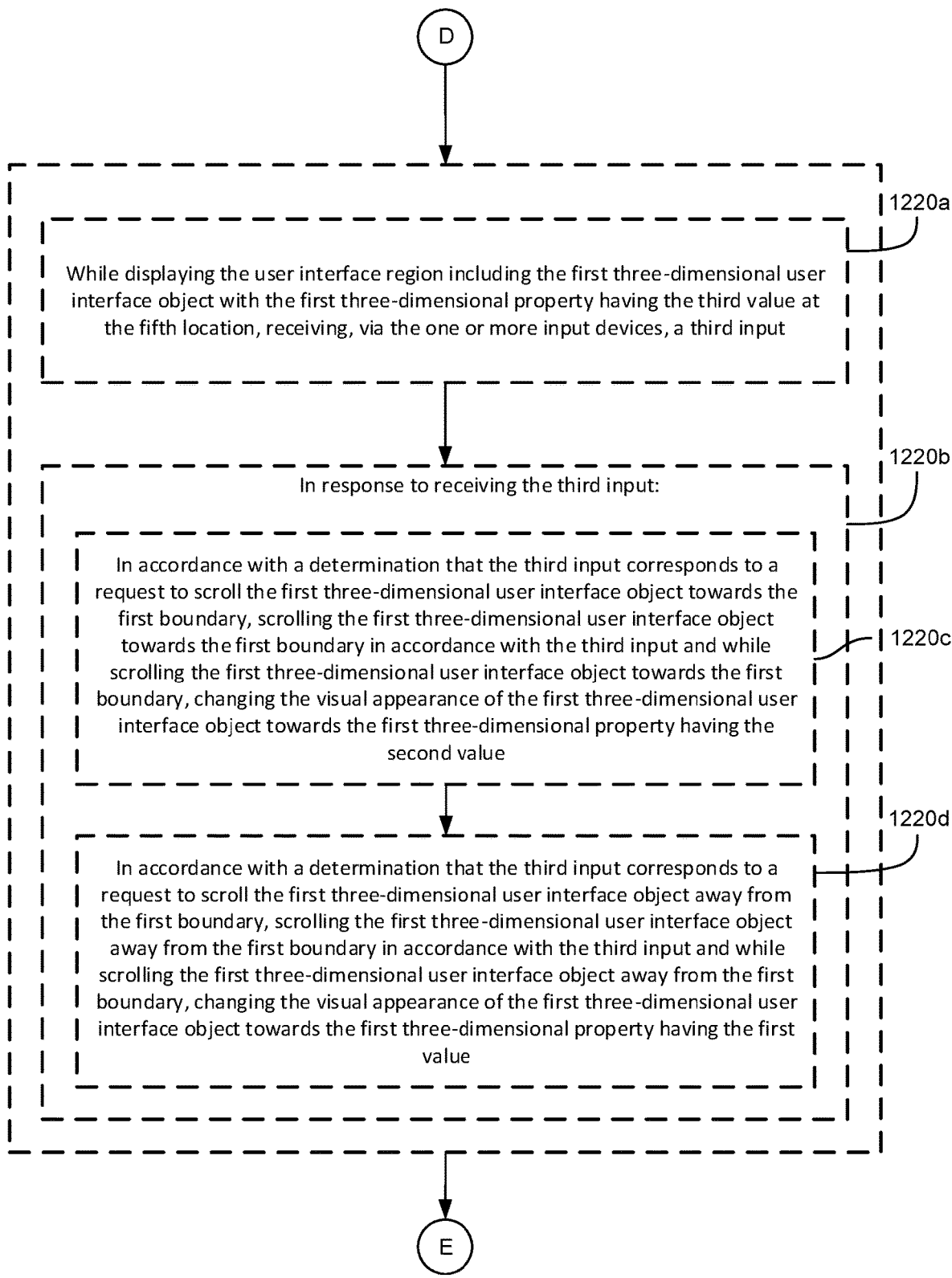
Figure 12F:
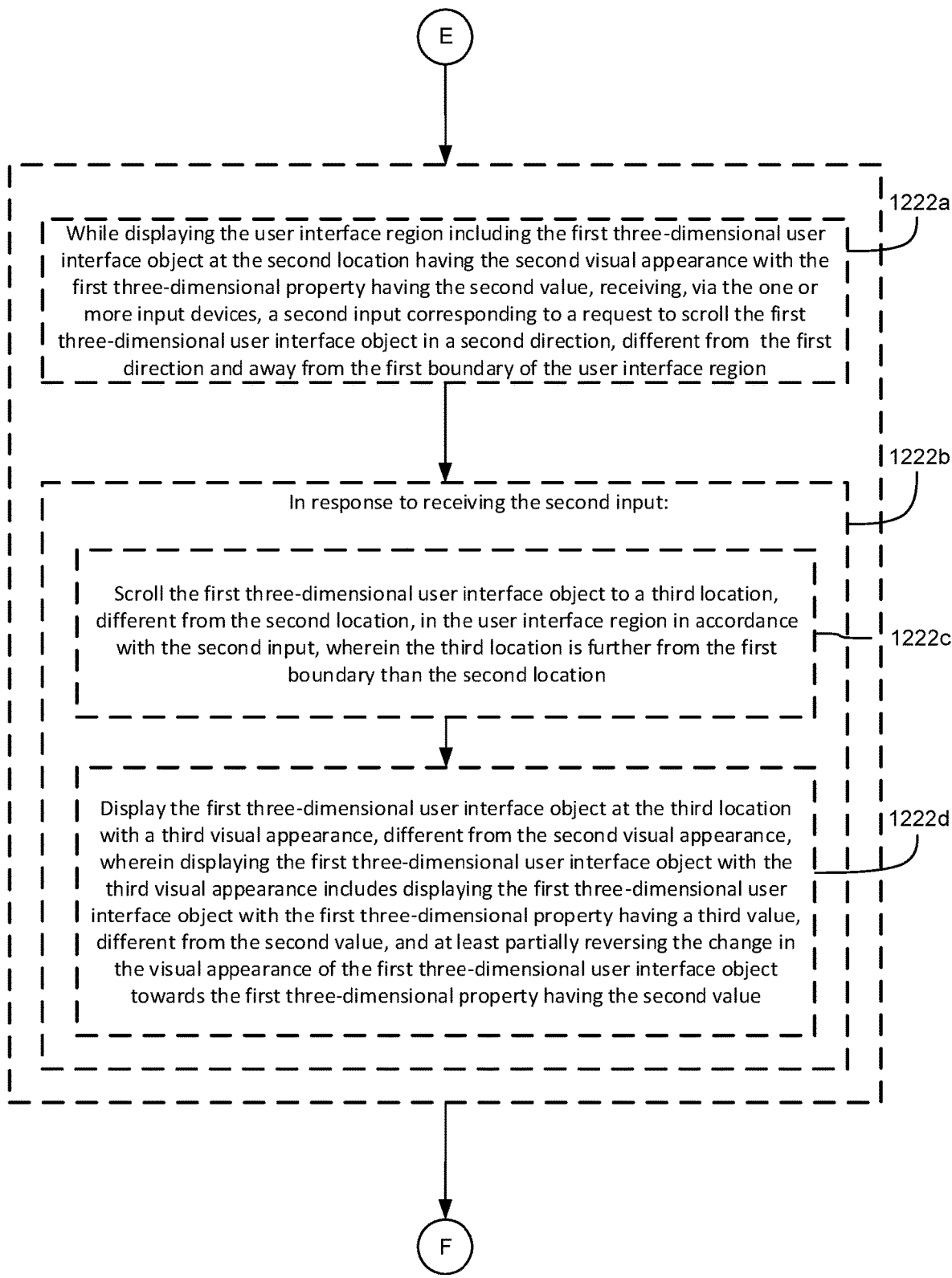
Figure 12G:
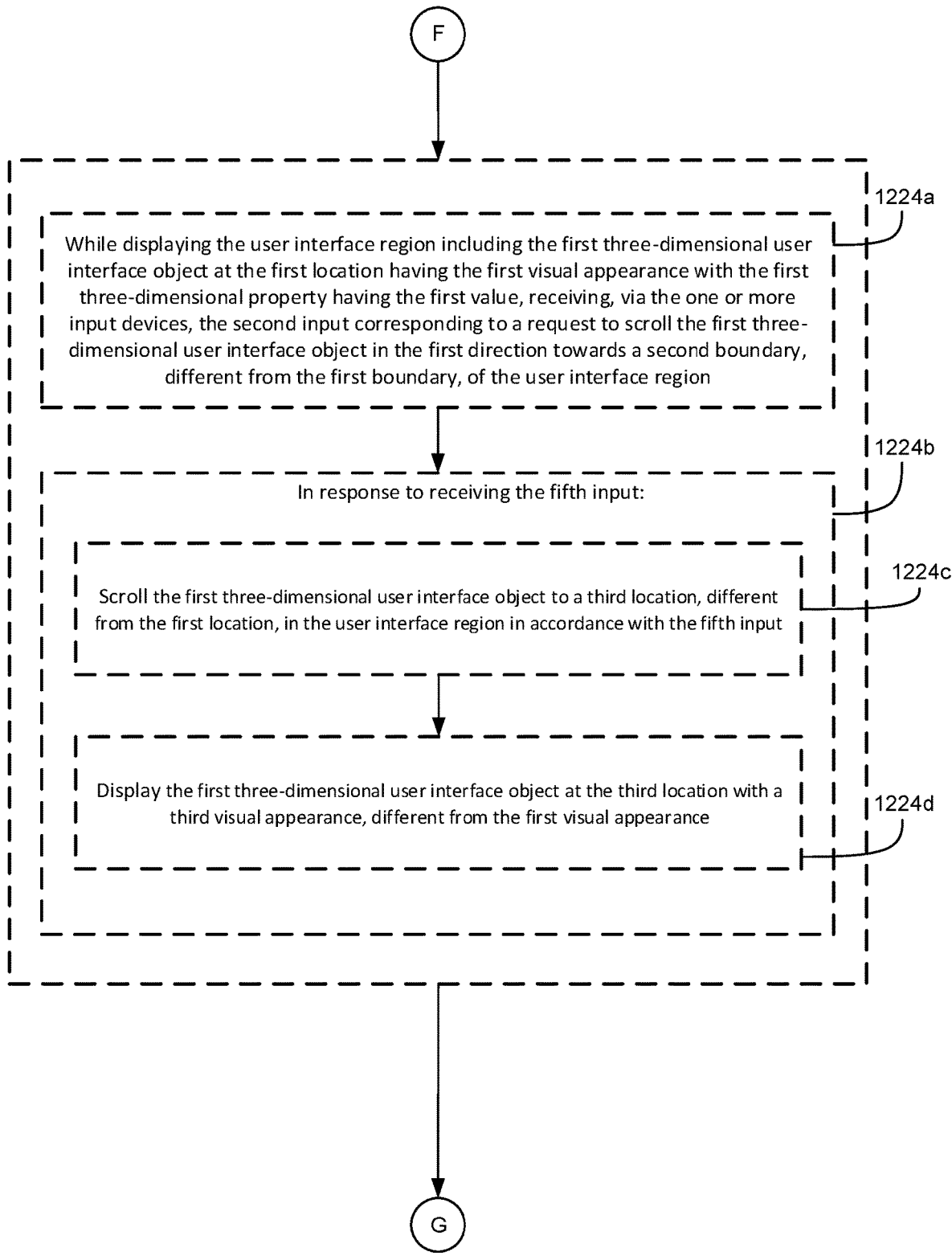
Figure 12H:
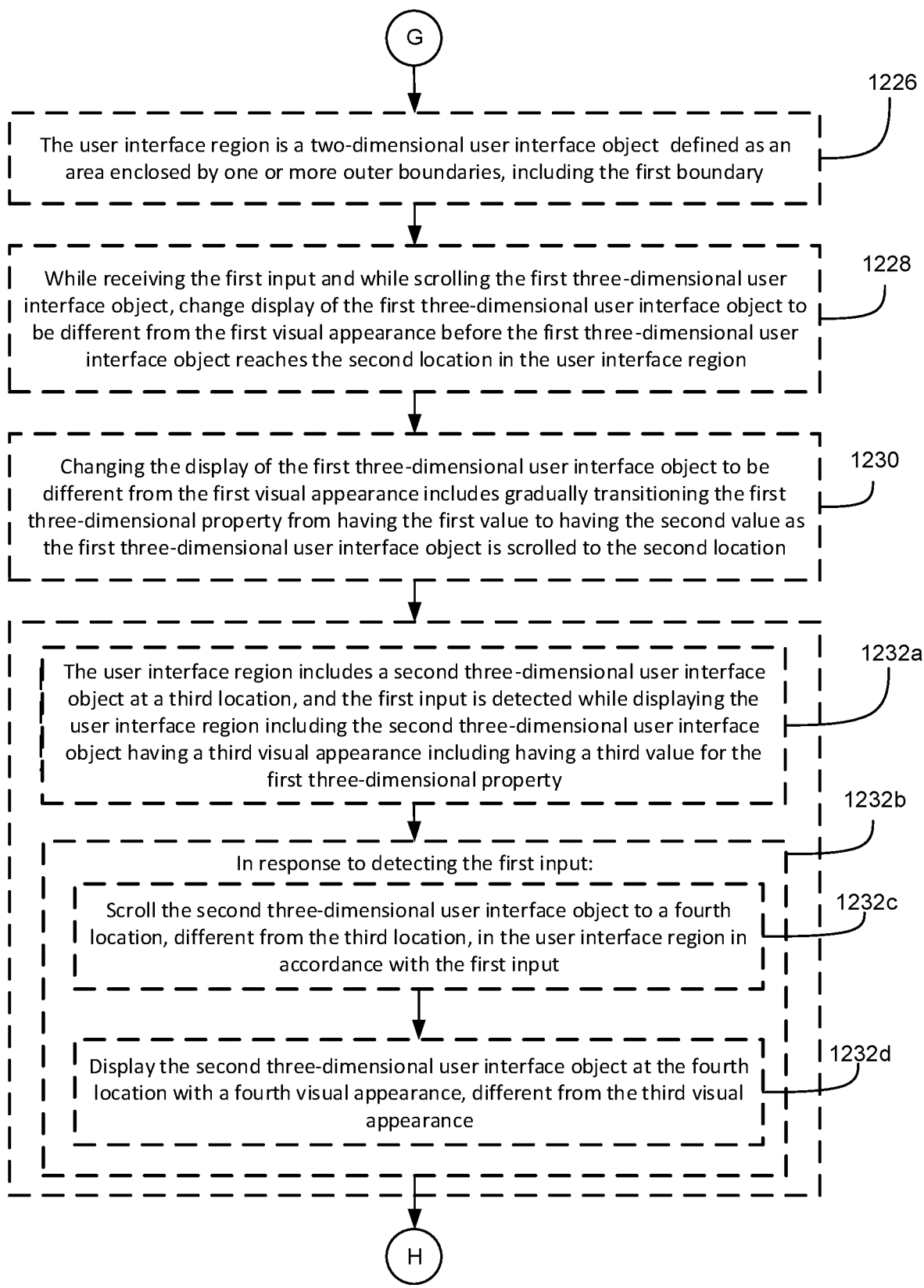
Figure 12I:
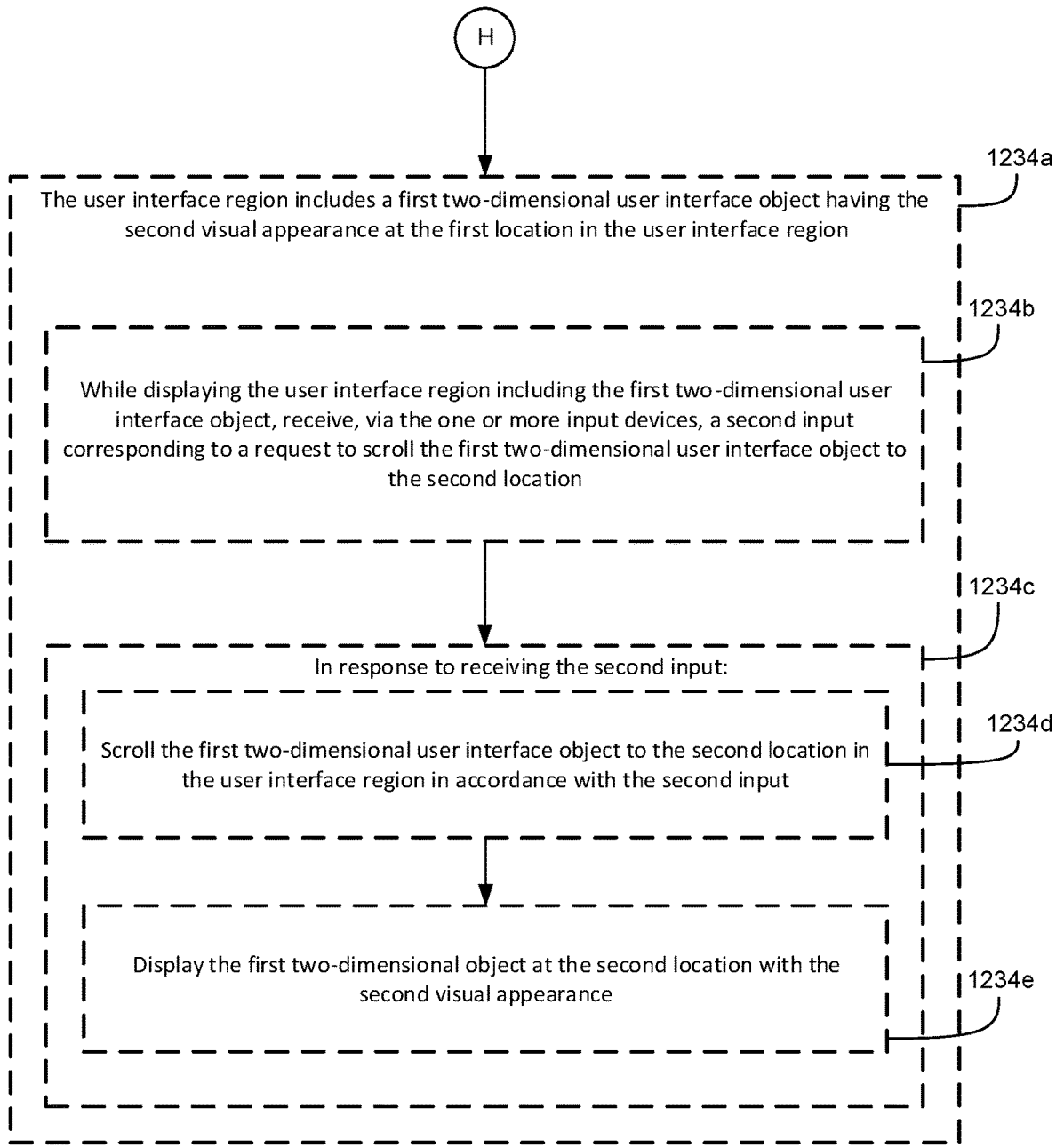

FIGS. 1-6 provide a description of example computer systems for providing XR experiences to users (such as described below with respect to methods 800, 1000, and/or 1200). FIGS. 7A-7D illustrate examples of a computer system changing the visual appearance of user interface objects in accordance with some embodiments. FIGS. 8A-8L is a flow diagram illustrating an exemplary method of changing the visual appearance of user interface objects in accordance with some embodiments. The user interfaces in FIGS. 7A-7D are used to illustrate the processes in FIGS. 8A-8L. FIGS. 9A-9E illustrate examples of a computer system changing the distance between a representation of a message and the viewpoint of a user in accordance with some embodiments. FIGS. 10A-10G include a flowchart illustrating a method of a computer system changing the distance between a representation of a message and the viewpoint of a user in accordance with some embodiments. The user interfaces in FIGS. 9A-9E are used to illustrate the processes in FIGS. 10A-10G. FIGS. 11A-11C illustrate example techniques for transitioning virtual objects from a three-dimensional appearance to a two-dimensional appearance and from a two-dimensional appearance to a three-dimensional appearance in accordance with some embodiments. FIGS. 12A-12I is a flow diagram of methods of transitioning virtual objects from a three-dimensional appearance to a two-dimensional appearance and from a two-dimensional appearance to a three-dimensional appearance in accordance with some embodiments. The user interfaces in FIGS. 11A-11C are used to illustrate the processes in FIGS. 12A-12I.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1:
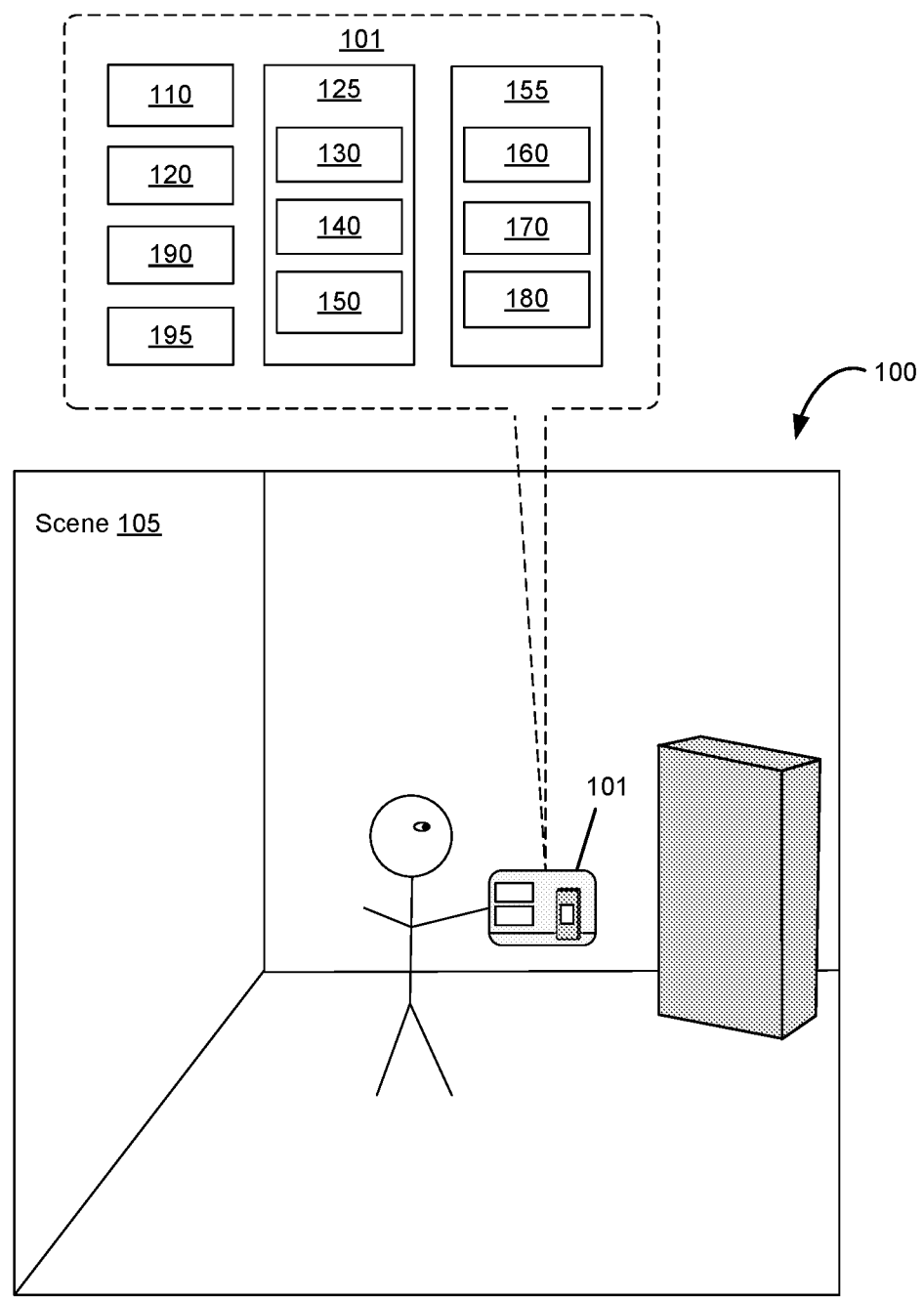
FIG. 1 is a block diagram illustrating an operating environment of a computer system for providing XR experiences in accordance with some embodiments.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
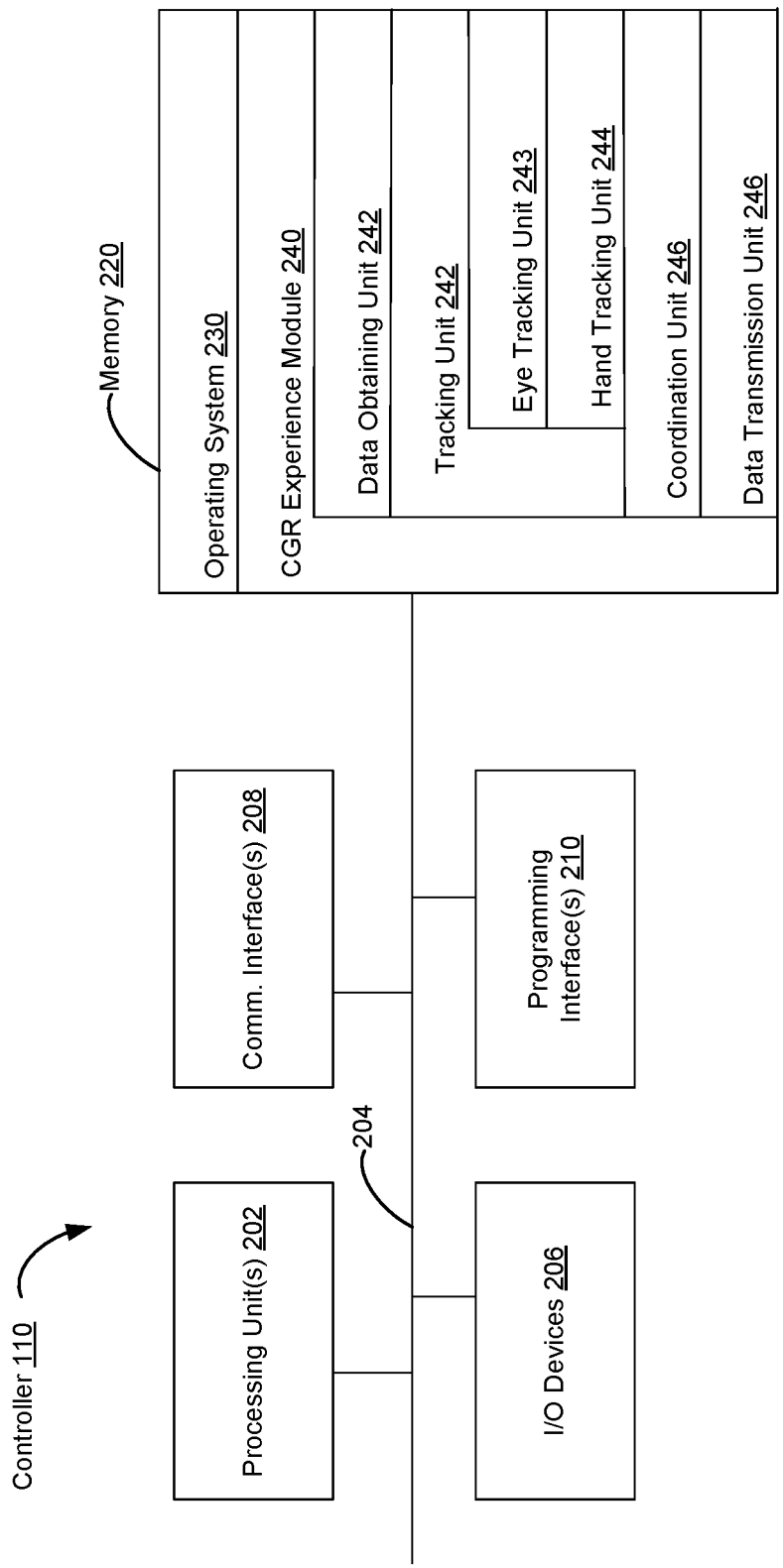
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
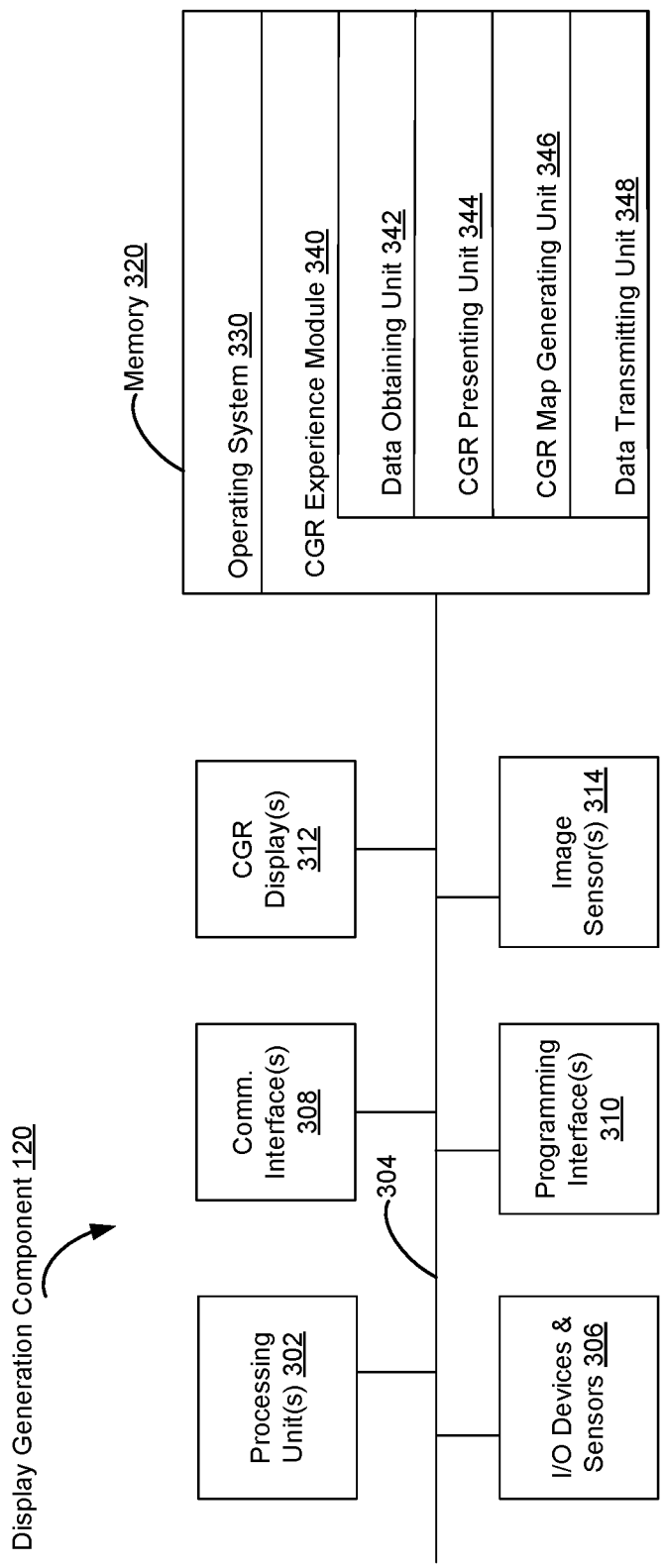
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
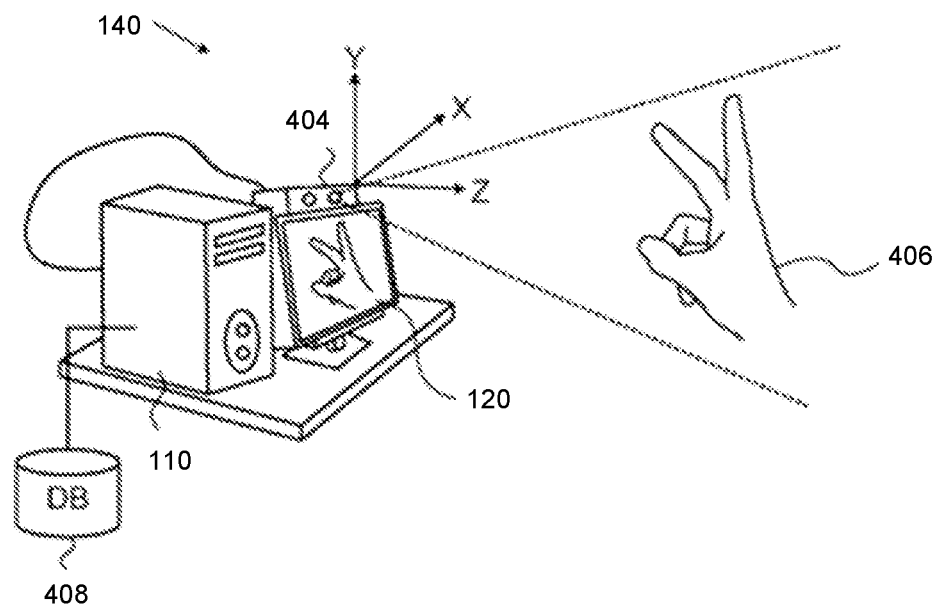
FIG. 4 is a block diagram illustrating a hand tracking unit of a computer system that is configured to capture gesture inputs of the user in accordance with some embodiments.
Figure 4:
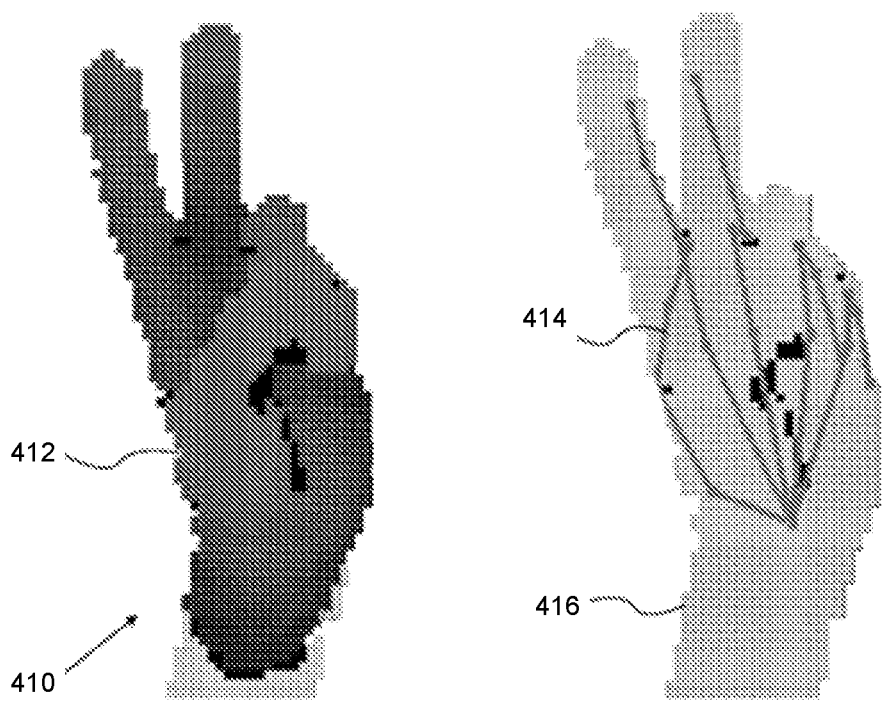

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving the hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
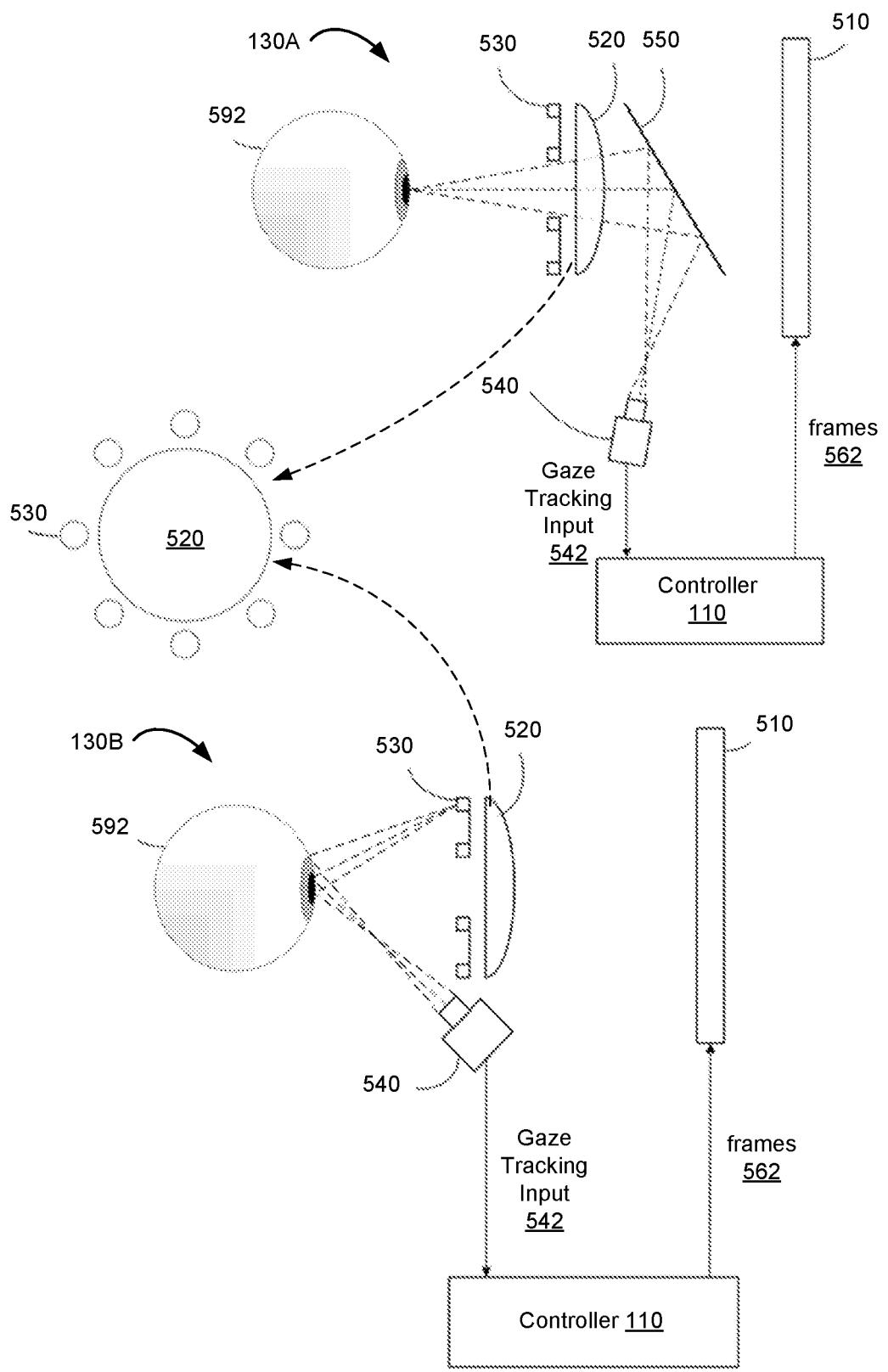
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
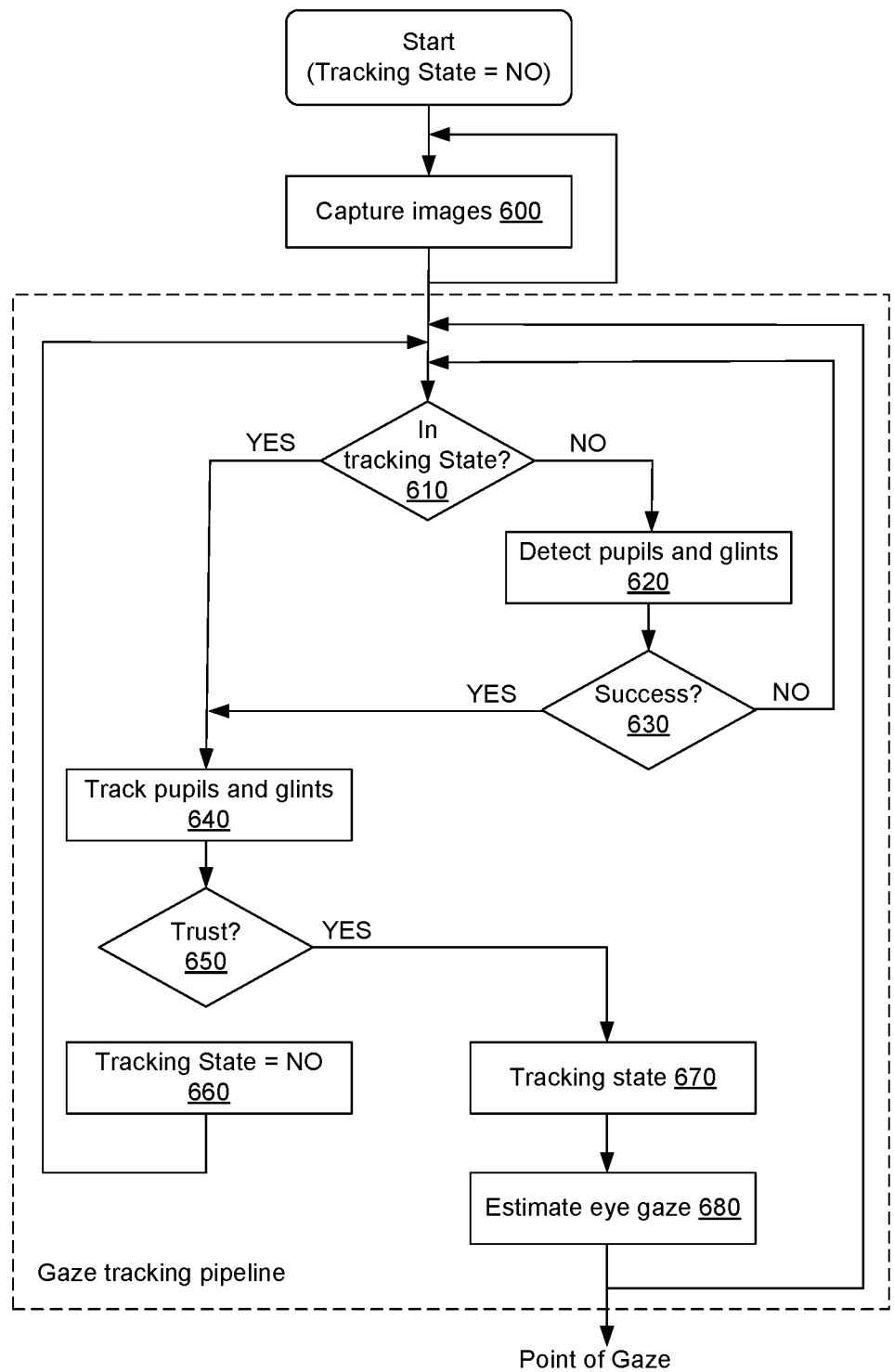
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UP") and associated processes that may be implemented on a computer system, such as portable multifunction device or a head-mounted device, with a display generation component, one or more input devices, and (optionally) one or cameras.

FIGS. 7A-7D illustrate examples of a computer system changing the visual appearance of user interface objects in accordance with some embodiments.

Figure 7A:
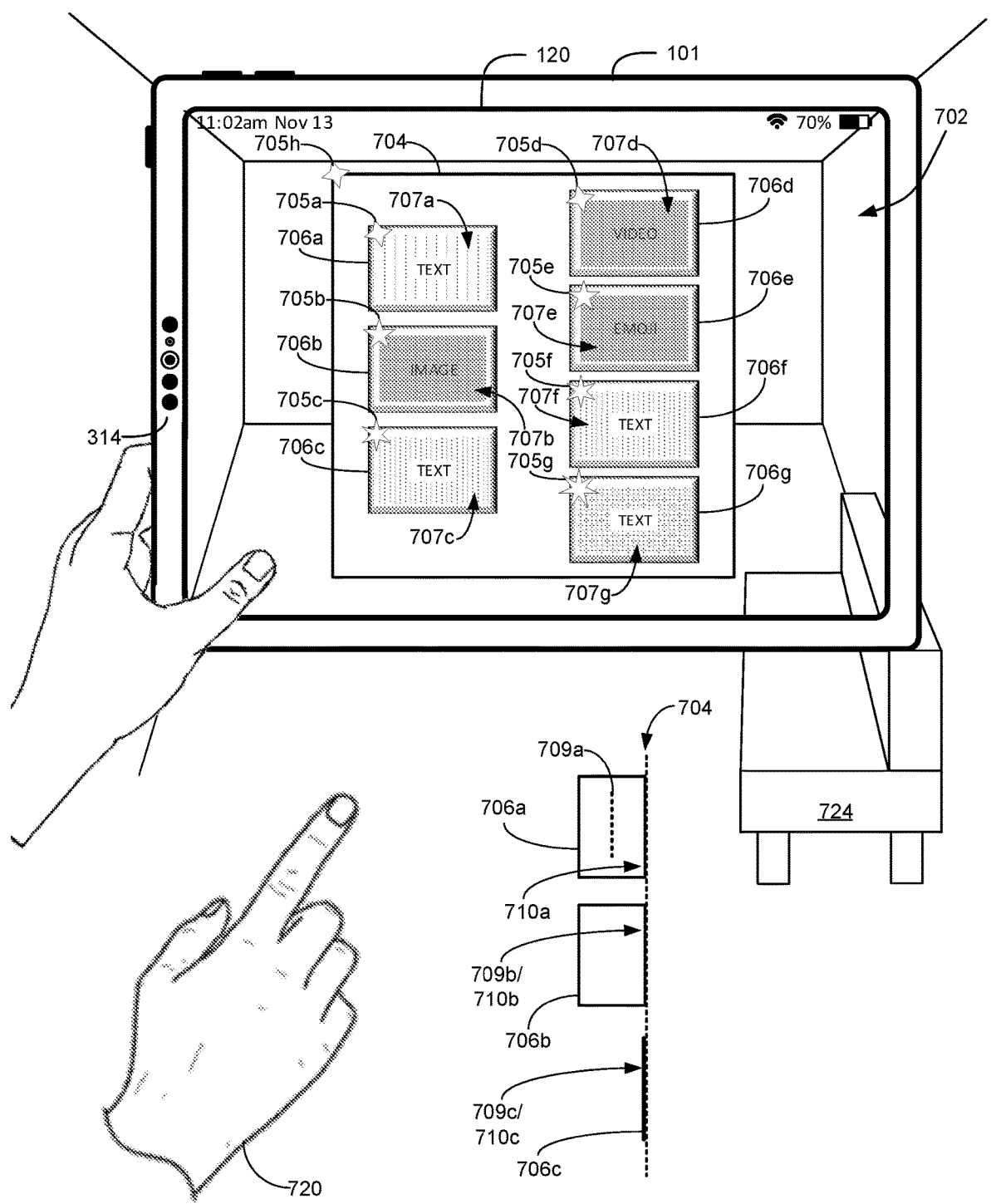
FIGS. 7A-7D illustrate examples of a computer system changing the visual appearance of user interface objects in accordance with some embodiments.

FIG. 7A illustrates a three-dimensional environment 702 visible via a display generation component (e.g., display generation component 120 of FIG. 1) of a computer system 101, the three-dimensional environment 702 visible from a viewpoint of a user. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 7A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 702 and/or the physical environment is visible in the three-dimensional environment 702 via the display generation component 120. For example, three-dimensional environment 702 visible via display generation component 120 includes representations of the physical floor and back and side walls of the room in which computer system 101 is located. Three-dimensional environment 702 also includes sofa 724.

In FIG. 7A, three-dimensional environment 702 also includes virtual objects 706*a*-706*g* included within a virtual object (e.g., user interface 704). In some embodiments, virtual objects 706*a*-706*g* are representations of messages in a messaging user interface 704, as described in more detail with reference to method 800.

In some embodiments, computer system 101 displays messaging user interface 704 and/or representations of messages 706*a*-706*g* with one or more virtual lighting effects based on one or more simulated light sources, as described in more detail with reference to method 800. For example, representation 706*a* in FIG. 7A is displayed with a virtual surface lighting effect 707*a* (illustrated as a vertical line pattern) on the front surface of representation 706*a*, and a virtual specular highlight 705*a* close to the top-left corner of representation 706*a*. The other representations of messages 706*b*-706*g* similarly include surface virtual lighting effects 707*b*-707*g* and/or specular highlights 705*b*-705*g*. Messaging user interface 704 in FIG. 7A is also illustrated with a specular highlight effect 705*h* at its top-left corner. In some embodiments, computer system displays surface lighting effects 705*a*-705*g* differently depending on the content of the message corresponding to a particular representation of a message 706*a*-706*g*. For example, representation 706*a* is optionally a three-dimensional representation of a message that includes text content. In some embodiments, computer system 101 reduces the intensity of, or eliminates, the surface lighting effect 707*a* on portions of the surface of representation 706*a* that are in front of or otherwise obscure the text content included in representation 706*a*, as shown in FIG. 7A. In contrast, representation 706*b* is optionally a three-dimensional representation of a message that includes image content. In some embodiments, computer system 101 does not reduce the intensity of the surface lighting effect 707*b* (illustrated as a relatively sparse cross-hatch pattern) on portions of the surface of representation 706*b* that are in front of or otherwise obscure the image content included in representation 706*b*, as shown in FIG. 7A. Computer system 101 optionally similar does not reduce or eliminate surface lighting effects on surfaces of representations of messages that include other types of content such as video content (e.g., representation 706*d*) or emoji content (e.g., representation 706*e*).

In some embodiments, surface and/or specular lighting effects displayed by computer system 101 on representations 706*a*-706*g* and/or user interface 704—and more generally, the visual appearances of representations 706*a*-706*g* and/or user interface 704— optionally have different visual appearances that are based on the spatial arrangement of those virtual objects relative to the simulated light sources and/or the viewpoint of the user. In some embodiments, changes in such visual appearances due to changes in the spatial arrangement of those virtual objects relative to the simulated light sources and/or the viewpoint of the user are different from and optionally in addition to changes in perceived shape or size (from the viewpoint of the user) of the virtual objects due to the changed spatial arrangement relative to the viewpoint of the user (e.g., different from the virtual objects looking smaller from the viewpoint of the user due to being further from the viewpoint of the user and/or different from a shape of the area of the field of view of the user consumed by the virtual objects changing due to the virtual objects having a different orientation (e.g., tilt) relative to the viewpoint of the user). Examples of such visual appearances and changes of such visual appearances are described below.

For example, in FIG. 7A, representations 706*a* and 706*d* have visually the same or similar specular highlighting effects 705*a* and 705*d*, respectively, and visually the same or similar surface lighting effects 707*a* and 707*d*, because they are optionally relatively similarly situated relative to the simulated light sources and/or the viewpoint of the user. Representations 706*b* and 706*e* have specular highlighting effects 705*b* and 705*e* and surface lighting effects 707*b* and 707*e*, respectively, that are visually different from specular highlighting effects 705*a* and 705*d* and surface lighting effects 707*a* and 707*d*, because representations 706*b* and 706*e* have a substantially different spatial arrangements relative to simulated light sources and/or the viewpoint of the user as compared with representations 706*a* and 706*d*. However, representations 706*b* and 706*e* have visually the same or similar specular highlighting effects 705*b* and 705*e*, respectively, and visually the same or similar surface lighting effects 707*b* and 707*e*, because they are optionally relatively similarly situated relative to the simulated light sources and/or the viewpoint of the user. In FIGS. 7A-7D, the illustrated patterns of surface lighting effects 707*a*-707*g* and the illustrated sizes and/or shapes of specular lighting effects 705*a*-705*g* optionally indicate that different representations of messages 706*a*-706*g* have visually the same or substantially the same surface lighting effects when the illustrated patterns of such lighting effects are the same, have visually different surface lighting effects when the illustrated patterns of such lighting effects are different, have the same or substantially the same specular lighting effects when the illustrated sizes and/or shapes of such lighting effects are the same, and have different specular lighting effects when the illustrated sizes and/or shapes of such lighting effects are different. Additional or alternative details about how the visual appearances of surface lighting effects and specular lighting effects optionally differ between different representations of messages 706*a*-706*g* are described with reference to method 800.

FIGS. 7A-7D also include a side view of user interface 704 and representations of messages 706*a*-706*c*. Features described with reference to the side view with respective to representations 706*a*-706*c* optionally apply analogously to representations 706*d*-*g*. As mentioned previously, in some embodiments, one or more of representations 706*a*-706*g* are three-dimensional representations of messages, a shown with reference to representations 706*a* and 706*b* in the side view. In some embodiments, one or more of representations 706*a*-706*g* are two-dimensional representations of messages, as shown with reference to representation 706*c* in the side view. In some embodiments, representations 706*a*-706*g* are displayed with the various virtual lighting effects described herein regardless of whether the representations are two-dimensional or three-dimensional. Further, in some embodiments, two-dimensional representations are displayed with visual effects (e.g., shading, lighting and/or other effects) that cause such representations to appear three-dimensional from the front, such as with representation 706*c* in FIG. 7A.

In some embodiments, different types of message content are positioned at different relative positions within a representation of a message based on the type of message content. For example, in FIG. 7A, representation 706 includes text content 709*a*. As shown in the side view, text content 709*a* is positioned in the middle or interior volume of representation 706*a*, and is separated from a back surface 710*a* of representation 706*a*. In contrast, representation 706*b* includes image content 709*b*. As shown in the side view, image content 709*b* is on the back surface 710*b* of representation 706*b*. Video content is optionally also placed on the back surface of a representation of a message. When a representation of a message is two-dimensional, such as representation 706*c*, the content of the message is optionally placed on the surface 710*c* of the representation regardless of the type of the content, as shown in the side view in FIG. 7A. Further, in FIG. 7A, representations 706*a*-706*c* are positioned on the surface of user interface 704 as shown in the side view, optionally because no input is directed to the representations 706*a*-706*c* from hand 720.

Figure 7B:
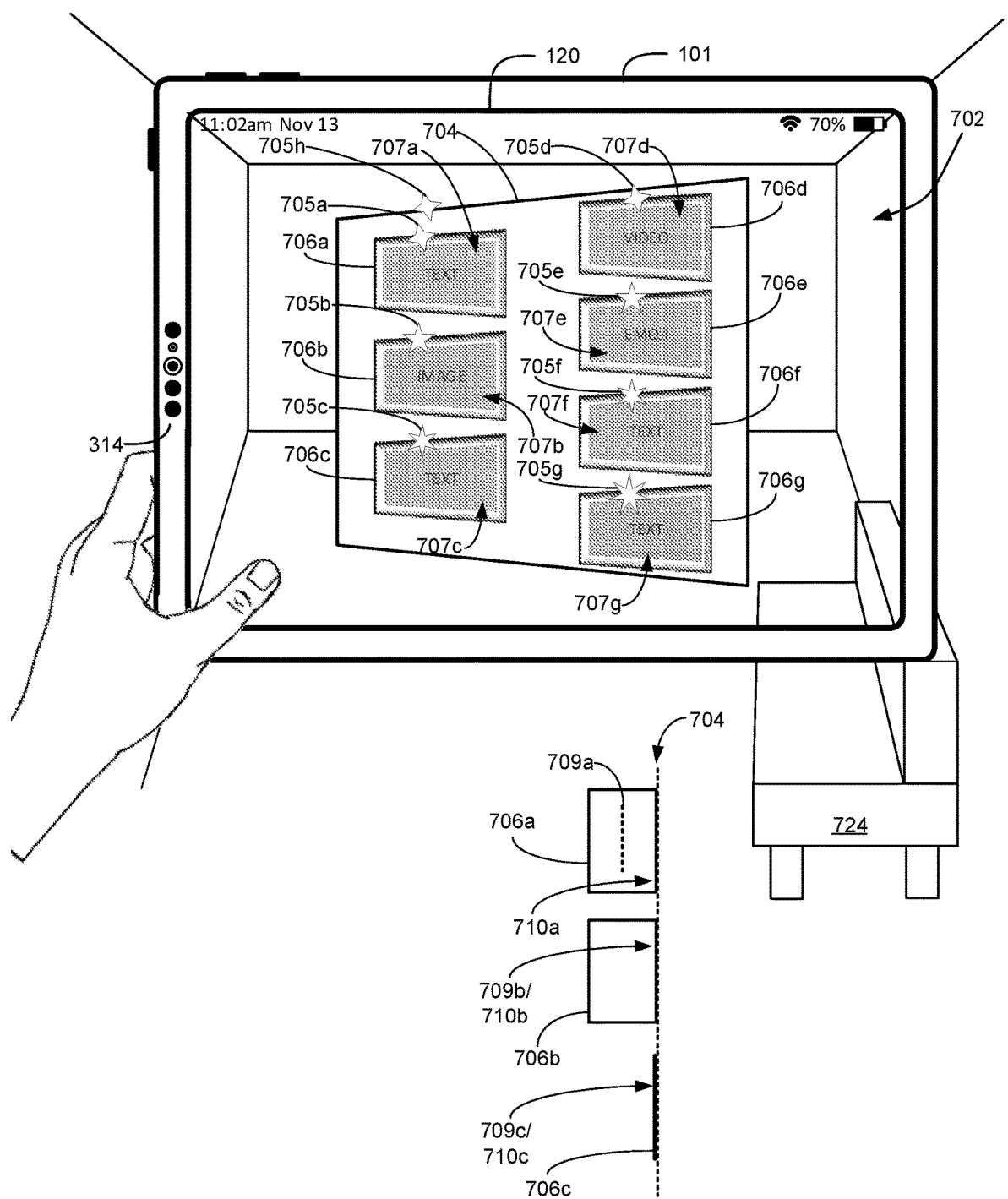

From FIG. 7A to 7B, the spatial arrangement of user interface 704 and/or representations 706*a*-706*g* has changed relative to the simulated light sources and/or the viewpoint of the user (e.g., user interface 704 and representations 706*a*-706*g* are optionally oriented such that the left edges of user interface 704 and representations 706*a*-706*g* are further from the viewpoint of the user than the right edges of user interface 704 and representations 706*a*-706*g*). In FIG. 7B, such change in spatial arrangement is optionally due to a change in position and/or orientation of user interface 704 in three-dimensional environment 702, such as from a repositioning input detected from hand 720 in FIG. 7A (described in more detail with reference to method 800). In response to the above change in spatial arrangement, computer system 101 optionally displays specular lighting effects 705*a*-705*g* and/or surface lighting effects 707*a*-707*g* with different visual appearances, such as shown in FIG. 7B. For example, specular lighting effects 705*a*-705*g* have shifted away from the upper-left corners of representations 706*a*-706*g*, and have instead moved closer to the middle of the top edges of representations 706*a*-706*g*. As shown in FIG. 7B, specular lighting effect 705*h* displayed on user interface 704*a* has similarly moved. In some embodiments, additional or alternative changes to the visual appearances of specular lighting effects 705*a*-705*h* and/or surface lighting effects 707*a*-707*g* include one or more of brightness changes, color changes, diffusiveness changes and/or changes in other characteristics described with reference to method 800. Further, in FIG. 7B, representations 706*a*-706*c* are positioned on the surface of user interface 704 as shown in the side view, optionally because no input is directed to the representations 706*a*-706*c* from hand 720.

Figure 7C:
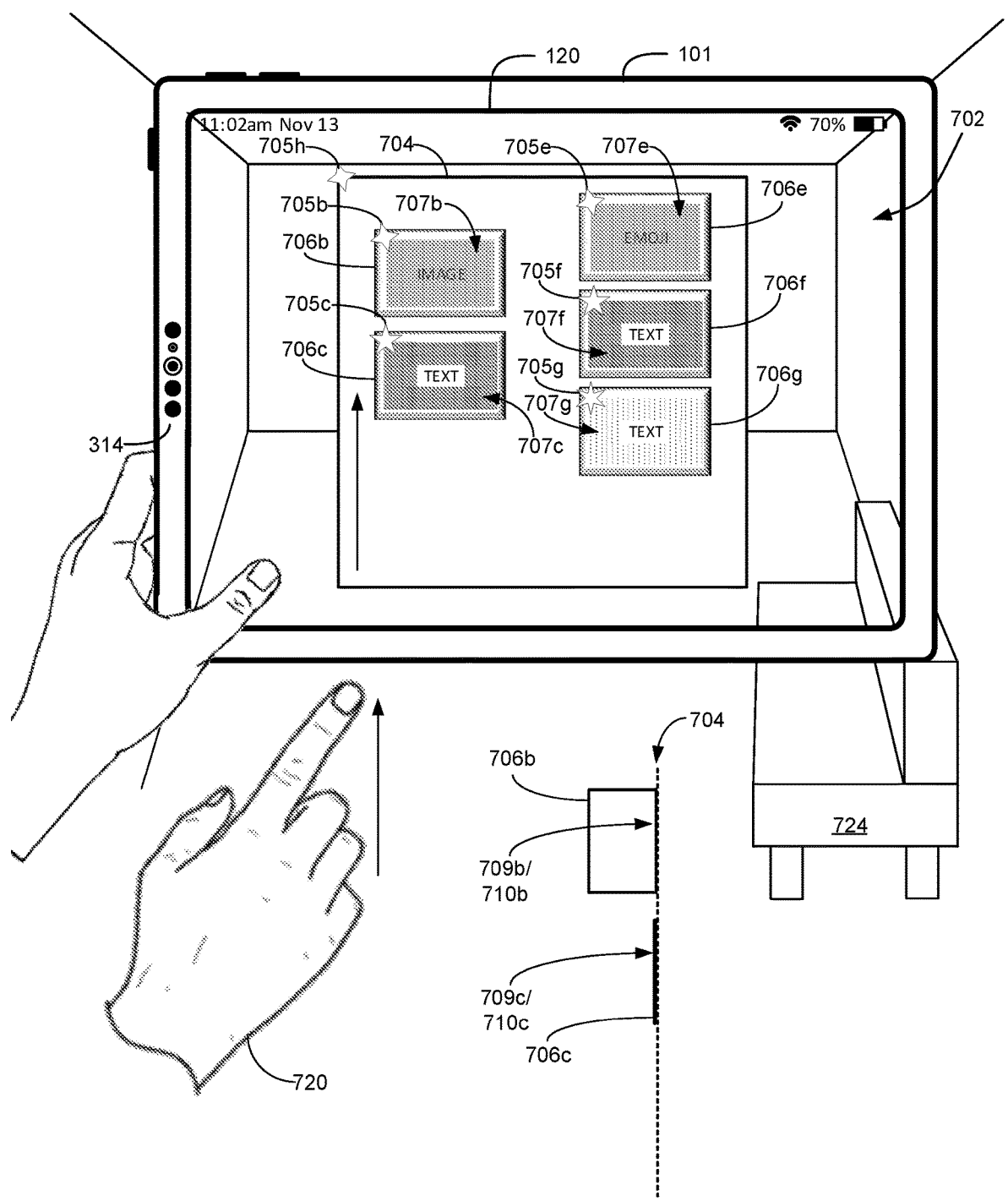

As an alternative example to the above, from FIG. 7A to 7C, the spatial arrangement of user interface 704 and/or representations 706*a*-706*g* has changed relative to the simulated light sources and/or the viewpoint of the user due to a scrolling of representations 706*a*-706*g* in user interface 704, such as from an upward scrolling input provided by hand 720 (described in more detail with reference to method 800). In response to the above change in spatial arrangement, computer system 101 has scrolled representations 706*a* and 706*b* up and out of user interface 704, and has scrolled representations 706*b*-706*c*, 706*e*-706*g* up in user interface 704, and displays specular lighting effects 705*b*-705*c*, 705*e*-705*g* and/or surface lighting effects 707*b*-707*c*, 707*e*-707*g* with different visual appearances as compared with FIG. 7A, such as shown in FIG. 7C. For example, in FIG. 7C specular lighting effect 705*c* remains on the upper-left corner of representation 706*c*, but has a lower intensity, smaller size and/or more diffusivity as compared with specular lighting effect 705*c* in FIG. 7A (e.g., due to the change in spatial arrangement of representation 706*c* relative to the simulated light sources and/or the viewpoint of the user). Similarly, the visual appearance of surface lighting effect 707*c* on representation 706*c* has changed as compared with FIG. 7A (e.g., due to the change in spatial arrangement of representation 706*c* relative to the simulated light sources and/or the viewpoint of the user). The visual appearances of specular lighting effects 705*b*, 705*e*-*g* and/or surface lighting effects 707*b*, 707*e*-*g* have optionally similarly changed from FIG. 7A to FIG. 7C, as illustrated in FIG. 7C. Further, in FIG. 7C, representations 706*b*-706*c* are positioned on the surface of user interface 704 as shown in the side view, optionally because no input is directed to the representations 706*b*-706*c* from hand 720.

Figure 7D:
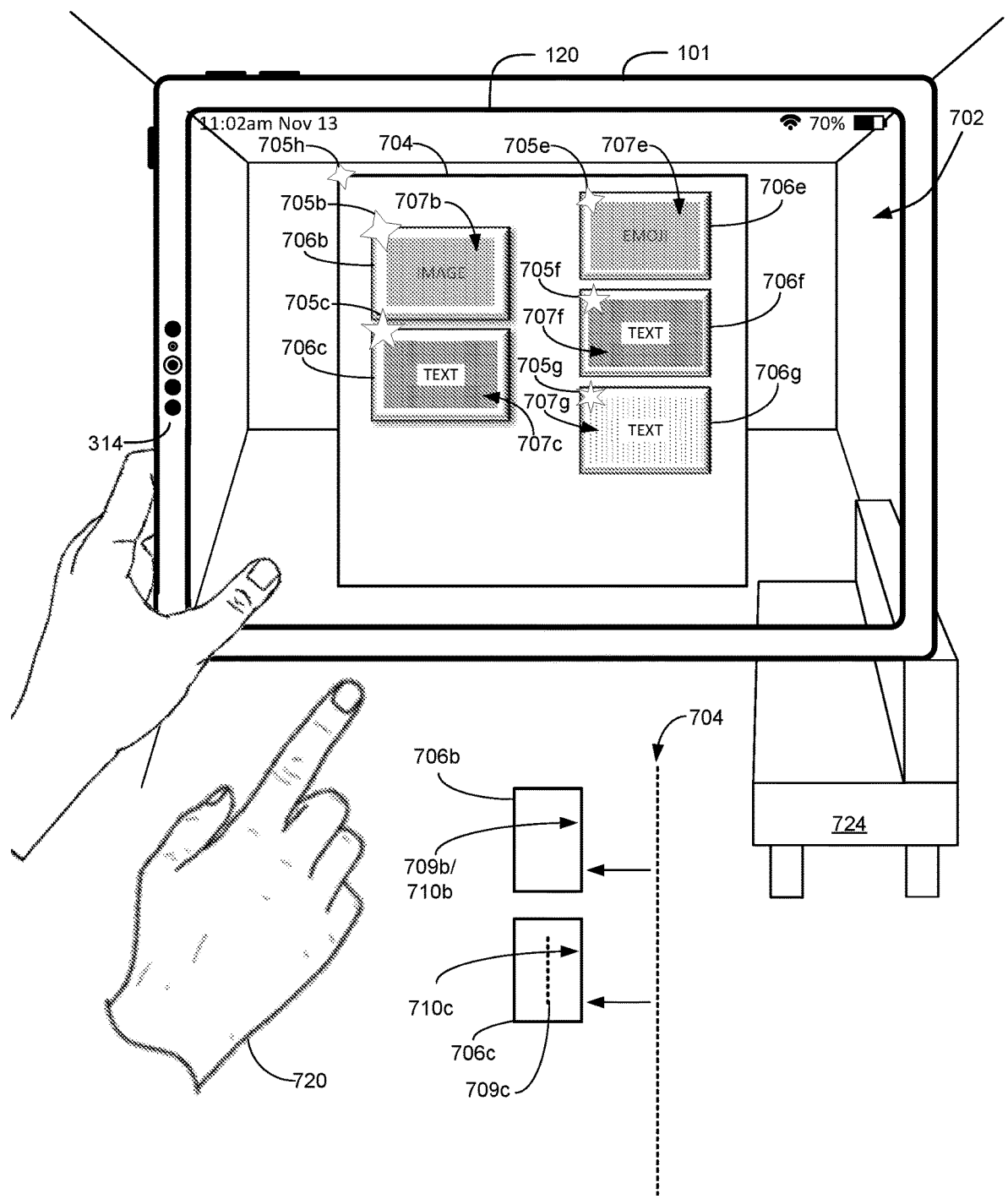
Figure 8A:
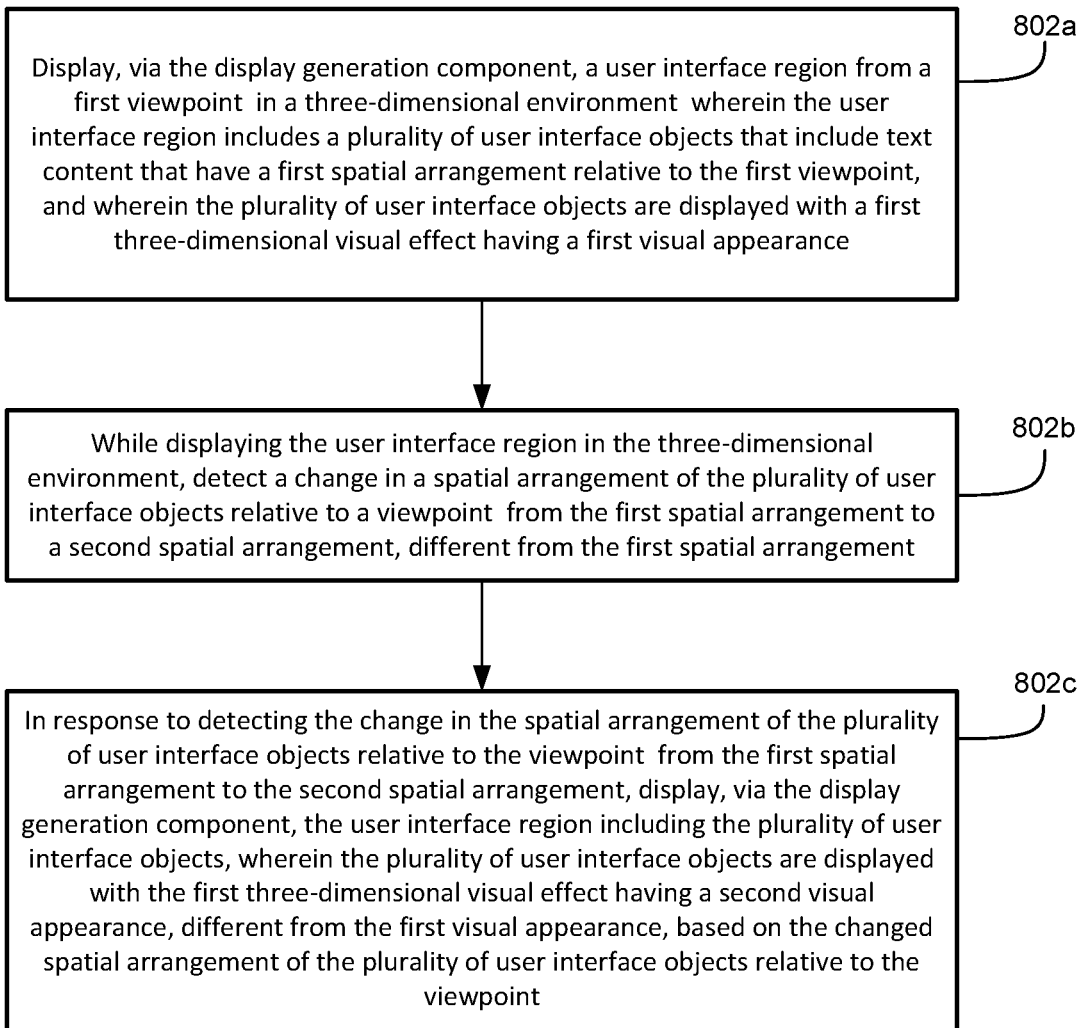
FIGS. 8A-8L is a flowchart illustrating an exemplary method of changing the visual appearance of user interface objects in accordance with some embodiments.
Figure 8B:
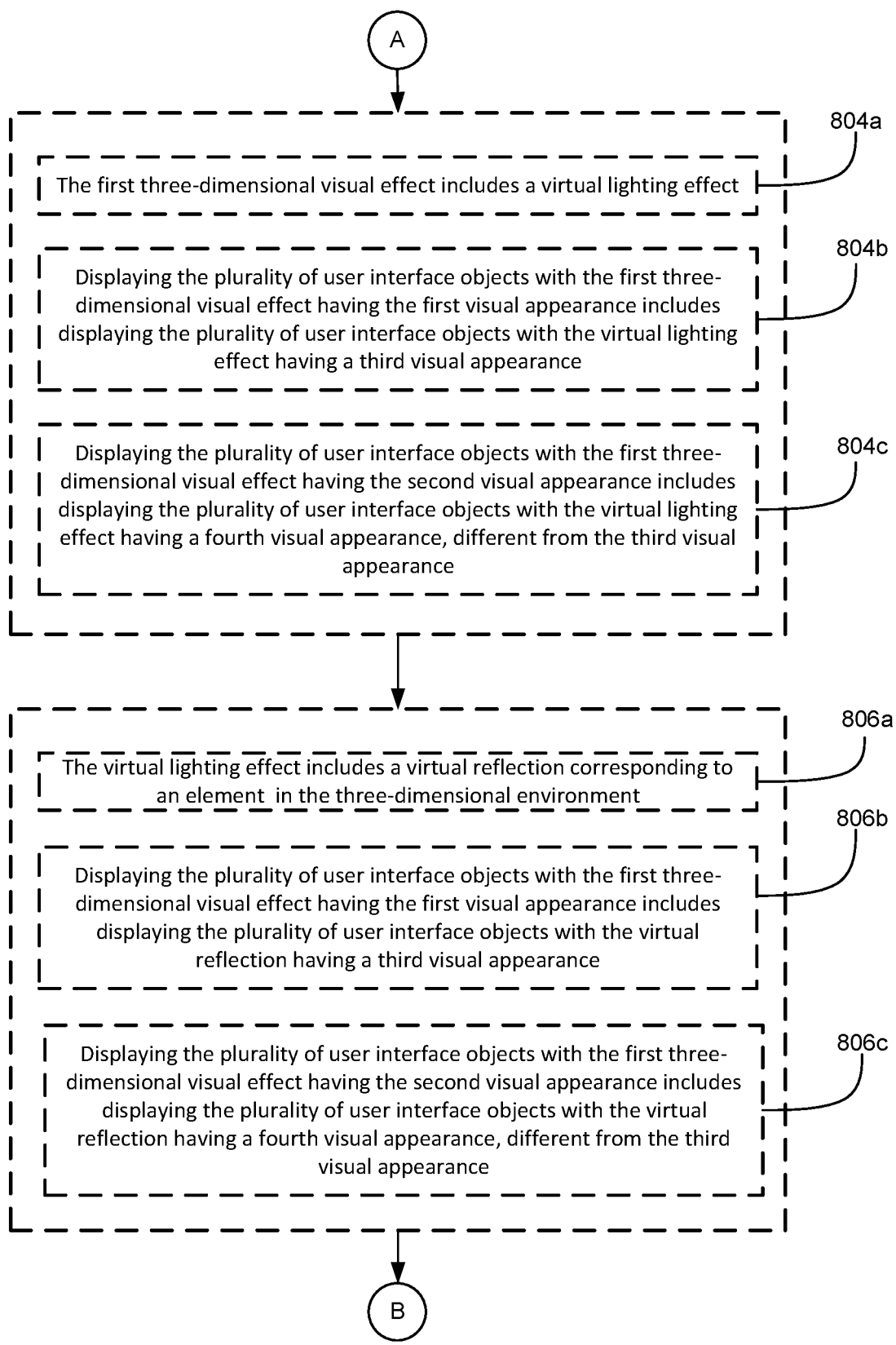
Figure 8C:
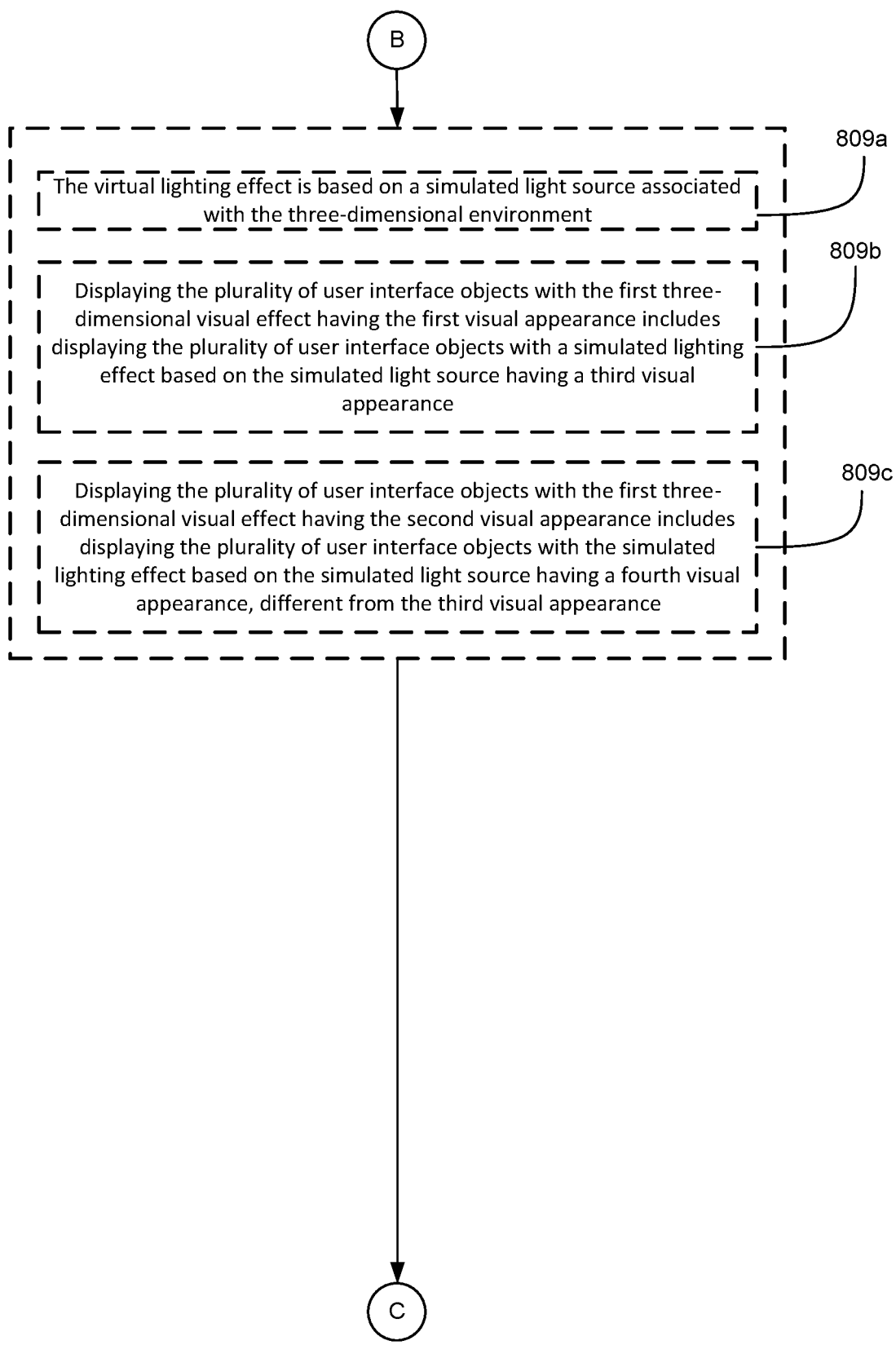
Figure 8D:
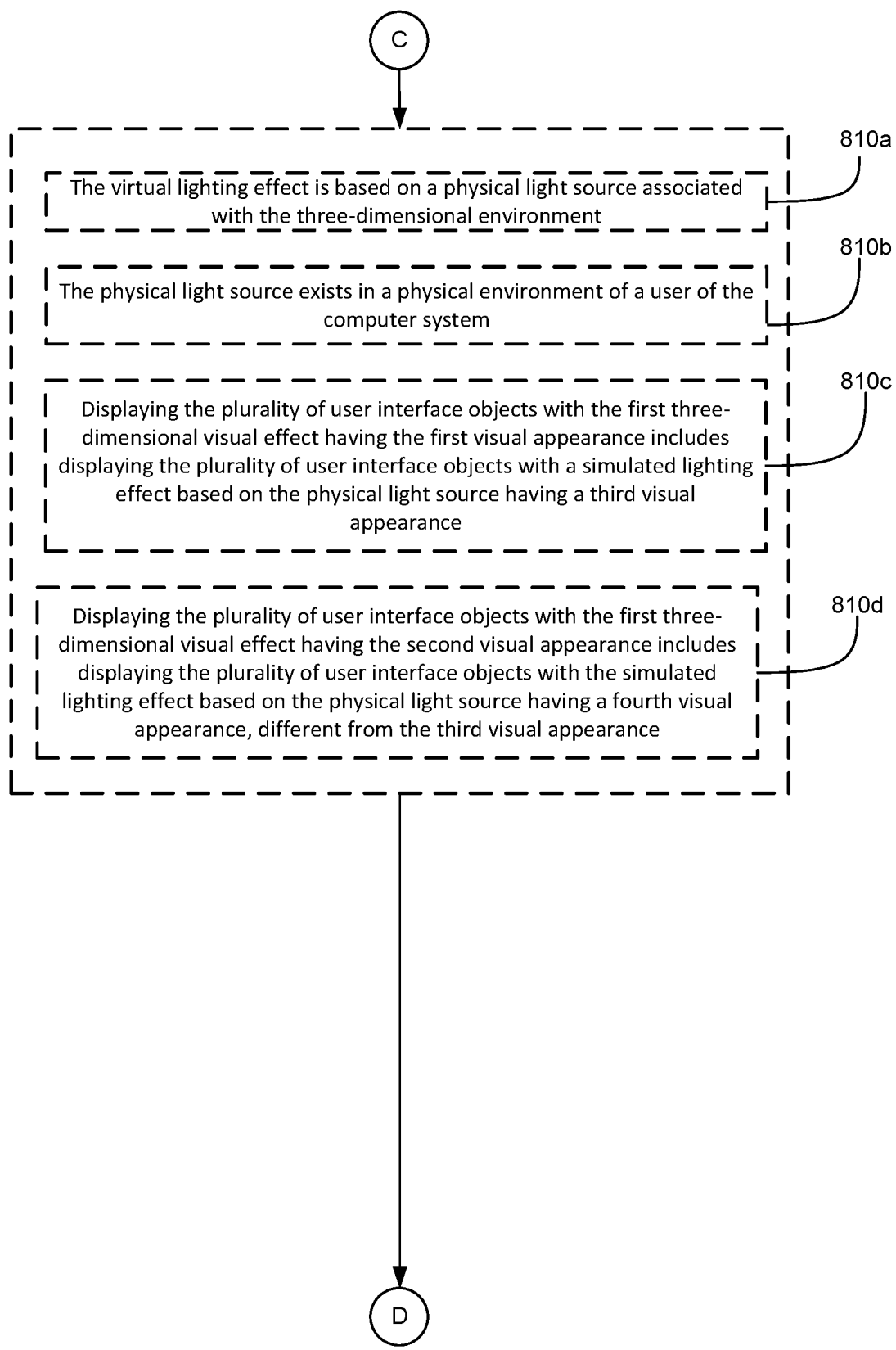
Figure 8E:
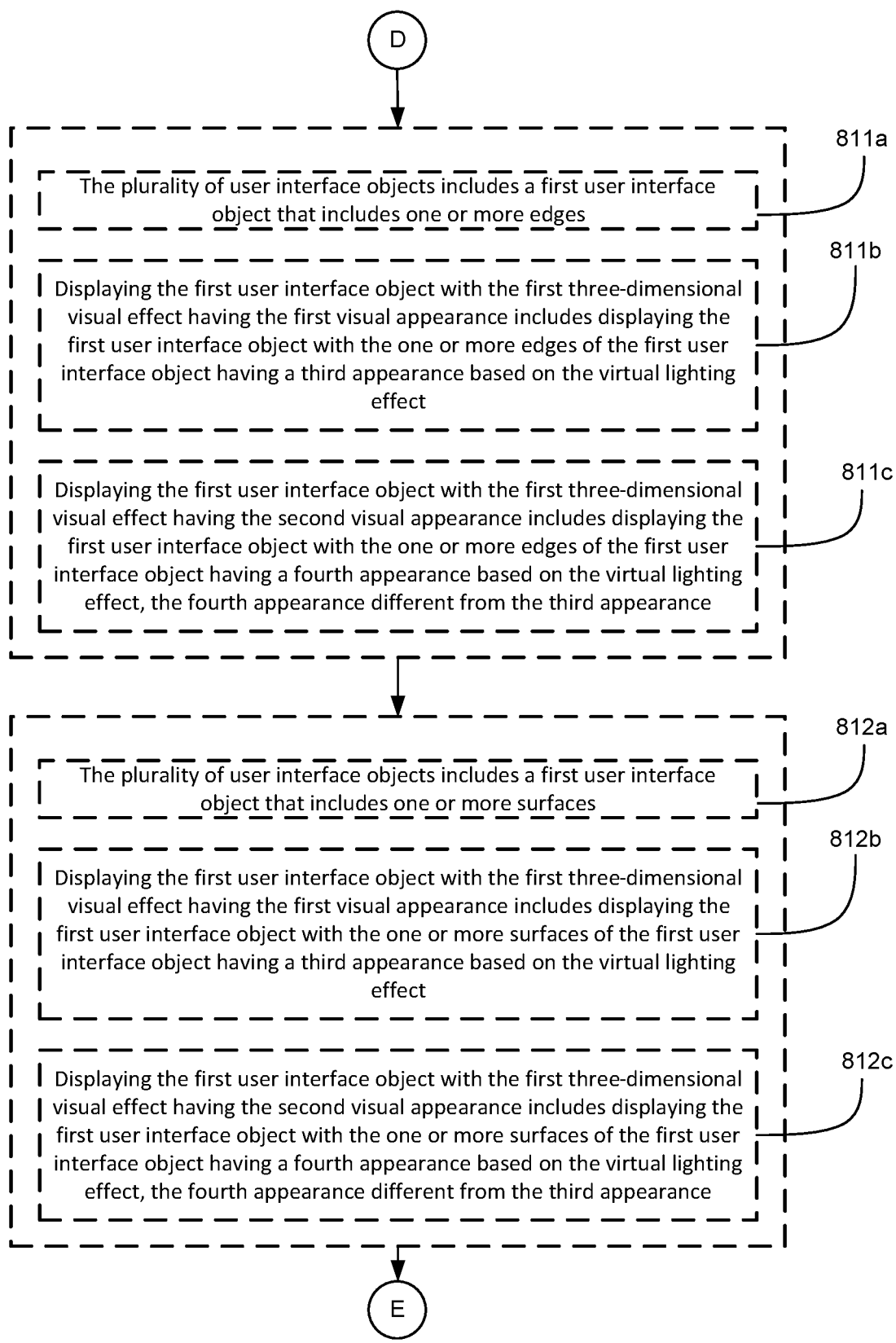
Figure 8F:
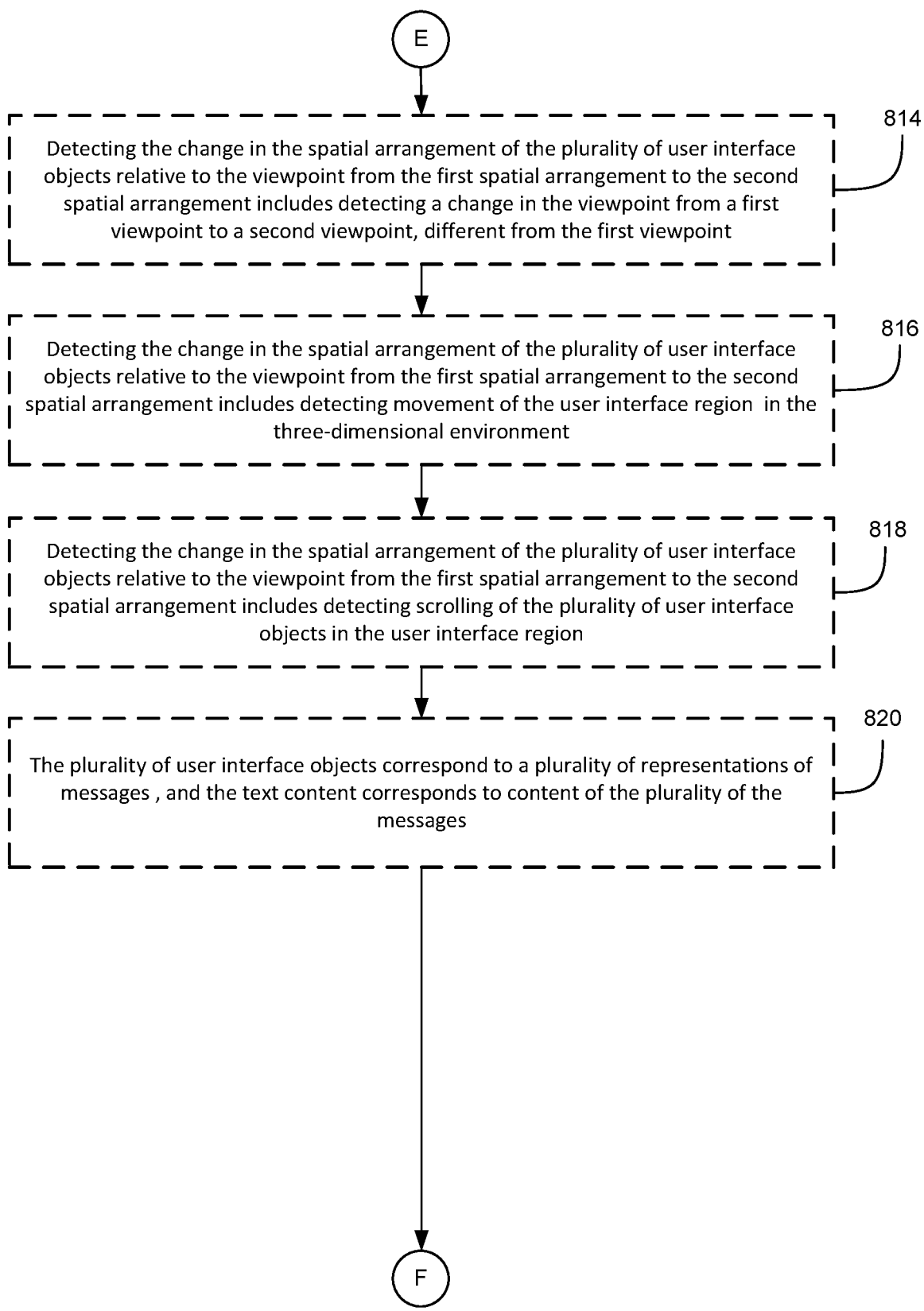
Figure 8G:
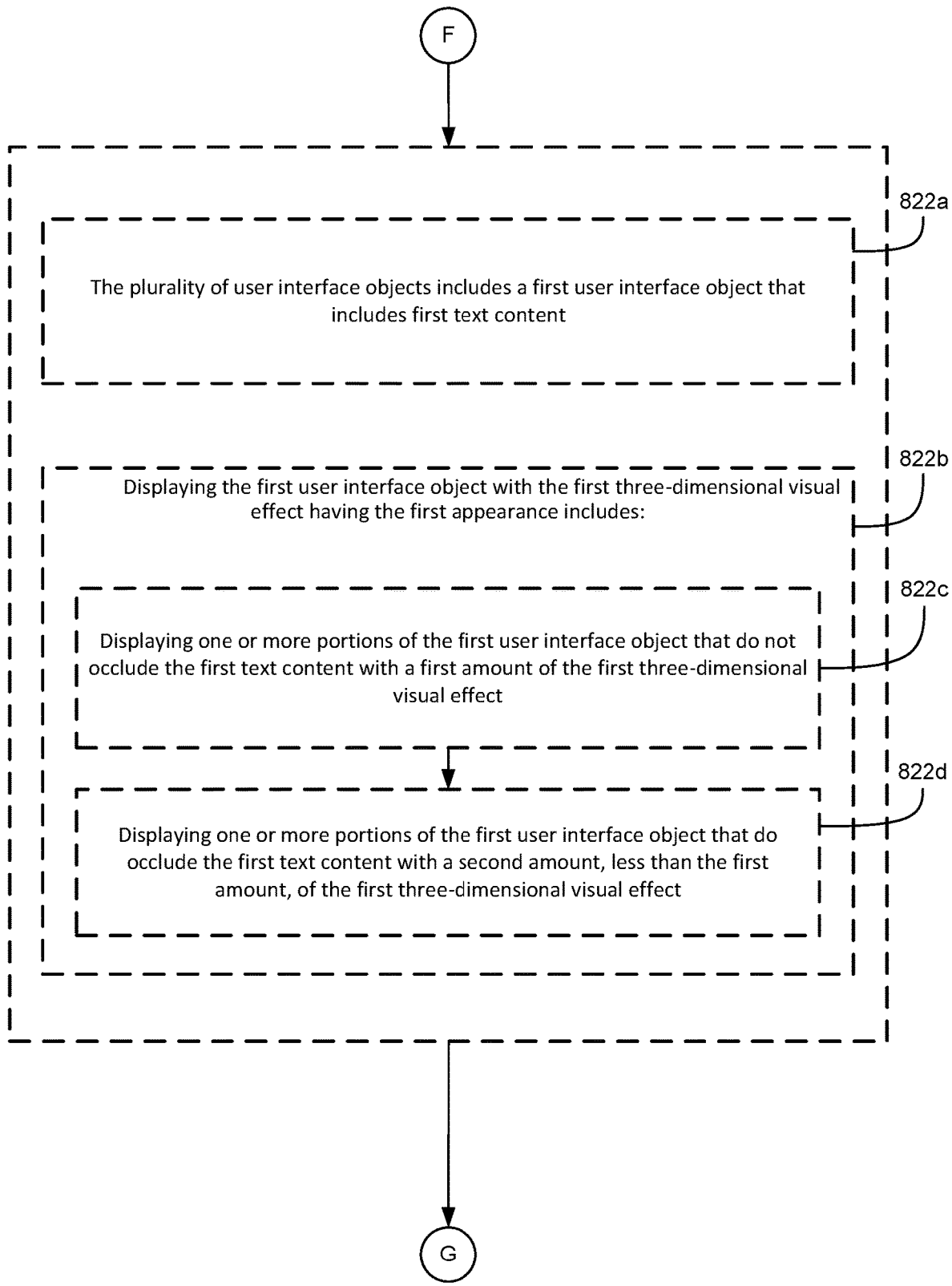
Figure 8H:
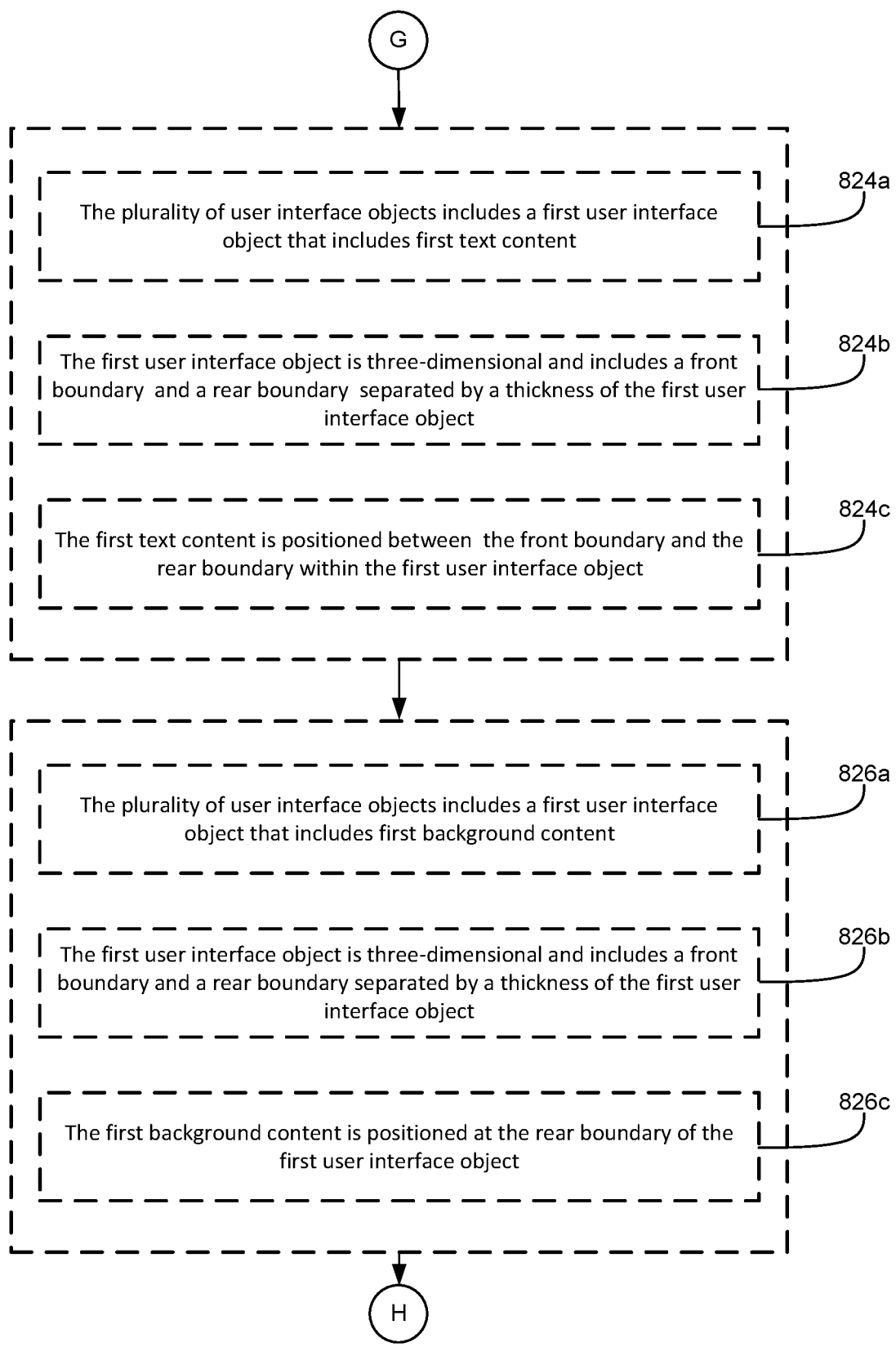
Figure 8I:
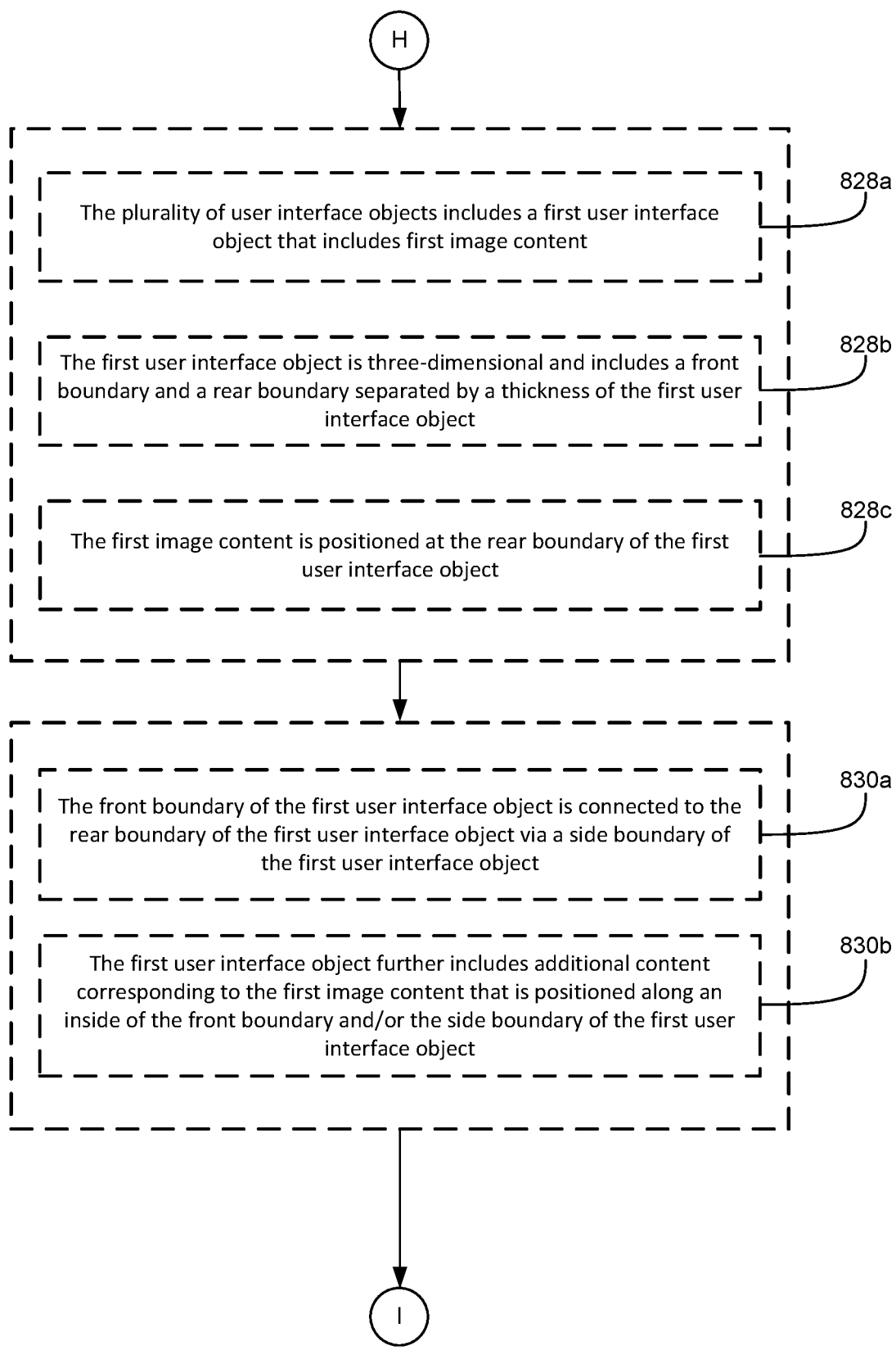
Figure 8J:
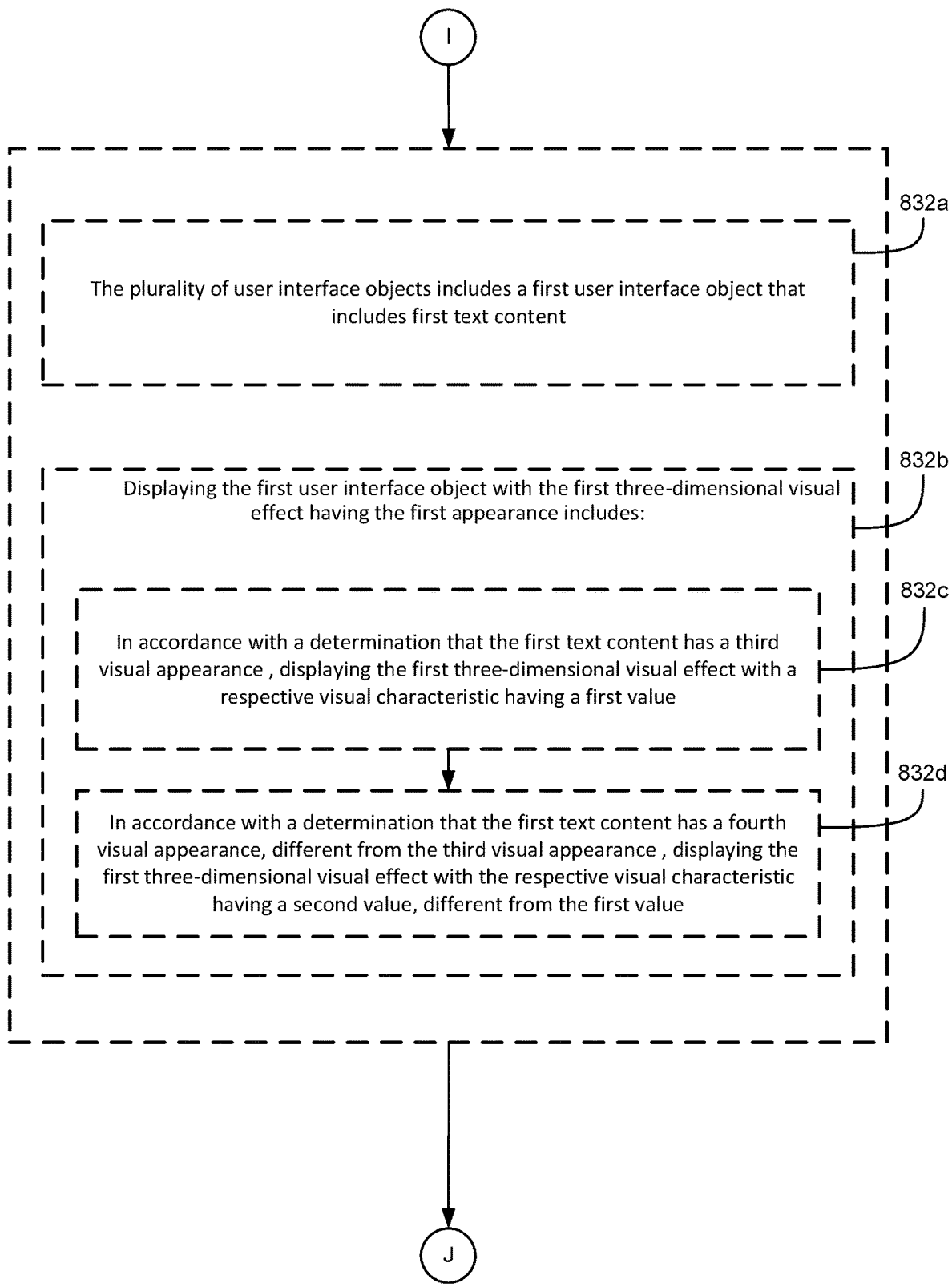
Figure 8K:
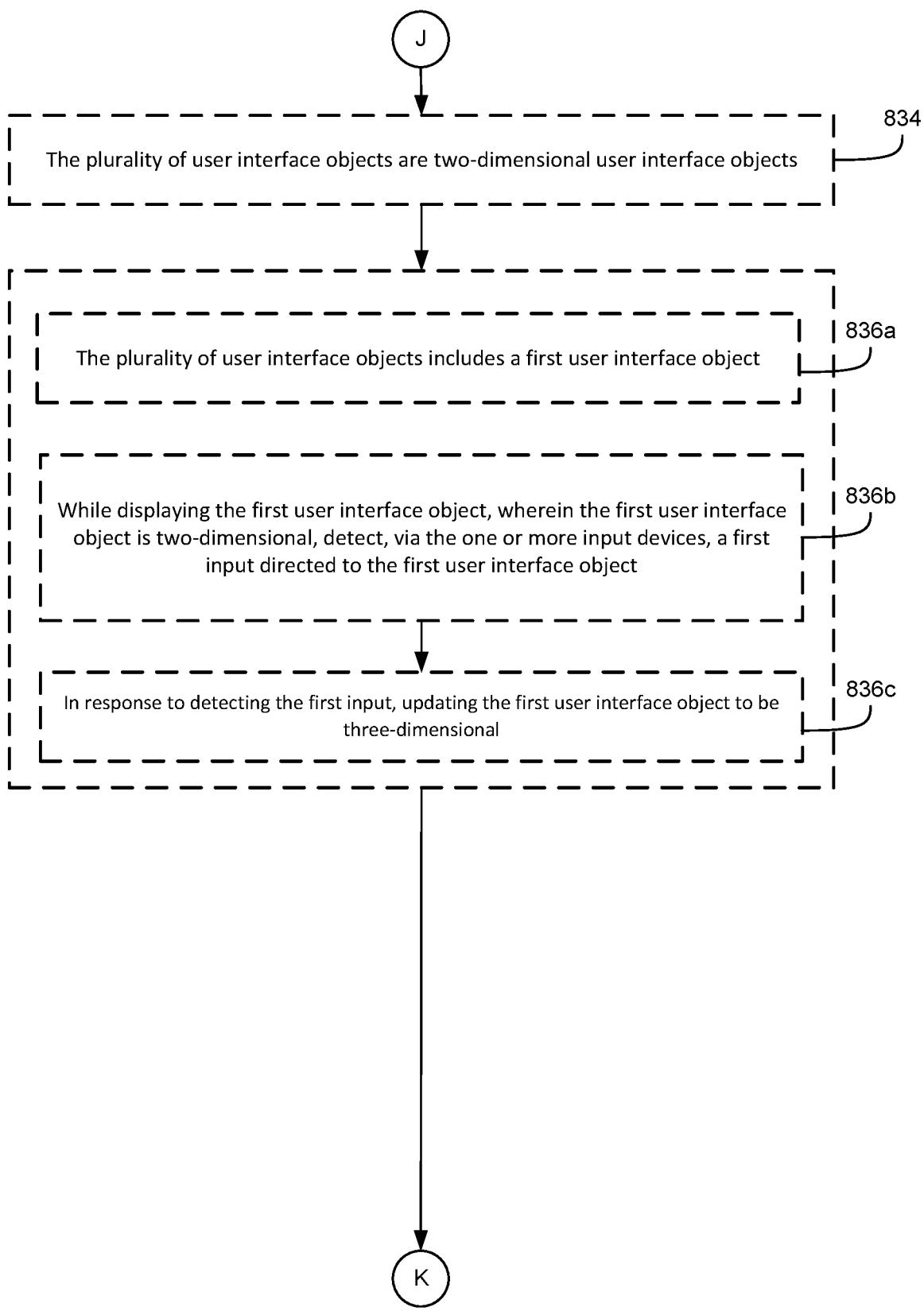
Figure 8L:
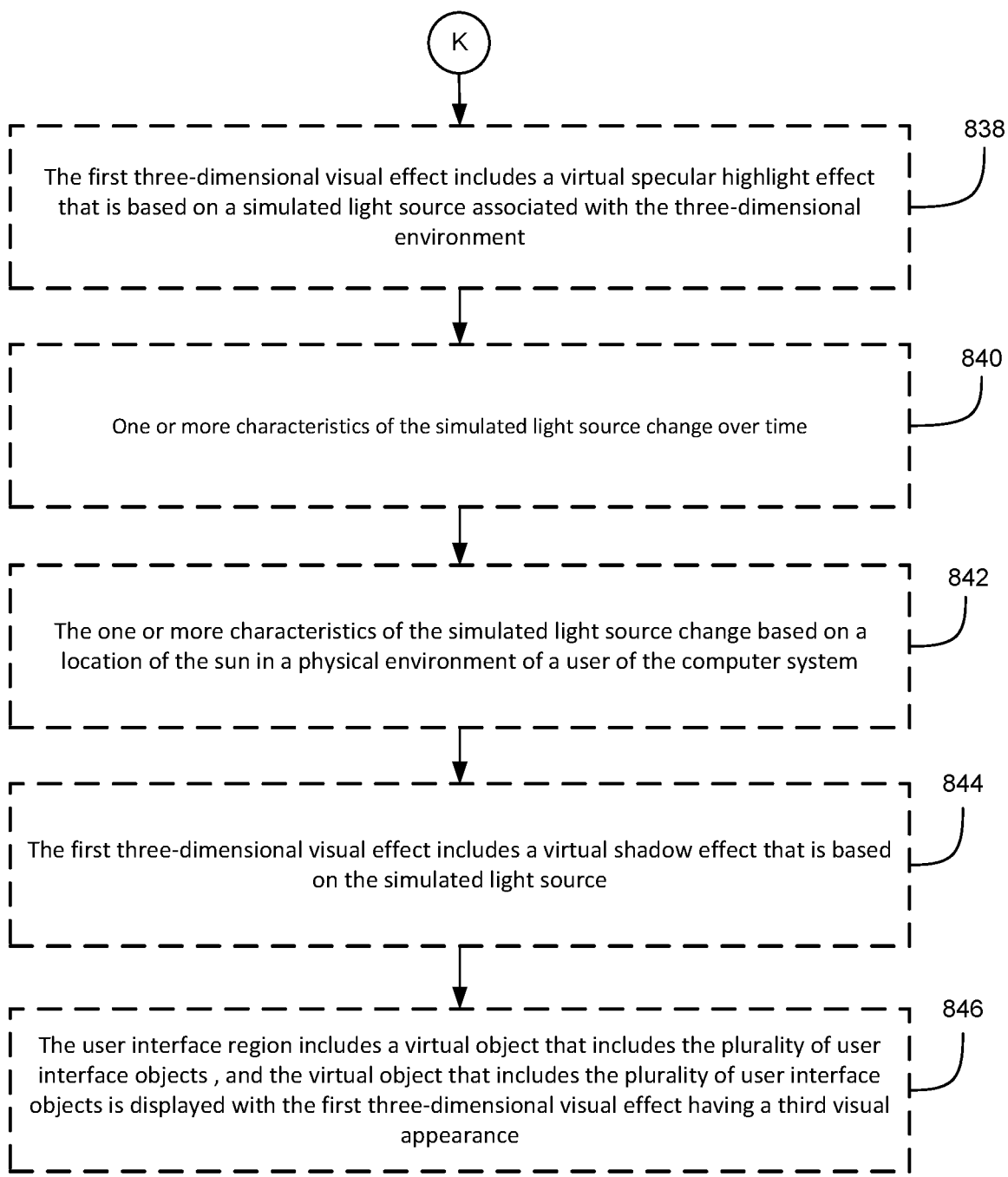

Another example of the changed spatial arrangement of user interface 704 and/or representations 706*a*-706*g* relative to the simulated light sources and/or the viewpoint of the user is shown in FIG. 7D, in which representations 706*b* and 706*c* have moved away from the surface of user interface 704 and/or towards the viewpoint of the user, such as in response to input provided by hand 720 (e.g., as described in more detail with reference to method 800). In some embodiments, such input is directed to representations 706*b* and 706*c* individually, and computer system 101 responds as described below with respect to representations 706*b* and 706*c* individually (rather than concurrently). In some embodiments, in response to input directed to representation 706*c*, representation 706*c* moves towards the viewpoint of the user (and/or away from the surface of user interface 704) and becomes three-dimensional rather than two-dimensional, as shown in the side view of FIG. 7D; representation 706*b* optionally also moves towards the viewpoint of the user (and/or away from the surface of user interface 704) in response to input directed to representation 706*b*, as shown in the side view in of FIG. 7D. Further, because representation 706*c* is now three-dimensional, text content 709*c* of representation 706*c* is optionally positioned within representation 706*c*, as opposed to on one or more surfaces of representation 706*c* (e.g., such as in FIG. 7A when representation 706*c* was two-dimensional).

In some embodiments, in response to moving away from the surface of user interface 704, computer system displays simulated shadows cast by representations 706*b* and/or 706*c* onto user interface 704 and/or other representations of messages in user interface 704, as shown in FIG. 7D. Further, in some embodiments, the visual appearances of specular lighting effects 705*b*, 705*c* and/or surface lighting effects 707*b*, 707*c* are changed by computer system 101 in response to moving away from the surface of user interface 704. For example, from FIG. 7C to 7D, specular lighting effects 705*b*, 705*c* have optionally become brighter, more intense, larger and/or less diffusive, and are optionally brighter, more intense, larger and/or less diffusive than specular lighting effects 705*e*, 705*f*, for example. Additional or alternative changes to the visual appearances of representations 706*a*-706*g* and/or user interface 704 due to a change in spatial arrangement of those virtual objects relative to the simulated light sources and/or the viewpoint of the user are described with reference to method 800.

FIGS. 8A-8L is a flowchart illustrating an exemplary method 800 of changing the visual appearance of user interface objects in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system (e.g., 101) in communication with a display generation component (e.g., 120) and one or more input devices. For example, a mobile device (e.g., a tablet, a smartphone, a media player, or a wearable device), or a computer or other electronic device. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users. In some embodiments, the one or more input devices include an electronic device or component capable of receiving a user input (e.g., capturing a user input, and/or detecting a user input) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor). In some embodiments, the computer system is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, the computer system displays (802a), via the display generation component, a user interface region from a first viewpoint (e.g., of a user and/or of the display generation component) in a three-dimensional environment, such as shown in FIG. 7A (e.g., the three-dimensional environment is an extended reality (XR) environment, such as a virtual reality (VR) environment, a mixed reality (MR) environment, or an augmented reality (AR) environment), wherein the user interface region includes a plurality of user interface objects that include text content that have a first spatial arrangement relative to the first viewpoint, such as objects 706 in FIG. 7A, and wherein the plurality of user interface objects are displayed with a first three-dimensional visual effect having a first visual appearance, such as effects 705 and/or 707 and/or the simulated or real thicknesses of objects 706 in FIG. 7A. In some embodiments, the user interface region is or includes a user interface of an application accessible by the computer system, such as a word processing application with a plurality of words, an application launch user interface with a plurality of application icons, a photo management application with a plurality of representations of photos, a spreadsheet application with a plurality of data cells, a presentation application with a plurality of slides or other graphical user interface objects, a messaging application with a plurality of message and/or an email application with a plurality of emails. In some embodiments, the user interface region includes messaging (e.g., text messaging) representations or bubbles corresponding to messages that have been transmitted between users, such as between a user of the computer system and one or more users of one or more other computer systems. Thus, in some embodiments, the user interface region is or includes a messaging conversation interface that displays representations of messages that have been transmitted to and/or within the messaging conversation between two or more users including the user of the computer system. In some embodiments, the plurality of user interface objects are a plurality of representations of such messages, and include text content corresponding to those messages. For example, a representation of a message corresponding to "Hello!" optionally includes the text "Hello!" displayed within the representation in the messaging user interface. In some embodiments, the representations of messages are displayed with the first three-dimensional visual effect (e.g., a specular lighting effect, a shadow effect, a reflection effect and/or other visual effects described later), causing the representations of messages to have a particular visual appearance (e.g., a three-dimensional appearance). In some embodiments, the first spatial arrangement corresponds to the placement and/or orientation of the representations of messages relative to the first viewpoint. In some embodiments, the three-dimensional environment includes virtual objects, such as application windows, operating system elements, representations of users other than the user of the computer system, representations of physical objects in the physical environment of the computer system, and/or one or more content items. In some embodiments, the representations of physical objects are views of the physical objects in the physical environment of the computer system that are visible through a transparent portion of the display generation component (e.g., true or real passthrough). In some embodiments, the computer system captures one or more images of the one or more physical objects in the physical environment of the computer system (e.g., via an image sensor of the one or more input devices), and in response, displays corresponding virtual representations (e.g., photo-realistic representations, simplified representations, or cartoon representations) of the one or more physical objects in the three-dimensional environment. In some embodiments, the computer system displays the three-dimensional environment from the viewpoint of the user at a location in the three-dimensional environment corresponding to the physical location of the computer system and/or display generation component and/or user in the physical environment of the computer system. In some embodiments, displaying the three-dimensional environment from the viewpoint of the user includes displaying the three-dimensional environment from a perspective associated with the location of the viewpoint of the user in the three-dimensional environment.

In some embodiments, while displaying the user interface region in the three-dimensional environment, the computer system detects (802b) a change in a spatial arrangement of the plurality of user interface objects relative to a viewpoint (e.g., of the user) from the first spatial arrangement to a second spatial arrangement, different from the first spatial arrangement, such as shown in FIG. 7B or 7C. For example, the positions and/or orientations of the plurality of user interface objects changes relative to the viewpoint of the user (e.g., due to movement of the viewpoint of the user and/or due to movement of the user interface region and/or user interface objects in the three-dimensional environment, as described in more detail later.).

In some embodiments, in response to detecting the change in the spatial arrangement of the plurality of user interface objects relative to the viewpoint (e.g., of the user) from the first spatial arrangement to the second spatial arrangement, the computer system displays (802c), via the display generation component, the user interface region including the plurality of user interface objects, wherein the plurality of user interface objects are displayed with the first three-dimensional visual effect having a second visual appearance, different from the first visual appearance, based on the changed spatial arrangement of the plurality of user interface objects relative to the viewpoint (e.g., of the user), such as the different effects 705 and/or 707 in FIG. 7B or 7C. For example, for a given user interface object in the plurality of user interface objects (and/or for one or more or all of the user interface objects in the plurality of user interface objects), the same three-dimensional visual effect with which the given user interface object is displayed (e.g., a specular lighting effect, a shadow effect, a reflection effect and/or other visual effects described later) has a different appearance (e.g., different size, different area, different brightness, different location and/or different color) on the given user interface object based on the updated position and/or orientation of the given user interface object relative to the viewpoint of the user, as will be described in more detail later. In some embodiments, the given user interface object (and/or one or more or all of the user interface objects in the plurality of user interface objects) is displayed with multiple different three-dimensional visual effects, and the visual appearances of those three-dimensional visual effects change (optionally differently) in response to the changed spatial arrangement of the plurality of user interface objects relative to the viewpoint of the user. In some embodiments, the change from the first visual appearance to the second visual appearance of the first three-dimensional visual effect is different from and optionally in addition to the change in perceived shape or size (from the viewpoint of the user) of the plurality of user interface objects due to the changed spatial arrangement relative to the viewpoint of the user (e.g., different from the plurality of user interface objects looking smaller from the viewpoint of the user due to being further from the viewpoint of the user and/or different from a shape of the area of the field of view of the user consumed by the plurality of user interface objects changing due to the plurality of objects having a different orientation (e.g., tilt) relative to the viewpoint of the user). Displaying user interface objects that include text content with dynamic three-dimensional visual effects conveys the relative placement and/or orientations of those objects to the user and avoids errors in user interaction with the computer system.

In some embodiments, the first three-dimensional visual effect includes a virtual lighting effect (804*a*), such as effects 705 or 707 in FIG. 7A. For example, a visual effect that is generated by the computer system and corresponds to one or more visual effects that result from one or more light sources illuminating the plurality of user interface objects, as will be described in more detail below.

In some embodiments, displaying the plurality of user interface objects with the first three-dimensional visual effect having the first visual appearance includes displaying the plurality of user interface objects with the virtual lighting effect having a third visual appearance (804*b*), such as the appearances of effects 705 or 707 in FIG. 7A. For example, displaying one or more surfaces or edges of the plurality of user interface objects with a first amount, first color, first shape, and/or first brightness of virtual lighting from one or more light sources.

In some embodiments, displaying the plurality of user interface objects with the first three-dimensional visual effect having the second visual appearance includes displaying the plurality of user interface objects with the virtual lighting effect having a fourth visual appearance, different from the third visual appearance (804*c*), such as the appearances of effects 705 or 707 in FIG. 7B or 7C. For example, displaying the one or more surfaces or edges of the plurality of user interface objects with a second amount, second color, second shape, and/or second brightness of virtual lighting from one or more light sources. In some embodiments, the difference in the visual appearance of the virtual lighting effect is due to the changed spatial arrangement of the plurality of user interface objects relative to the one or more light sources and/or viewpoint of the user. Displaying the user interface objects with a dynamic virtual lighting effect conveys the relative placement and/or orientations of those objects to the user and avoids errors in user interaction with the computer system.

In some embodiments, the virtual lighting effect includes a virtual reflection corresponding to an element (e.g., a physical object, a virtual object and/or a light source) in the three-dimensional environment (806*a*), such as a reflection shown on the surface(s) and/or edge(s) of object(s) 706 in FIG. 7A. For example, a reflection of a light source, another virtual object (optionally one or more of the plurality of user interface objects), and/or a physical object that is displayed on one or more edges or surfaces of one or more of the plurality of user interface objects.

In some embodiments, displaying the plurality of user interface objects with the first three-dimensional visual effect having the first visual appearance includes displaying the plurality of user interface objects with the virtual reflection having a third visual appearance (806*b*), such as a reflection shown on the surface(s) and/or edge(s) of object(s) 706 in FIG. 7A. For example, the reflection corresponding to the element is displayed with a first size, a first brightness, a first intensity, a first color, a first level of diffusion, and/or at a first location on one or more of the plurality of user interface objects.

In some embodiments, displaying the plurality of user interface objects with the first three-dimensional visual effect having the second visual appearance includes displaying the plurality of user interface objects with the virtual reflection having a fourth visual appearance, different from the third visual appearance (806*c*), such as a reflection shown on the surface(s) and/or edge(s) of object(s) 706 in FIG. 7B or FIG. 7C. For example, the reflection corresponding to the element is displayed with a second size, a second brightness, a second intensity, a second color, a second level of diffusion, and/or at a second location on one or more of the plurality of user interface objects. In some embodiments, the difference in the visual appearance of the virtual reflection is due to the changed spatial arrangement of the plurality of user interface objects relative to the one or more light sources and/or viewpoint of the user. Displaying the user interface objects with a dynamic virtual reflection effect conveys the relative placement and/or orientations of those objects to the user and avoids errors in user interaction with the computer system.

In some embodiments, the virtual lighting effect is based on a simulated light source associated with the three-dimensional environment (809*a*), such as if effects 705 or 707 in FIG. 7A are based on a simulated light source. For example, the computer system displays the three-dimensional environment with lighting based on one or more light sources that do not exist in the physical environment of the user (e.g., a virtual lamp as a light source, and/or a virtual sun or moon as a light source). In some embodiments, the virtual lighting effect from such simulated light sources is displayed on one or more edges or surfaces of one or more of the plurality of user interface objects.

In some embodiments, displaying the plurality of user interface objects with the first three-dimensional visual effect having the first visual appearance includes displaying the plurality of user interface objects with a simulated lighting effect based on the simulated light source having a third visual appearance (809*b*), such as the appearances of effects 705 or 707 in FIG. 7A based on a simulated light source. For example, the simulated lighting effect is displayed with a first size, a first brightness, a first intensity, a first color, a first level of diffusion, and/or at a first location on one or more of the plurality of user interface objects based on one or more characteristics of the simulated light source(s) (e.g., color of the light source, placement of the light source in the three-dimensional environment, brightness of the light source and/or size or shape of the light source).

In some embodiments, displaying the plurality of user interface objects with the first three-dimensional visual effect having the second visual appearance includes displaying the plurality of user interface objects with the simulated lighting effect based on the simulated light source having a fourth visual appearance, different from the third visual appearance (809*c*), such as the appearances of effects 705 or 707 in FIG. 7B or FIG. 7C based on a simulated light source. For example, the simulated lighting effect is displayed with a second size, a second brightness, a second intensity, a second color, a second level of diffusion, and/or at a second location on one or more of the plurality of user interface objects based on the one or more characteristics of the simulated light source(s). In some embodiments, the difference in the visual appearance of the simulated lighting effect is due to the changed spatial arrangement of the plurality of user interface objects relative to the one or more light sources and/or viewpoint of the user. Displaying the user interface objects with a dynamic simulated lighting effect conveys the relative placement and/or orientations of those objects to the user and avoids errors in user interaction with the computer system.

In some embodiments, the virtual lighting effect is based on a physical light source associated with the three-dimensional environment (810*a*), such as if effects 705 or 707 in FIG. 7A are based on a physical light source in the physical environment of computer system 101. For example, the computer system displays the three-dimensional environment with lighting based on one or more light sources that do exist in the physical environment of the user (e.g., a physical lamp as a light source, and/or the sun or moon as a light source). In some embodiments, the computer system detects (e.g., using one or more cameras or sensors) the location, direction, color, and/or intensity of such physical light sources and determines out how to create the virtual lighting effects based on that determination. In some embodiments, the virtual lighting effect from such physical light sources is displayed on one or more edges or surfaces of one or more of the plurality of user interface objects. In some embodiments, the computer system uses one or more sensors, cameras and/or other sources of information to identify the physical light source(s) in the physical environment of the user, and displays the three-dimensional environment with lighting based on one or more simulated light sources that correspond to the one or more physical light sources.

In some embodiments, the physical light source exists in a physical environment of a user of the computer system (810*b*) (e.g., in the physical environment of the computer system, display generation component and/or user). In some embodiments, displaying the plurality of user interface objects with the first three-dimensional visual effect having the first visual appearance includes displaying the plurality of user interface objects with a simulated lighting effect based on the physical light source having a third visual appearance (810*c*), such as the appearances of effects 705 or 707 in FIG. 7A based on a physical light source. For example, the simulated lighting effect is displayed with a first size, a first brightness, a first intensity, a first color, a first level of diffusion, and/or at a first location on one or more of the plurality of user interface objects based on one or more characteristics of the physical and/or corresponding simulated light source(s) (e.g., color of the light source, placement of the light source in the three-dimensional environment, brightness of the light source and/or size or shape of the light source).

In some embodiments, displaying the plurality of user interface objects with the first three-dimensional visual effect having the second visual appearance includes displaying the plurality of user interface objects with the simulated lighting effect based on the physical light source having a fourth visual appearance, different from the third visual appearance (810*d*), such as the appearances of effects 705 or 707 in FIG. 7B or FIG. 7C based on a physical light source. For example, the simulated lighting effect is displayed with a second size, a second brightness, a second intensity, a second color, a second level of diffusion, and/or at a second location on one or more of the plurality of user interface objects based on one or more characteristics of the physical and/or corresponding simulated light source(s) (e.g., color of the light source, placement of the light source in the three-dimensional environment, brightness of the light source and/or size or shape of the light source). In some embodiments, the difference in the visual appearance of the simulated lighting effect is due to the changed spatial arrangement of the plurality of user interface objects relative to the one or more physical and/or corresponding simulated light sources and/or viewpoint of the user. Displaying the user interface objects with a dynamic simulated lighting effect based on physical light source(s) conveys the relative placement and/or orientations of those objects to the user and relative to the physical environment of the user, and avoids errors in user interaction with the computer system.

In some embodiments, the plurality of user interface objects includes a first user interface object that includes one or more edges (811*a*), such as the edges of objects 706 in FIG. 7A. For example, the first user interface object is optionally a representation of a message (e.g., a message bubble) that has one or more edges, such as upper, lower, right and/or left edges. The edges of the first user interface object are optionally aligned with and/or extend along one or more planes (planes that are optionally not visible in the three-dimensional environment) that intersect with one or more planes (planes that are optionally not visible in the three-dimensional environment) with which one or more surfaces of the first user interface object are aligned and/or along which the one or more surfaces extend. In some embodiments, the one or more surfaces are front and back surfaces of the representation of the message. In some embodiments, the edges are one-dimensional, and correspond to where two or more of the surfaces of the first user interface object come together and intersect.

In some embodiments, displaying the first user interface object with the first three-dimensional visual effect having the first visual appearance includes displaying the first user interface object with the one or more edges of the first user interface object having a third appearance based on the virtual lighting effect (811*b*), such as the edge(s) being displayed with effects 705 in FIG. 7A. For example, the virtual lighting effect is displayed with a first size, a first brightness, a first intensity, a first color, a first level of diffusion, and/or at a first location on one or more of the edges of the plurality of user interface objects.

In some embodiments, displaying the first user interface object with the first three-dimensional visual effect having the second visual appearance includes displaying the first user interface object with the one or more edges of the first user interface object having a fourth appearance based on the virtual lighting effect, the fourth appearance different from the third appearance (811*c*), such as the edge(s) being displayed with effects 705 in FIG. 7B or FIG. 7C. For example, the virtual lighting effect is displayed with a second size, a second brightness, a second intensity, a second color, a second level of diffusion, and/or at a second location on one or more of the edges of the plurality of user interface objects. In some embodiments, the difference in the visual appearance of the virtual lighting effect on the one or more edges is due to the changed spatial arrangement of the plurality of user interface objects relative to the viewpoint of the user. Displaying the user interface objects with a dynamic virtual lighting effect on edges of the user interface objects conveys the relative placement and/or orientations of those objects to the user and avoids errors in user interaction with the computer system.

In some embodiments, the plurality of user interface objects includes a first user interface object that includes one or more surfaces (812*a*), such as the surfaces of objects 706 in FIG. 7A. For example, the first user interface object is optionally a representation of a message (e.g., a message bubble) that has one or more surfaces, such as front and back surfaces of the representation of the message (e.g., the front surface is of the first user interface object is optionally the surface through which the content, such as text or image content, of the message is visible).

In some embodiments, displaying the first user interface object with the first three-dimensional visual effect having the first visual appearance includes displaying the first user interface object with the one or more surfaces of the first user interface object having a third appearance based on the virtual lighting effect (812*b*), such as the surface(s) being displayed with effects 707 in FIG. 7A. For example, the virtual lighting effect is displayed with a first size, a first brightness, a first intensity, a first color, a first level of diffusion, and/or at a first location on one or more of the surfaces of the plurality of user interface objects.

In some embodiments, displaying the first user interface object with the first three-dimensional visual effect having the second visual appearance includes displaying the first user interface object with the one or more surfaces of the first user interface object having a fourth appearance based on the virtual lighting effect, the fourth appearance different from the third appearance (812*c*), such as the surface(s) being displayed with effects 707 in FIG. 7B or FIG. 7C. For example, the virtual lighting effect is displayed with a second size, a second brightness, a second intensity, a second color, a second level of diffusion, and/or at a second location on one or more of the surfaces of the plurality of user interface objects. In some embodiments, the difference in the visual appearance of the virtual lighting effect on the one or more surfaces is due to the changed spatial arrangement of the plurality of user interface objects relative to the viewpoint of the user. Displaying the user interface objects with a dynamic virtual lighting effect on surfaces of the user interface objects conveys the relative placement and/or orientations of those objects to the user and avoids errors in user interaction with the computer system.

In some embodiments, detecting the change in the spatial arrangement of the plurality of user interface objects relative to the viewpoint from the first spatial arrangement to the second spatial arrangement includes detecting a change in the viewpoint from a first viewpoint to a second viewpoint, different from the first viewpoint (814), such as if the change from FIG. 7A to FIG. 7B was a result of the viewpoint of the user moving relative to the three-dimensional environment 702. For example, the computer system detects input (e.g., hand input, touch screen input and/or controller movement) from the user of the electronic device to move the position and/or orientation of the viewpoint of the user in the three-dimensional environment. For example, the input to move the viewpoint of the user in the three-dimensional environment optionally includes detecting one or more hands of the user performing pinch air gestures, and movement of the one or more hands while maintaining a pinch hand shape to cause the viewpoint of the user to move based on the movement (e.g., direction and/or magnitude) of the hand(s) of the user. In some embodiments, the input detected by the computer system to change the position and/or orientation of the viewpoint of the user includes detecting the user moving and/or changing orientation in the physical environment of the user (e.g., turning their head, turning their torso and/or walking around in the physical environment). Displaying the user interface objects with a dynamic three-dimensional effect based on changes to the viewpoint of the user conveys how the viewpoint of the user is changing relative to those objects, and avoids errors in user interaction with the computer system.

In some embodiments, detecting the change in the spatial arrangement of the plurality of user interface objects relative to the viewpoint from the first spatial arrangement to the second spatial arrangement includes detecting movement of the user interface region (e.g., messaging user interface) in the three-dimensional environment (816), such as the movement of user interface 704 from FIG. 7A to FIG. 7B. For example, in some embodiments, the computer system detects a hand gesture/input from the user of the computer system directed to the messaging user interface to move the messaging user interface (and the plurality of user interface objects contained within the user interface) in the three-dimensional environment, and moves the messaging user interface (and the plurality of user interface objects contained within the user interface) in the three-dimensional environment accordingly. In some embodiments, the input from the user includes an air pinch gesture performed by a hand of the user while the attention of the user is directed to the messaging user interface in which the index finger of the user and the thumb of the user come together and touch, followed by movement of the hand in the pinch hand shape in a direction and/or with a magnitude. The computer system optionally moves the messaging user interface in the three-dimensional environment with a magnitude and/or direction corresponding to the movement of the hand of the user. The input from the user optionally includes other types of inputs, such as trackpad inputs (e.g., finger touching the trackpad and moving in a direction and/or with a magnitude) or an input device input (e.g., movement of a handheld input device that detects direction and/or magnitude of movement of the input device while it is being held in the hand of the user). Thus, in some embodiments, the change in the spatial arrangement of the plurality of user interface objects relative to the viewpoint of the user results at least in part from a change in the location of the messaging user interface in the three-dimensional environment. Displaying the user interface objects with a dynamic three-dimensional effect based on changes to the location of the messaging user interface conveys how the locations of the objects are changing relative to the viewpoint, and avoids errors in user interaction with the computer system.

In some embodiments, detecting the change in the spatial arrangement of the plurality of user interface objects relative to the viewpoint from the first spatial arrangement to the second spatial arrangement includes detecting scrolling of the plurality of user interface objects in the user interface region (818), such as scrolling of objects 706 from FIG. 7A to FIG. 7C. For example, in some embodiments, the computer system detects a hand gesture/input from the user of the computer system directed to one or more user interface objects in the messaging user interface to scroll the user interface objects within the messaging user interface, and scrolls the user interface objects accordingly. In some embodiments, the input from the user includes an air pinch gesture performed by a hand of the user while the attention of the user is directed to one or more user interface object in the messaging user interface in which the index finger of the user and the thumb of the user come together and touch, followed by movement of the hand in the pinch hand shape in a direction and/or with a magnitude. The computer system optionally scrolls the user interface objects within the messaging user interface with a magnitude and/or direction corresponding to the movement of the hand of the user (e.g., scrolls the user interface objects upward if the hand moves upward, and scrolls the user interface objects downward if the hand moves downward). The input from the user optionally includes other types of inputs, such as trackpad inputs (e.g., finger touching the trackpad and moving in a direction and/or with a magnitude) or an input device input (e.g., movement of a handheld input device that detects direction and/or magnitude of movement of the input device while it is being held in the hand of the user). Thus, in some embodiments, the change in the spatial arrangement of the plurality of user interface objects relative to the viewpoint of the user results at least in part from a scrolling of the user interface objects within the messaging user interface. Displaying the user interface objects with a dynamic three-dimensional effect based on scrolling of the user interface objects conveys how the locations of the objects are changing relative to the viewpoint, and avoids errors in user interaction with the computer system.

In some embodiments, the plurality of user interface objects correspond to a plurality of representations of messages (e.g., messages that are transmitted from the computer system to one or more different computer systems and/or messages that are transmitted from one or more other computer systems to the computer systems), and the text content corresponds to content of the plurality of the messages (820), such as described with reference to objects 706 in FIG. 7A (e.g., the text content is the content of the messages transmitted to and/or from the computer system). For example, the user interface region is a messaging user interface that displays representations of messages that are part of a messaging conversation that includes the user of the computer system and one or more other users of other computer systems. In some embodiments, the representations of messages include content of different types (e.g., text content, image content, video content, hyperlink content and/or emojis). In some embodiments, one or more of the features described herein with reference to representations of text messages also apply to representation of messages that include non-text content. Displaying representations of messages with a dynamic three-dimensional effect conveys how the locations of the representations of messages change relative to the viewpoint, and avoids errors in user interaction with the computer system.

In some embodiments, the plurality of user interface objects includes a first user interface object that includes first text content (822*a*), such as object 706*a* in FIG. 7A (e.g., a representation of a message that includes text, as described above). In some embodiments, displaying the first user interface object with the first three-dimensional visual effect having the first appearance includes (822*b*), displaying one or more portions of the first user interface object that do not occlude the first text content with a first amount of the first three-dimensional visual effect (822*c*), such as effect 707*a* on portions of the front surface of object 706*a* that do not occlude the text content 709*a* of object 706*a* in FIG. 7A, and displaying one or more portions of the first user interface object that do occlude the first text content with a second amount, less than the first amount, of the first three-dimensional visual effect (822*d*) (or optionally none of the first three-dimensional visual effect), such as effect 707*a* on portions of the front surface of object 706*a* that do occlude the text content 709*a* of object 706*a* in FIG. 7A. For example, whether the first three-dimensional effect is a lighting effect, a shadow effect, a reflection effect and/or any of the other three-dimensional effects described herein, in some embodiments, the computer system displays the three-dimensional visual effect with less prominence on surfaces and/or edges of the user interface objects that occlude or otherwise at least partially obscure visibility of the content (e.g., text content) of those user interface objects. For example, if the text content of a three-dimensional representation of a message is positioned in the middle of the three-dimensional representation of the message, the computer system optionally displays the portion(s) of the front surface of the representation that is in front of the content of the representation with a less prominent (or eliminated) reflection (or other) effect than it displays the portion(s) of the front surface of the representation that is not in front of the content. Thus, in some embodiments, different representations of messages have different portions (e.g., surfaces and/or edges) of their respective representations displayed with less prominent three-dimensional visual effects due to differences in the areas and/or positions of the message content of those respective representations. In some embodiments, the portion(s) of the representation of the message that is displayed with less prominent three-dimensional visual effects changes as the arrangement of the representation of the message relative to the viewpoint of the user changes (e.g., because different parts of the representation of the message occlude the content of the message due to the change in viewing angle of the representation of the message). Displaying representations of messages with less prominent visual effects at locations corresponding to the content of the messages reduces obstruction of the content of the messages.

In some embodiments, the plurality of user interface objects includes a first user interface object that includes first text content (824*a*) (e.g., a representation of a message that includes text, as described above). In some embodiments, the first user interface object is three-dimensional and includes a front boundary (e.g., surface) and a rear boundary (e.g., surface) separated by a thickness of the first user interface object (824*b*), such as object 706*a* in FIG. 7A. For example, the front and/or rear boundaries of the first user interface object are parallel to the user interface region (e.g., messaging user interface). The thickness of the first user interface object is optionally in the direction perpendicular to the surface of the messaging user interface and/or the front and/or rear boundaries. For example, the first user interface object is optionally a rectangular prism having the thickness in one dimension, and a width and height in two other dimensions. In some embodiments, the front and/or rear surfaces of the first user interface object are at least partially transparent and/or the interior of the first user interface object is at least partially transparent such that content positioned within the interior of the first user interface object is visible from the viewpoint of the user (e.g., which is optionally outside of the interior of the first user interface object).

In some embodiments, the first text content is positioned between (e.g., at the middle point between) the front boundary and the rear boundary within the first user interface object (824*c*), such as text content 709*a* of object 706*a* in FIG. 7A. For example, the text content is optionally parallel (or substantially parallel) to the front and/or rear surfaces of the first user interface object, and the text content is optionally positioned at a location within the thickness of the first user interface object (e.g., within the interior of the first user interface object, and not on or within a threshold distance such as 0.01, 0.05, 0.1, 0.2, 0.5, 1, 3 or 5 cm of the front and/or rear surfaces of the first user interface object). Displaying text content within an interior of a three-dimensional user interface object avoids obstruction of the text content by other aspects of the three-dimensional user interface object (e.g., such as described below).

In some embodiments, the plurality of user interface objects includes a first user interface object that includes first background content (826*a*), such as object 706*b* in FIG. 7A

(e.g., a representation of a message that includes a background color, image and/or video over and/or in front of which the content of the message is displayed). In some embodiments, the first user interface object is three-dimensional and includes a front boundary and a rear boundary separated by a thickness of the first user interface object (826*b*) (e.g., such as described above). In some embodiments, the first background content is positioned at the rear boundary of the first user interface object (826*c*), such as shown with content 709*b* for object 706*b* in FIG. 7A. For example, the background content is optionally parallel (or substantially parallel) to the front and/or rear surfaces of the first user interface object, and the background content is optionally positioned on or within a threshold distance such as 0.01, 0.05, 0.1, 0.2, 0.5, 1, 3 or 5 cm of the interior or exterior of the rear surface of the first user interface object. The background content is optionally visible from the viewpoint of the user through the (e.g., front surface of the) first user interface object. Displaying background content on the rear surface of the first user interface object avoids obstruction of the content of the message (e.g., such as text content as described above).

In some embodiments, the plurality of user interface objects includes a first user interface object that includes first image content (828*a*), such as object 706*a* in FIG. 7A (e.g., a representation of a message that includes the image and/or video content that is optionally displayed over the background content of the message. The image and/or video content is optionally the content of the message, as opposed to being displayed along with the content of the message). In some embodiments, the first user interface object is three-dimensional and includes a front boundary and a rear boundary separated by a thickness of the first user interface object (828*b*) (e.g., such as described above). In some embodiments, the first image content is positioned at the rear boundary of the first user interface object (828*c*), such as content 709*b* of object 706*a* in FIG. 7A. For example, the image content is optionally parallel (or substantially parallel) to the front and/or rear surfaces of the first user interface object, and the image content is optionally positioned on or within a threshold distance such as 0.01, 0.05, 0.1, 0.2, 0.5, 1, 3 or 5 cm of the interior or exterior of the rear surface of the first user interface object. The image content is optionally visible from the viewpoint of the user through the first user interface object (e.g., front surface of the user interface object). Displaying image content on the rear surface of the first user interface object gives the image content a three-dimensional visual appearance even if the image content is not three-dimensional without requiring computational resources associated with displaying objects in three-dimensions.

In some embodiments, the front boundary of the first user interface object is connected to the rear boundary of the first user interface object via a side boundary of the first user interface object (830*a*), such as with object 706*b* in FIG. 7A, and the first user interface object further includes additional content corresponding to the first image content that is positioned along an inside of the front boundary and/or the side boundary of the first user interface object (830*b*), such as if object 706*b* includes such additional content wrapped along the inside of portions of the front surface and/or side surfaces of object 706*b* in FIG. 7A. In some embodiments, the computer system wraps content from the first image content around the inside of the front and/or side surfaces of the first user interface object. In some embodiments, the wrapped content corresponds to one or more portions (but not all portions) of the first image content. For example, in some embodiments, the wrapped content is the outer 1, 3, 5, 10, 20, 30, 45 or 60% of the first image content, and is wrapped around the inside of the outer 1, 3, 5, 10, 20, 30, 45 or 60%, respectively, of the front and/or side boundaries of the first user interface object. In some embodiments, the wrapped content is different from portions (or all) of the first image content, but is rather blurred colors sampled from the first image content and/or is blurred portions of the first image content. In some embodiments, as described herein, the front and/or side surfaces of the first user interface object are at least partially transparent so the wrapped content is visible through those surfaces from the viewpoint of the user. Displaying content corresponding to the image content wrapped around the inside of the first user interface object gives the image content a three-dimensional visual appearance even if the image content is not three-dimensional without requiring computational resources associated with displaying objects in three-dimensions.

In some embodiments, the plurality of user interface objects includes a first user interface object that includes first text content (832*a*) (e.g., a representation of a message that includes text, as described above), such as object 706*a* in FIG. 7A, and displaying the first user interface object with the first three-dimensional visual effect having the first appearance includes (832*b*) in accordance with a determination that the first text content has a third visual appearance (e.g., a first color, a first saturation, a first brightness, a first hue and/or any visual characteristic having a first respective value), displaying (832*c*) the first three-dimensional visual effect with a respective visual characteristic having a first value (e.g., a second color, a second saturation, a second brightness, a second tint, a second hue and/or any visual characteristic having the first value), and in accordance with a determination that the first text content has a fourth visual appearance, different from the third visual appearance (e.g., a third color, a third saturation, a third brightness, a third hue and/or any visual characteristic having a second respective value), displaying (832*d*) the first three-dimensional visual effect with the respective visual characteristic having a second value, different from the first value, such as displaying effect 707*a* differently for object 706*a* based on the visual appearance of the text content of object 706*a* (e.g., a fourth color, a fourth saturation, a fourth brightness, a fourth tint, a fourth hue and/or any visual characteristic having the second value). Thus, in some embodiments, the computer system changes the visual appearance of the visual effect on a particular user interface object based on the characteristics of the text content included in the particular user interface object. In some embodiments, the computer system similarly changes the visual appearance of the visual effect on a particular user interface object based on the characteristics of the non-text content (e.g., image content or video content) included in the particular user interface object. For example, if the color of the content of the user interface object is red, the computer system optionally changes the visual effect towards a non-red color to avoid reducing the legibility of the red content. Changing the visual appearance of the visual effect on a given user interface object based on characteristics of the content of the user interface object avoids the visual effect creating illegibility of the content of the user interface object.

In some embodiments, the plurality of user interface objects are two-dimensional user interface objects (834), such as object 706*c* in FIG. 7A. Thus, in some embodiments, the user interface objects in the user interface region are not actually three-dimensional user interface objects, even though the computer system displays one or more visual effects on or related to the user interface objects that would normally be associated with three-dimensional objects (e.g., specular highlights, shadows and/or other visual effects described herein and with respect to methods 1000 and/or 1200). Rather, the one or more visual effects displayed by the computer system optionally give the appearance that the user interface objects are three-dimensional. Maintaining the user interface objects as two-dimensional reduces the computation resources needed for displaying and/or interacting with the user interface objects.

In some embodiments, the plurality of user interface objects includes a first user interface object (836a), such as object 706c in FIG. 7A. In some embodiments, while displaying the first user interface object, wherein the first user interface object is two-dimensional (e.g., as described above), the computer system detects (836b), via the one or more input devices, a first input directed to the first user interface object, such as an input from hand 720 directed to object 706c in FIG. 7A. In some embodiments, the first input directed to the first user interface object has one or more of the characteristics of the input directed to a representation of a message as described in method 1000. For example, the first input optionally includes attention of the user of the computer system directed to the first user interface object and/or a hand of the user in a ready state pose.

In some embodiments, in response to detecting the first input, the computer system updates (836c) the first user interface object to be three-dimensional, such as shown with object 706c in FIG. 7D (and optionally separating the first user interface object from a backplane of a messaging user interface and/or moving the first user interface object closer to the viewpoint of the user, such as described with reference to method 1000). In some embodiments, while the user interface objects are not the targets of user input, the computer system displays the user interface objects positioned back, against a backplane in the user interface region. In some embodiments, when a user interface object is the target of user input, the computer system both separates the user interface object from the backplane and transitions the user interface object into a three-dimensional object (e.g., such as described with reference to method 1000). Maintaining the user interface objects as two-dimensional until user input is directed to them reduces the computation resources needed for displaying and/or interacting with the user interface objects.

In some embodiments, the first three-dimensional visual effect includes a virtual specular highlight effect that is based on a simulated light source associated with the three-dimensional environment (838), such as specular highlighting effects 705 in FIG. 7A. Thus, in some embodiments, the computer system displays the specular highlight effect(s) on the user interface objects based on characteristics (e.g., brightness, color, location, size and/or directionality) of one or more simulated light sources located in the three-dimensional environment and/or based on such characteristics of one or more simulated light sources that are not actually located in the three-dimensional environment but based on which the computer system displays the specular highlights as if they were located in the three-dimensional environment. In some embodiments, the characteristics of the specular highlights (e.g., brightness, color, location, size and/or shape) correspond to the characteristics of the one or more simulated light sources. In some embodiments, as the viewpoint of the user and/or the user interface objects move in the three-dimensional environment, resulting in a change in spatial arrangement relative to the simulated light sources (e.g., because the characteristics of the simulated light sources do not change based on changes in the viewpoint of the user and/or movement of the user interface objects), the specular highlights displayed on the user interface object change correspondingly. Displaying specular highlight effects based on simulated light sources effectively conveys to the user changes in the relative locations of the user interface objects in the three-dimensional environment.

In some embodiments, one or more characteristics of the simulated light source change over time (840). For example, the brightness, color, location, size and/or directionality of the light source(s) change over time, which optionally causes the resulting specular highlights to change correspondingly (e.g., different brightness, color, location, size and/or shape). Displaying specular highlight effects based on simulated light sources that change over time increases the realism with which the three-dimensional environment is displayed.

In some embodiments, the one or more characteristics of the simulated light source change based on a location of the sun in a physical environment of a user of the computer system (842), such as the location of the sun in the physical environment of computer system 101 in FIGS. 7A-7D. In some embodiments, the brightness, color, location, size and/or directionality of the light source(s) correspond to and/or change based on the location of the sun in the sky at the physical geographic location of the computer system. Thus, as the location of the sun changes throughout the day at the physical geographic location of the computer system, the above characteristics of the simulated light source(s) also change accordingly, resulting in different visual characteristics of the lighting effect(s) applied to the plurality of user interface objects. Displaying specular highlight effects based on simulated light sources that correspond to the sun increases the realism with which the three-dimensional environment is displayed and conveys information about the current time of day to the user.

In some embodiments, the first three-dimensional visual effect includes a virtual shadow effect that is based on the simulated light source (844), such as the virtual shadows displayed for objects 706b and 706c in FIG. 7D. For example, the computer system displays one or more virtual shadows that are virtually cast by the plurality of user interface objects, where those virtual shadows are as if caused by the one or more simulated light sources shining light onto the plurality of user interface objects. In some embodiments, the virtual shadows are cast onto/displayed on others of the plurality of user interface objects and/or the background of the messaging user interface. The specular highlights (or other lighting effects described herein) are optionally based on the same simulated light sources used to generate the simulated shadows. Displaying simulated shadows and specular highlights based on the same simulated light sources increases the realism with which the three-dimensional environment is displayed.

In some embodiments, the user interface region includes a virtual object that includes the plurality of user interface objects, such as user interface 704 in FIG. 7A (e.g., the virtual object is optionally a user interface of a messaging application that includes and/or is displayed behind the plurality of user interface objects), and the virtual object that includes the plurality of user interface objects is displayed with the first three-dimensional visual effect having a third visual appearance (846), such as visual effect 705h shown on user interface 704 in FIG. 7A. Thus, in some embodiments, the same visual effect(s) described herein that are displayed on the plurality of user interface object is (are) also displayed on the virtual object that includes the plurality of user interface object (e.g., the computer system displays specular highlights or other virtual lighting or visual effects on the messaging user interface in addition to on the plurality of user interface objects, optionally based on the same light source(s)). Displaying the same three-dimensional visual effect on both the user interface objects and the corresponding virtual object increases the realism with which the three-dimensional environment is displayed and provides consistency of presentation to the user, reducing errors in interaction with the user interface region.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9E illustrate examples of a computer system changing the distance between a representation of a message and a viewpoint of a user based on input directed to the representation of the message, in accordance with some embodiments.

Figure 9A:
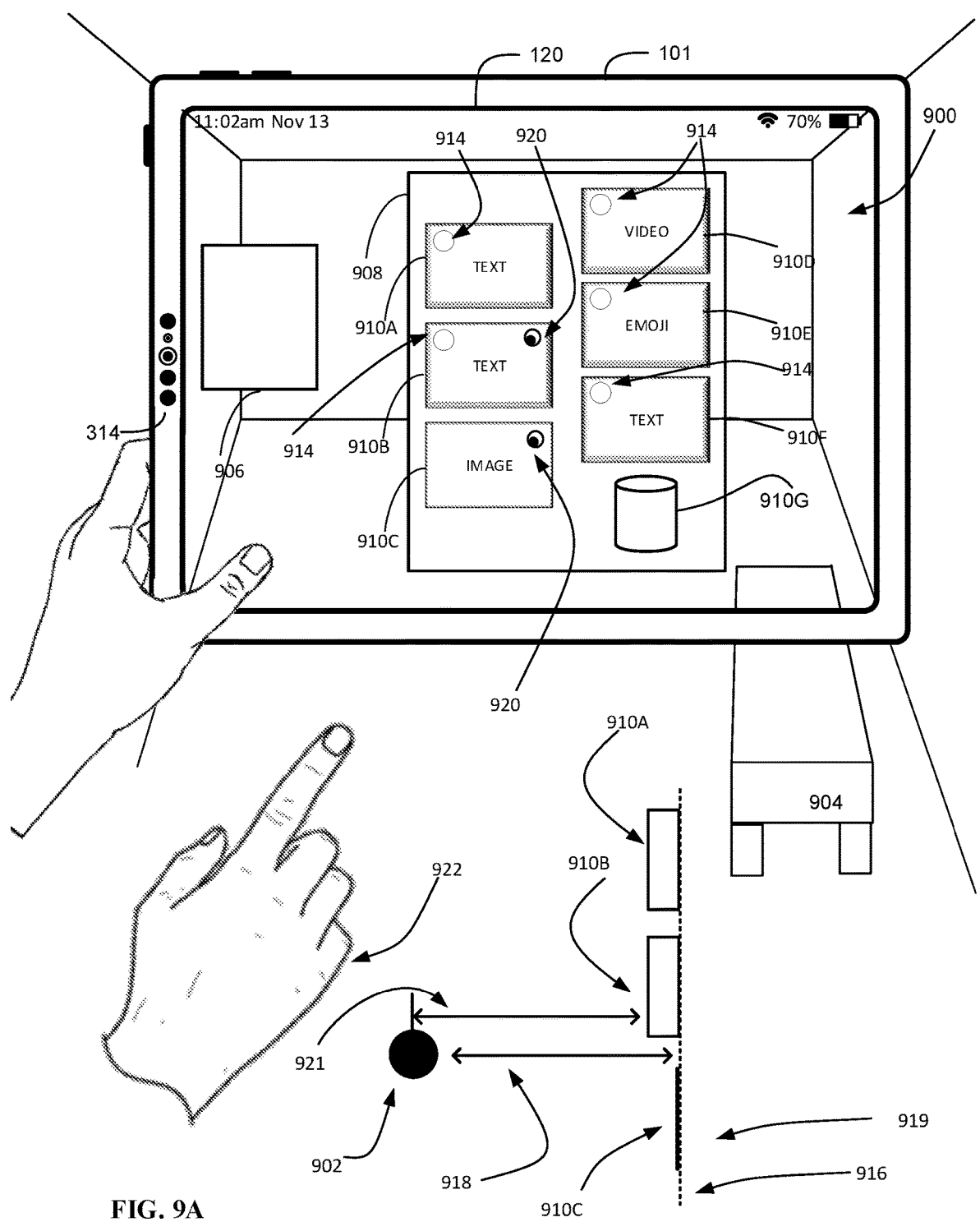
FIGS. 9A-9E illustrate examples of a computer system changing a distance of a representation of a message from the viewpoint of the user based on input directed to the representation of the message in accordance with some embodiments.

FIG. 9A illustrates a three-dimensional environment 900 that is visible via the display generation component 120. The three-dimensional environment 900 is visible from a viewpoint 902 of a user. As described above with reference to FIGS. 1-6, the computer system 101 optionally includes the display generation component 120 (e.g., a touchscreen) and a plurality of image sensors (e.g., the image sensors 314). The image sensors 314 optionally include one or more of a visible light camera, an infrared camera, a depth sensor, or any other sensor the computer system 101 would be able to use to capture one or more images of the user or part of the user (e.g., one or more hands of the user) while the user interacts with the computer system 101. In some embodiments, the user interfaces illustrated in the referenced drawings and described below may also be implemented on a head—mounted display that includes the display generation component 120 and the image sensors 314 to detect the physical environment, movements of the user's hands (e.g., via external sensors facing outwards from the user), a gaze of the user (e.g., via internal sensors facing inwards towards the face the user), or a combination thereof.

The computer system 101 captures one or more images of the physical environment around the computer system 101, including one or more objects in the physical environment around the computer system 101. In some embodiments, the computer system 101 displays representations of the physical environment in the three-dimensional environment 900 via the display generation component 120. For example, the three-dimensional environment 900 that is visible via the display generation component 120 includes representations of a physical floor, and back and side walls of the room in which the computer system 101 is located. The three-dimensional environment 900 also includes a table 904 (e.g., a physical object) that is visible via the display generation component 120.

In FIG. 9A, the three-dimensional environment 900 includes virtual objects including a virtual object 906 and a messaging user interface 908. Virtual object 906 is optionally one or more of user interfaces of applications (e.g., content browsing user interfaces), three-dimensional objects (e.g., virtual clocks, virtual balls, and/or virtual cars) or any other element displayed by the computer system 101 that is not included in the physical environment of computer system 101. The messaging user interface 908 includes a plurality of representations of messages 910. Some of the plurality of representations of messages 910 include a three-dimensional bubble (e.g., a three-dimensional shape), enclosing content of the plurality of representations of messages 910. For example, the representations of messages 910A, 910B, 910D-910F in FIG. 9A are enclosed in a three-dimensional message bubble. Further, the representations of messages 910A, 910B, 910D-910F in FIG. 9A include respective specular highlights 914. Additional or alternative details about the visual appearances of the representations of messages 910 are described with reference to method 1000.

In FIG. 9A, the representation of the message 910G is displayed without including a three-dimensional message bubble (e.g., the content of message 910G is not enclosed in a three-dimensional bubble). The representation of the message 910G is displayed without including the three-dimensional message bubble optionally because the content of the message 910G is three-dimensional content (e.g., a three-dimensional model of a tent, vehicle, snowman or house). Also, the representation of the message 910C includes a two-dimensional enclosure instead of a three-dimensional message bubble. For example, in some embodiments, one or more or all of the representations of messages 910 include two-dimensional enclosures (e.g., instead of three-dimensional enclosures), or one or more or all of the representations of messages include three-dimensional enclosures (e.g., instead of two-dimensional enclosures). For example, in some embodiments, all of the representations of messages 910 are two-dimensional before receiving an input directed to one or more of the representations of the messages 910. In some embodiments, some types of content are enclosed in three-dimensional message bubbles (e.g., three-dimensional content, and/or video content) and other types of content are enclosed in two-dimensional enclosures (e.g., text content, and/or emoji content).

A sideview glyph 919 is provided in FIG. 9A. The sideview glyph 919 shows some features of the messaging user interface 908 and the representations of messages 910A-910C from a side view. It should be noted that the features described with reference to the sideview glyph 919 optionally apply to other representations of the other messages analogously, as described in this present disclosure. As shown in the sideview glyph 919, the messaging user interface 908 includes a background 916 (e.g., a backplane) of the messaging user interface 908. In the side view glyph 919, a back portion of the representations of the messages 910A-910C are aligned with the background 916 of the messaging user interface 908. For example, in the illustrated embodiment, the back portion (e.g., surface) of the representations of the messages 910A, 910B are in contact with the background 916 of the messaging user interface 908. In the sideview glyph 919, the representation of the message 910C (and its content), which is two-dimensional, is parallel to and in contact with the background 916 of the messaging user interface 908.

The sideview glyph 919 also includes an indication of the viewpoint 902 of the user. The distance between the viewpoint 902 of the user and the background 916 of the messaging user interface 908 is optionally referred to as the background distance 918. The distance between the viewpoint 902 of the user and the representation of the message 910B (or other messages, as appropriate) is optionally referred to as the first distance 921. It should be noted that in some embodiments, the first distance 921 is substantially similar to the background distance 918.

Different representations of messages of the plurality of representations of messages 910 optionally include different types of content. For example, in FIG. 9A, the representations of the messages 910A, 910B, 910F include text content (e.g. a first type of content), the representation of the message 910C includes image content (e.g. a second type of content), the representation of the message 910D includes video content (e.g. a third type of content), the representation of the message 910E includes emoji content (e.g. a fourth type of content), and the representation of the message 910G includes three-dimensional (3D) content (e.g. a fifth type of content). It should be noted that a given representation of given message optionally includes multiple types of content. For example, a representation of a message optionally includes text content, image content, video content, emoji content, 3D content, or any combination thereof.

Additionally, in some embodiments, a representation of a message appears at a location on the messaging user interface 908 that is based upon whether the represented message was sent from a user of the computer system 120 or was sent to a user of the computer system 120. In the illustrated embodiment in FIG. 9A, the representations of messages 910D-910G are representations of messages that are sent from a user of the computer system 120, and the representations of messages 910A-910C are representations of messages that are sent to the user of the computer system 120. Also, an alignment of a representation of a message of the plurality of representations of messages is optionally based on whether the representation of the message represents a message that is sent from the user of the computer system 120 or represents a message that is sent to the user of the computer system 120. For example, in the illustrated embodiment in FIG. 9A, the representations of messages 910D-910G (e.g., the representations of the messages that represent messages sent from the user of the computer system 120) are closer to a right side of the messaging user interface 908 (e.g., "right-aligned") while the representations of messages 910A-910C (e.g., the representations of the messages that represent messages sent to the user of the computer system 120) are closer to a left side of the messaging user interface 908 (e.g., "left-aligned").

In the illustrated embodiment, input is alternatively directed at the representation of the message 910B and the representation of the message 910C. In particular, an input from a hand 922 is alternatively directed at the representation of the message 910B and the representation of the message 910C. Also, a gaze input 920 corresponding to attention of a user of the computer system 101 is alternatively directed to the representation of the message 910B and the representation of the message 910C. The computer system 101 optionally detects the input from the hand 922 and the gaze input 920 via the image sensors 314 and/or other sets of sensors. In some embodiments, the input from hand 922 is the hand in a ready state or the hand performing an air pinch gesture in which two fingers of the hand come together and touch, and optionally subsequently move apart from one another.

Figure 9B:
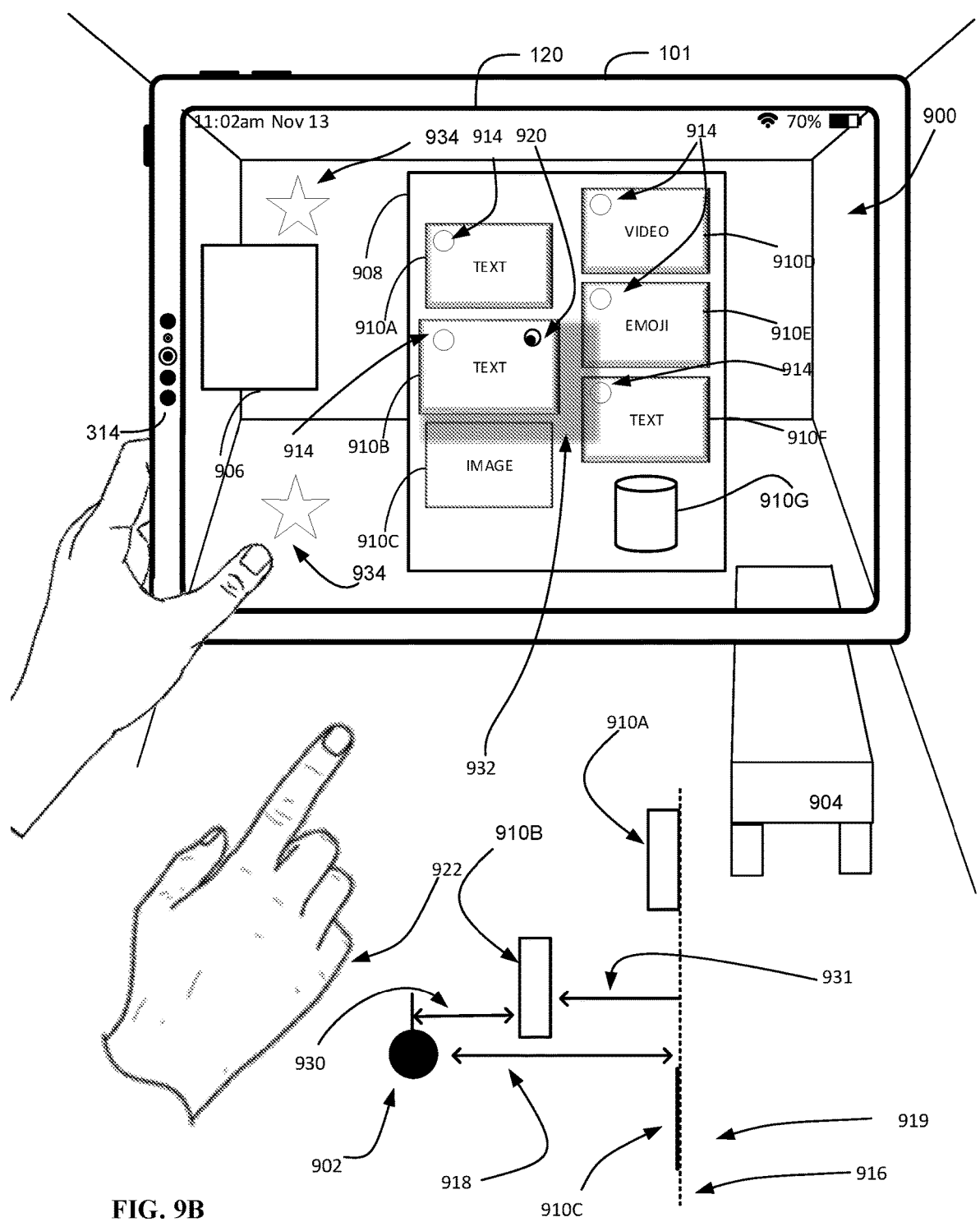

FIG. 9B illustrates one or more responses to the input(s) detected in FIG. 9A, including a distance of the representation of the message 910B from the viewpoint 902 of the user changing from the first distance 921 from the viewpoint of the user (e.g. the distance of the representation of the message 910B from the viewpoint of the user, as shown in FIG. 9A) to be a second distance 930 from the viewpoint of the user in response to input (e.g., the gaze input 920 and/or the input from the hand 922) directed at the representation of the message 910B, in accordance with some embodiments of the present disclosure.

The sideview glyph 919 of FIG. 9B illustrates that the representation of the message 910B has moved away from the background 916 of the messaging user interface 908. Also, as shown, in some embodiments, a respective distance between the representation of the message 910B and the representation of the messages 910A, 910C changes in response to input (e.g., the gaze input 920 and/or the input from the hand 922) directed at the representation of the message 910B.

The messaging user interface 908 of FIG. 9B further illustrates that at the viewpoint 902 of the user, the representation of the message 910B appears larger than the representations of the messages 910A, 910C.

Specifically, in the three-dimensional environment 900 in FIG. 9B, and from the viewpoint 902 of the user, the representation of the message 910B appears larger than the representations of the messages 910A, 910C on the messaging user interface 908. The representation of the message 910B optionally appears larger because the computer system 101 displays the representation of the message 910B at a distance closer to the viewpoint 902 of the user than the distance of the other representations of the other messages of the plurality representations of messages. More specifically, in some embodiments, the computer system 101 moves the representation of the message 910B from a first distance (e.g., the first distance 921 of FIG. 9A) to the second distance 930, and though the representation of the message 910B is optionally of a same or similar size as other representations of other messages, the representation of the message 910B appears larger than the other representations of other messages because it is closer to the viewpoint 902 of the user than the other representations of other messages 910.

Moreover, a simulated shadow 932 as if cast by the representation of the message 910B is displayed by the computer system 101 on the messaging user interface 908. The simulated shadow 932 optionally results from the movement of the representation of the message 910B towards the viewpoint 902 of the user and/or the separation of the representation of the message 910B from the backplane of the messaging user interface 908. The simulated shadow 932 optionally grows in size as the representation of the message 910B moves closer to the second distance 930 (e.g., being separated from the background 916 of the messaging user interface 908 by a third distance 931). In the illustrated embodiment, the simulated shadow 932 is additionally cast on the representation of the message 910C, the representation of the message 910D, and the representation of the message 910F. The simulated shadow 932 is also simulated as cast onto a portion of the messaging user interface 908 that is not a representation of the message (e.g., on the background 916 of the messaging user interface 908).

The illustrated embodiment includes an animation 934 displayed via the display generation component 120. The animation 934 optionally corresponds to effects related to the representation of the message 910B. Specifically, the animation 934 is optionally displayed in response to the input directed towards the representation of the message 910B. As shown, the animation 934 optionally extends beyond the outer boundary of the messaging user interface 908, and is optionally displayed on one or more virtual or physical objects in three-dimensional environment 900 For example, virtual lighting effects such as fireworks or laser effects are optionally displayed on one or both of the table 904 and the virtual object 906. Despite the animation 934 being able to extend beyond the outer boundary of the messaging user interface 908, in some embodiments, the representations of the messages themselves (e.g., 910A, 910B or 910C) cannot move beyond or outside of the outer boundary of the messaging user interface 908.

Figure 9C:
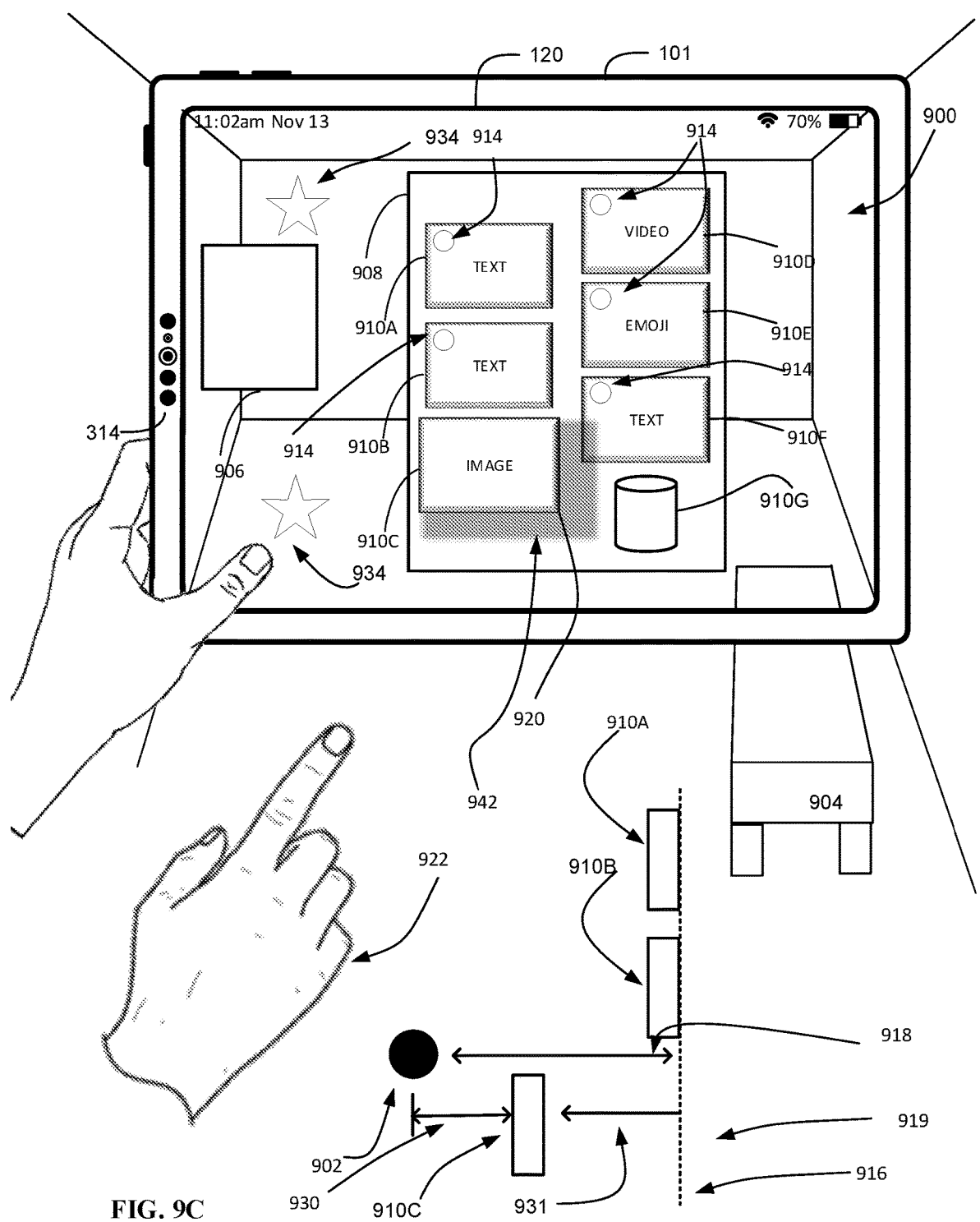

FIG. 9C illustrates one or more responses to the input(s) detected in FIG. 9A, including a distance of the representation of the message 910C from the viewpoint of the user changing from the first distance 921 (e.g., the distance of the representation of the message 910C from the viewpoint 902 of the user, as shown in FIG. 9A) to be the second distance 930 from the viewpoint 902 of the user (e.g., the third distance 931 from the background 916 of the messaging user interface 908) in response to receiving input directed towards the representation of the message 910C, in accordance with some embodiments of the present disclosure.

Turning back to the representation of the message 910C in FIG. 9A, the representation of the message 910C was a two-dimensional virtual object. Returning to the representation of the message 910C in FIG. 9C, the representation of the message 910C is now a three-dimensional virtual object. The representation of the message 910C has optionally become three-dimensional in response the input directed to it and/or in response to its movement from the first distance 921 from the background 916 of the messaging user interface 908 to the second distance 930.

The simulated shadow 942 and the animation 934 in FIG. 9C optionally correspond to the representation of the message 910C in similar ways as described in this present disclosure with regard to the simulated shadow 932 and the animation 934 in FIG. 9B corresponding to the representation of the message 910B.

Figure 9D:
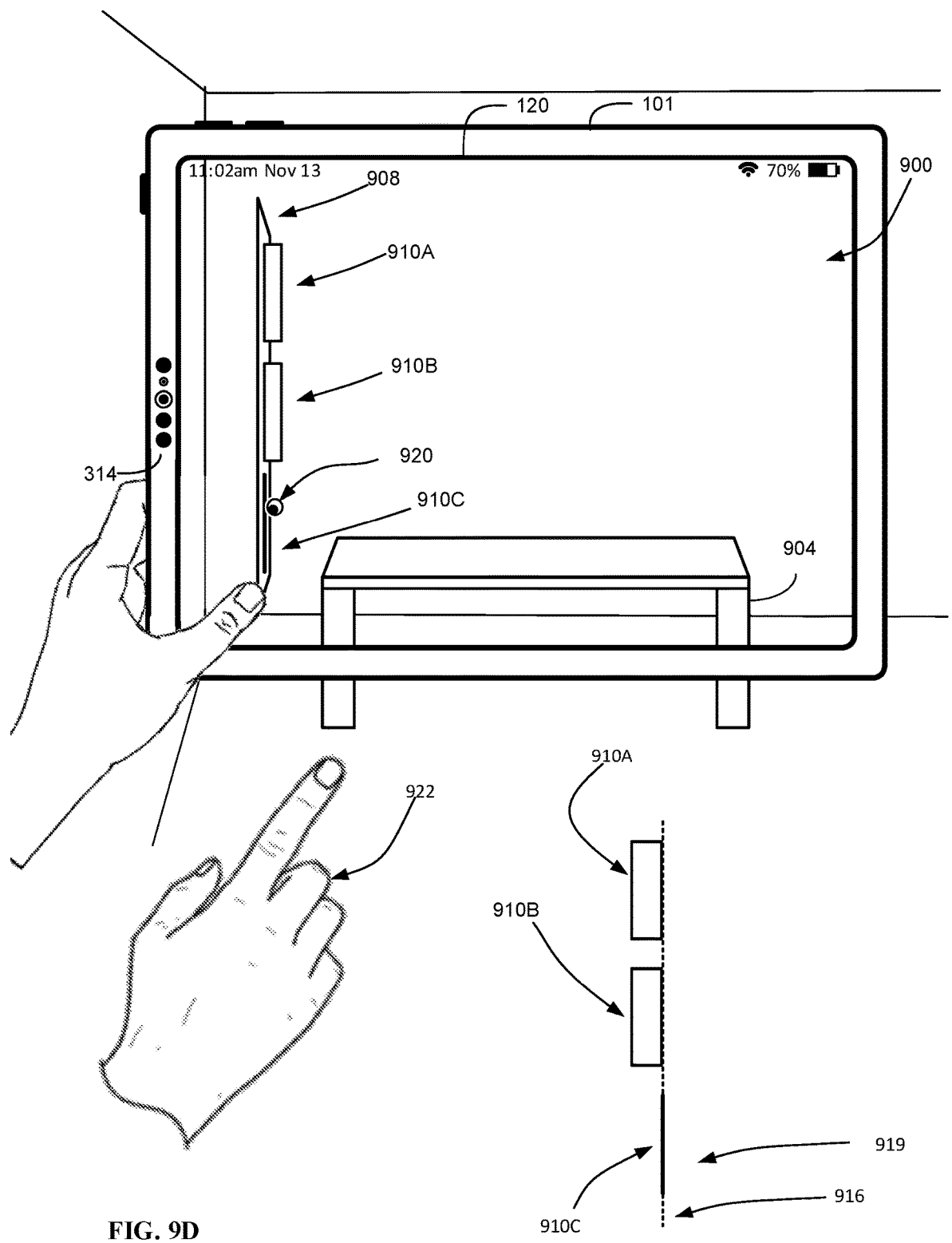

FIG. 9D illustrates the messaging user interface 908 in the three-dimensional environment 900 when an angle between a normal of the messaging user interface 908 and a viewpoint of the user (e.g., the viewpoint 902 of the user of FIGS. 9A, 9B, 9C) exceeds a threshold viewing angle, in accordance with some embodiments of the present disclosure. For example, from FIGS. 9B and/or 9C to FIG. 9D, the computer system 101 detects movement of the viewpoint 902 of the user toward the left side of the messaging user interface 908, such as movement of the user in the physical environment towards the left side of the messaging user interface 908, and orientation of the user towards the side of the messaging user interface 908.

In response to such movement of the viewpoint 902 of the user, the computer system 101 optionally moves the representations of the messages 910A-910C back in contact with the background 916 of the messaging user interface 908 in response to the computer system 101 detecting the angle between a normal of the messaging user interface 908 and viewpoint 902 of the user exceeding a threshold viewing angle (e.g., 9 degrees, 20 degrees 40 degrees, or 80 degrees). As mentioned above, in accordance with some embodiments, the messaging user interface 908 is displayed in the state illustrated in FIG. 9D from a previous state in which one or more representations of messages 910 are separated from the background 916 of the messaging user interface 908 (e.g., the representation of the message 910B of FIG. 9B, or the representation of the message 910B of FIG. 9C).

In some embodiments, representations of messages 910 such as the representation of the message 910C transform back into two-dimensional objects in response to the computer system 101 detecting the viewpoint 902 of the user exceeding the threshold viewing angle. In some embodiments, the computer system 101 gathers data indicative of a position of the viewpoint 902 of the user in the three-dimensional environment 900, determines the corresponding viewing angle of messaging user interface 908 at that position, compares the corresponding viewing angle to the threshold viewing angle, and in response to the corresponding viewing angle exceeding the threshold viewing angle, the computer system 101 optionally moves the representations of the messages 910 back towards the background 916 of the messaging user interface 908, causes representations of messages that are three-dimensional to become two-dimensional, or a combination thereof.

In the embodiment illustrated in FIG. 9D, the gaze input 920 and input from the hand 922 (e.g., as described with reference to FIG. 9A) are directed to the representation of the message 910C. The representation of the message 910C optionally does not change distance from the background 916 of the messaging user interface 908 and/or the viewpoint 902 of the user in response to the input directed to the representation of the message 910C, because the viewing angle of the messaging user interface 908 is optionally above the above-described viewing angle threshold.

Figure 9E:
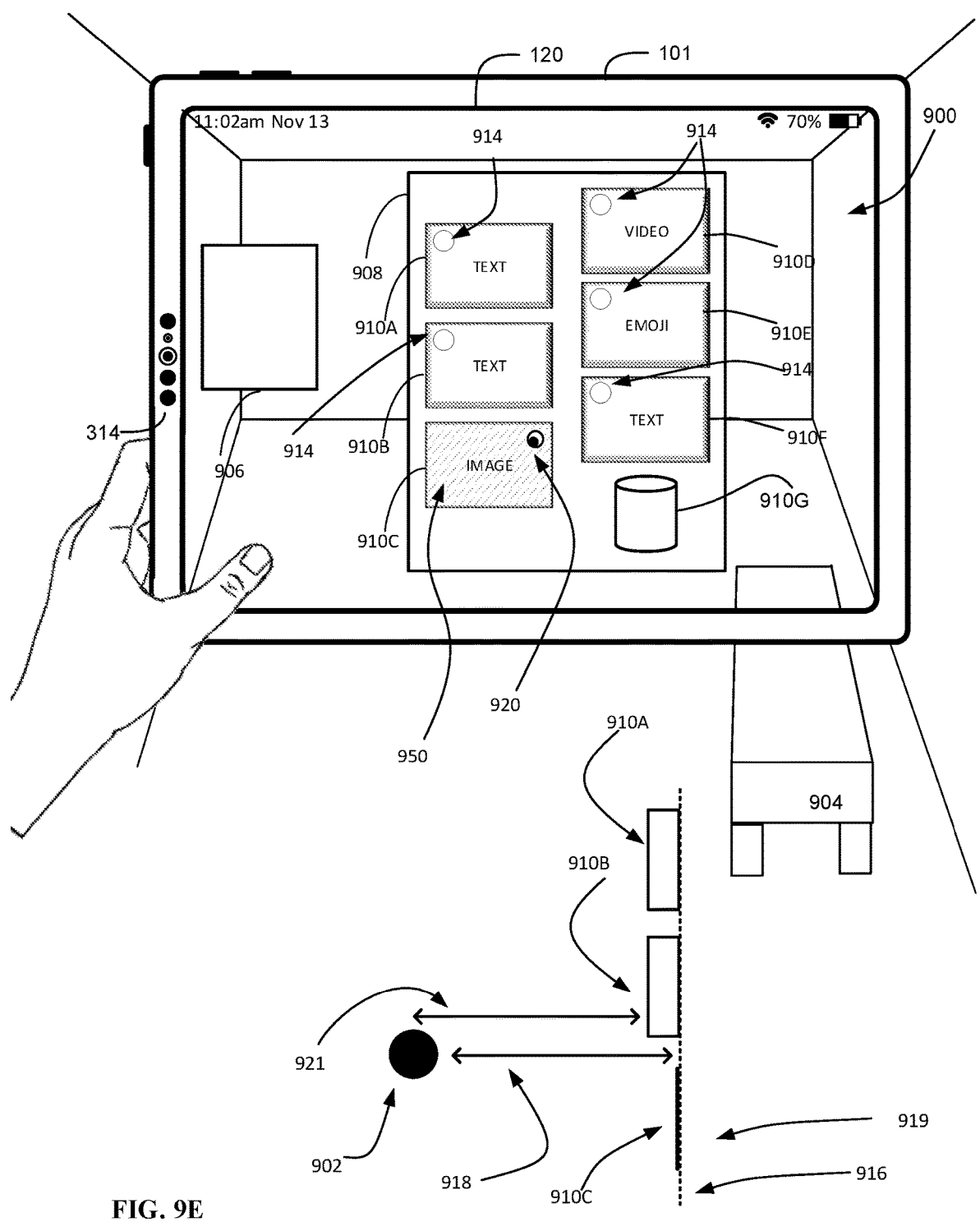
Figure 10A:
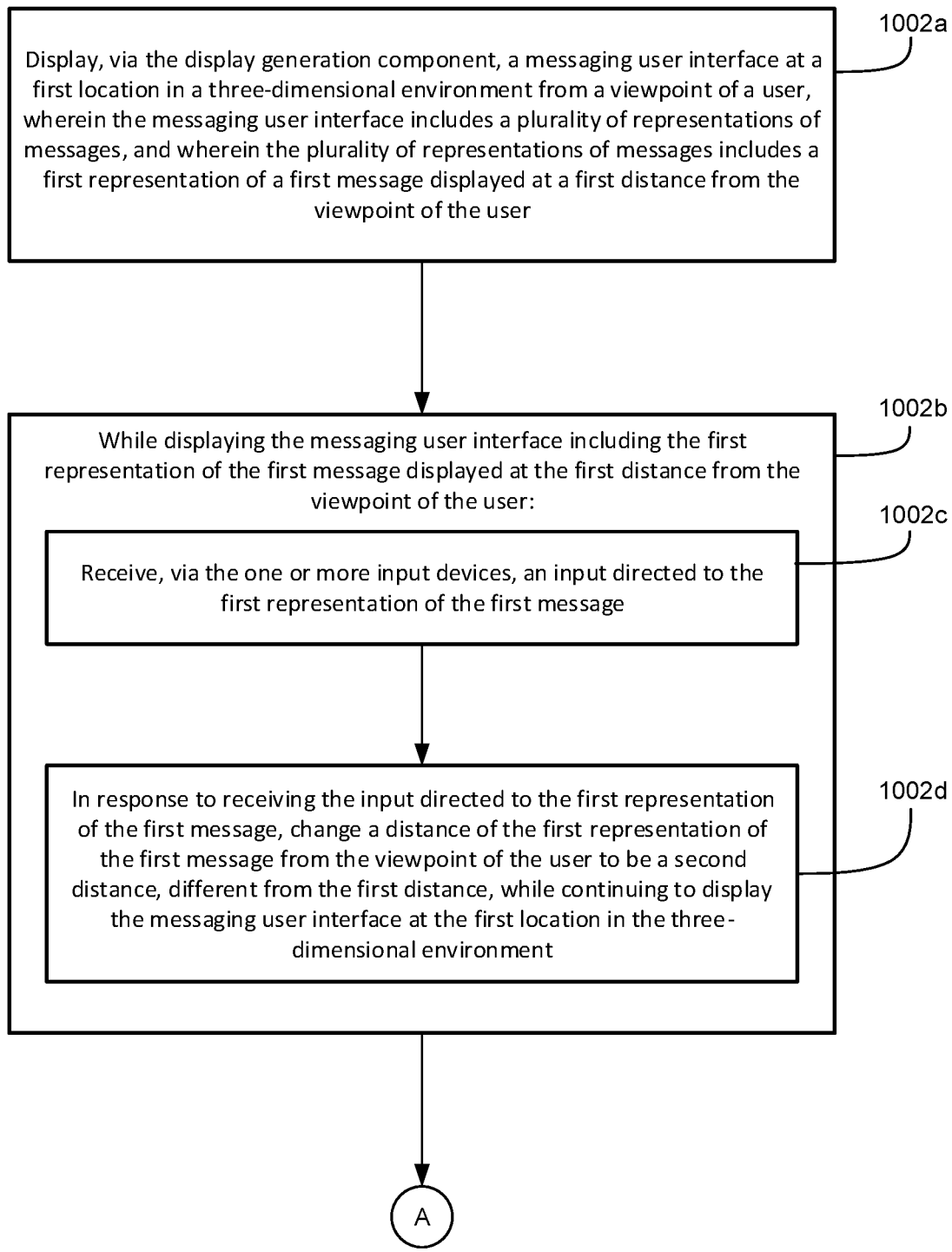
FIG. 10A-10G include a flowchart illustrating a method for changing a distance of a representation of a message from the viewpoint of the user based on input directed to the representation of the message, in accordance with some embodiments of the present disclosure.
Figure 10B:
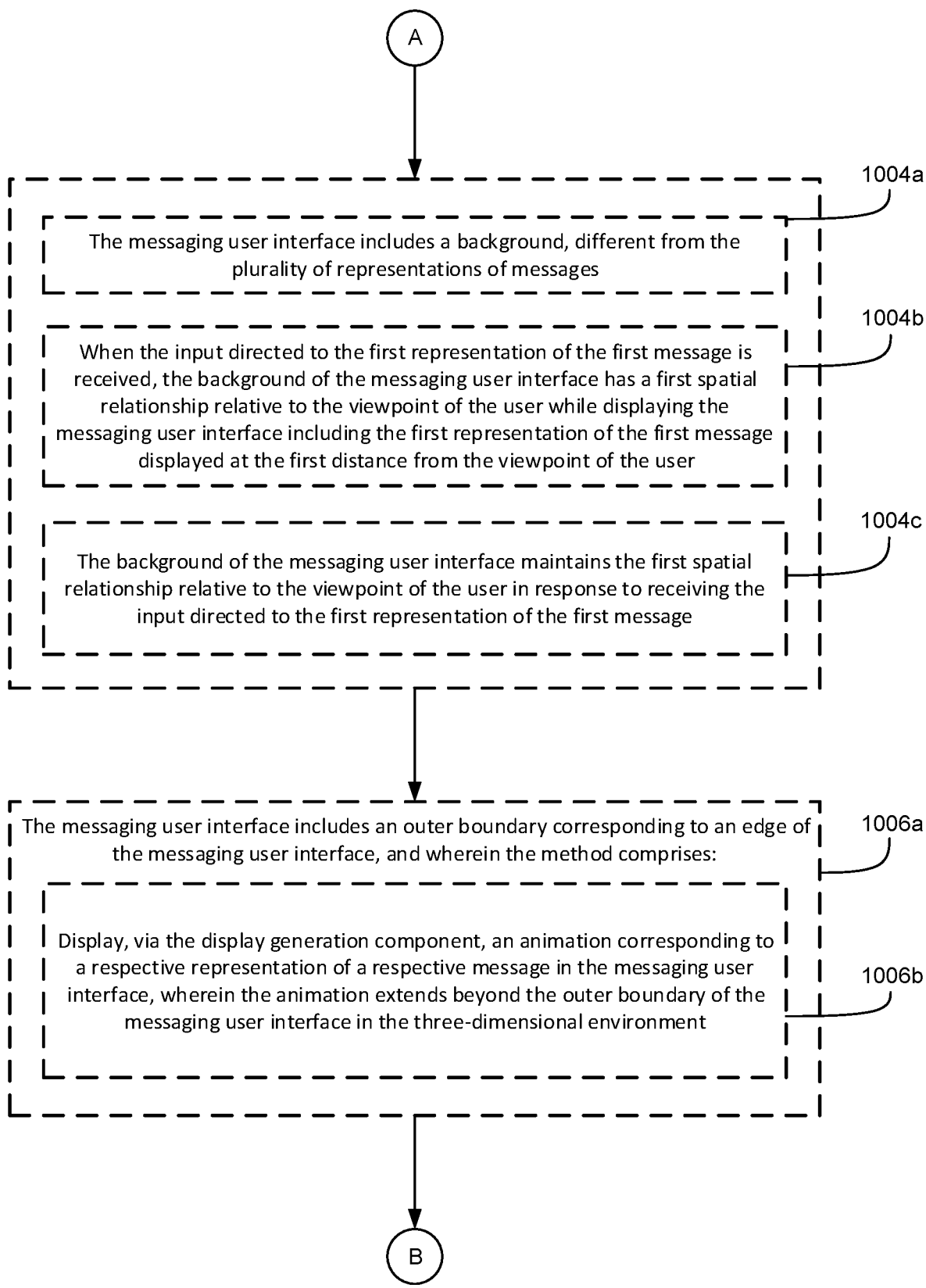
Figure 10C:
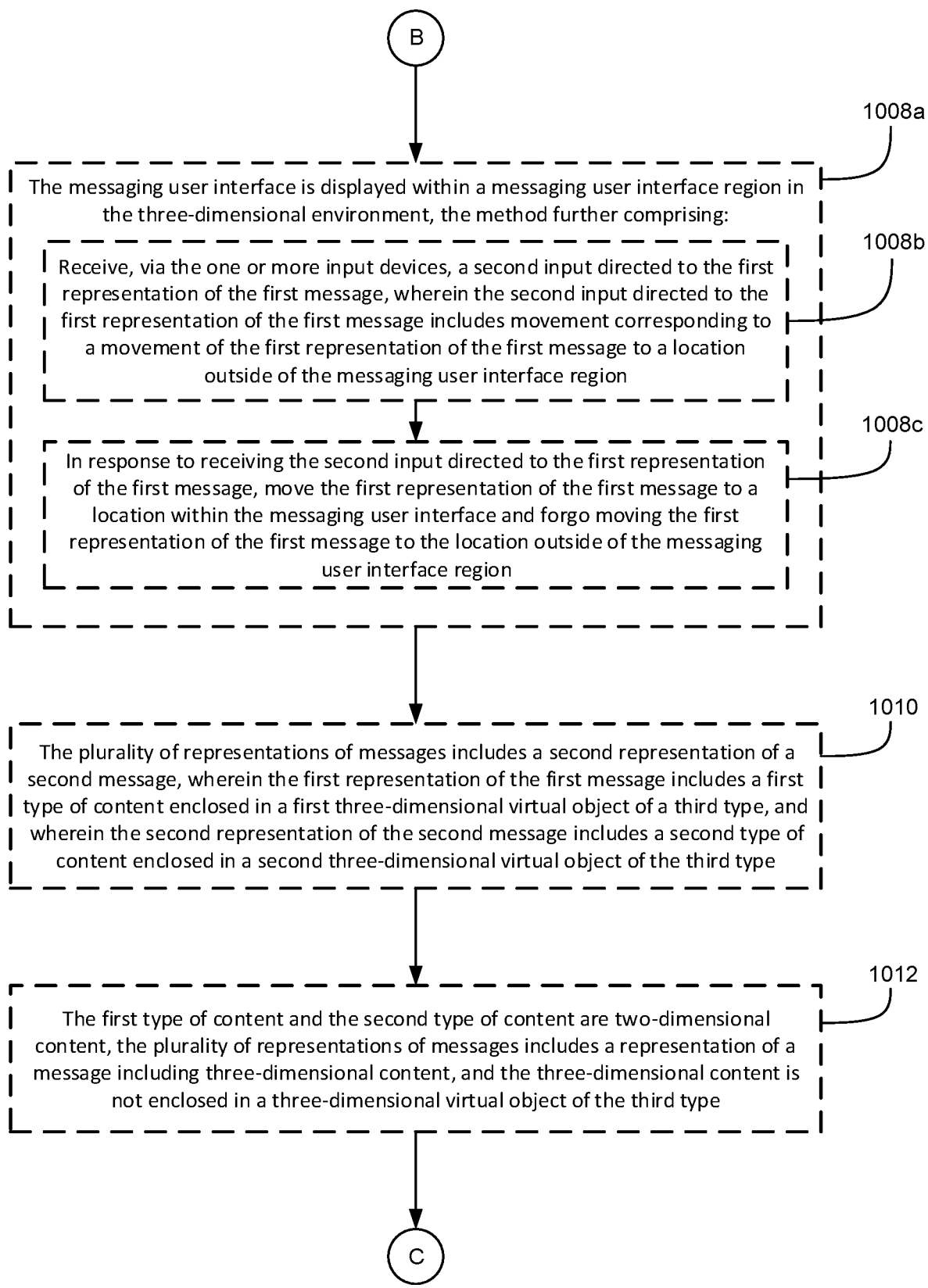
Figure 10D:
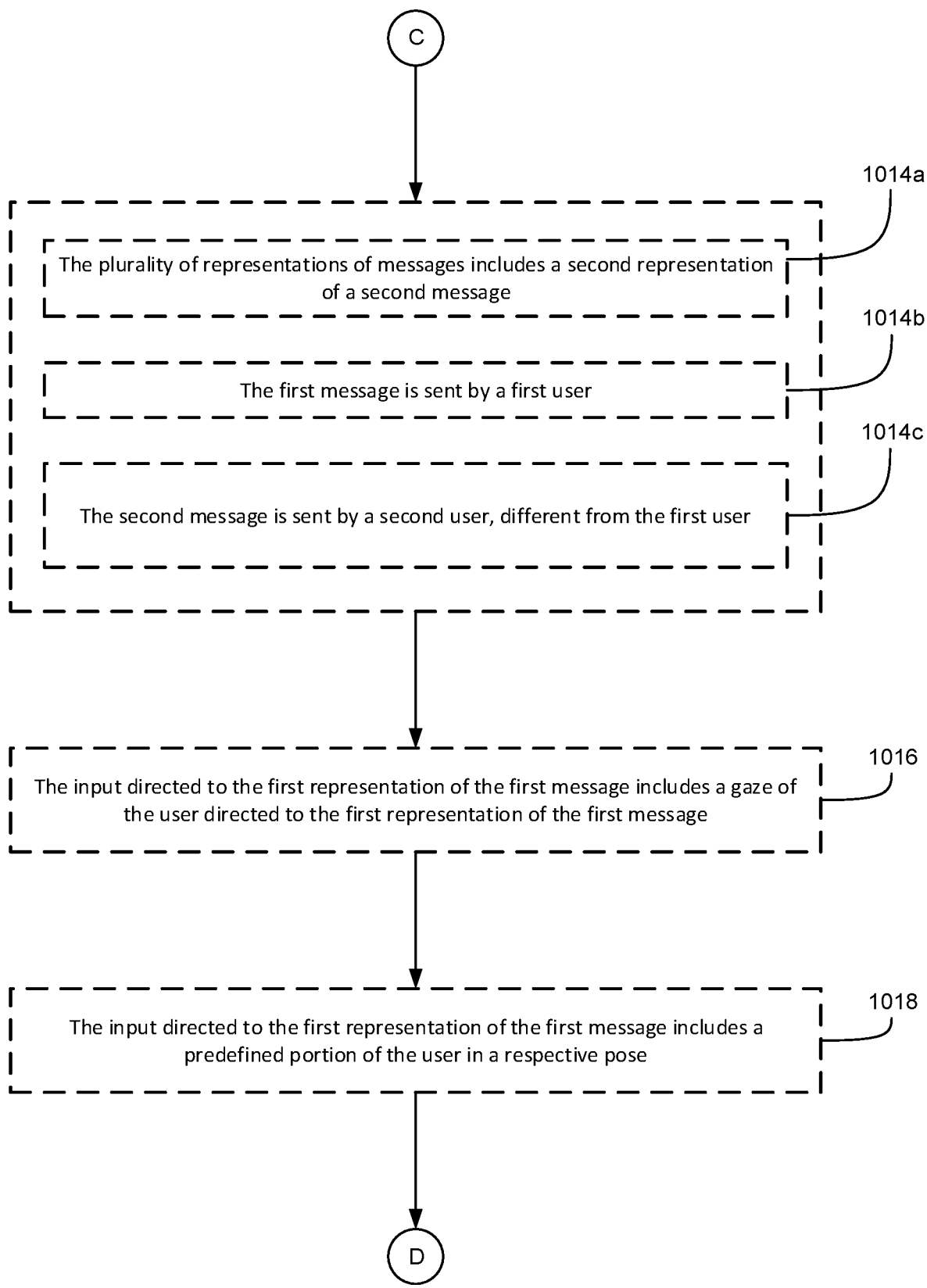
Figure 10E:
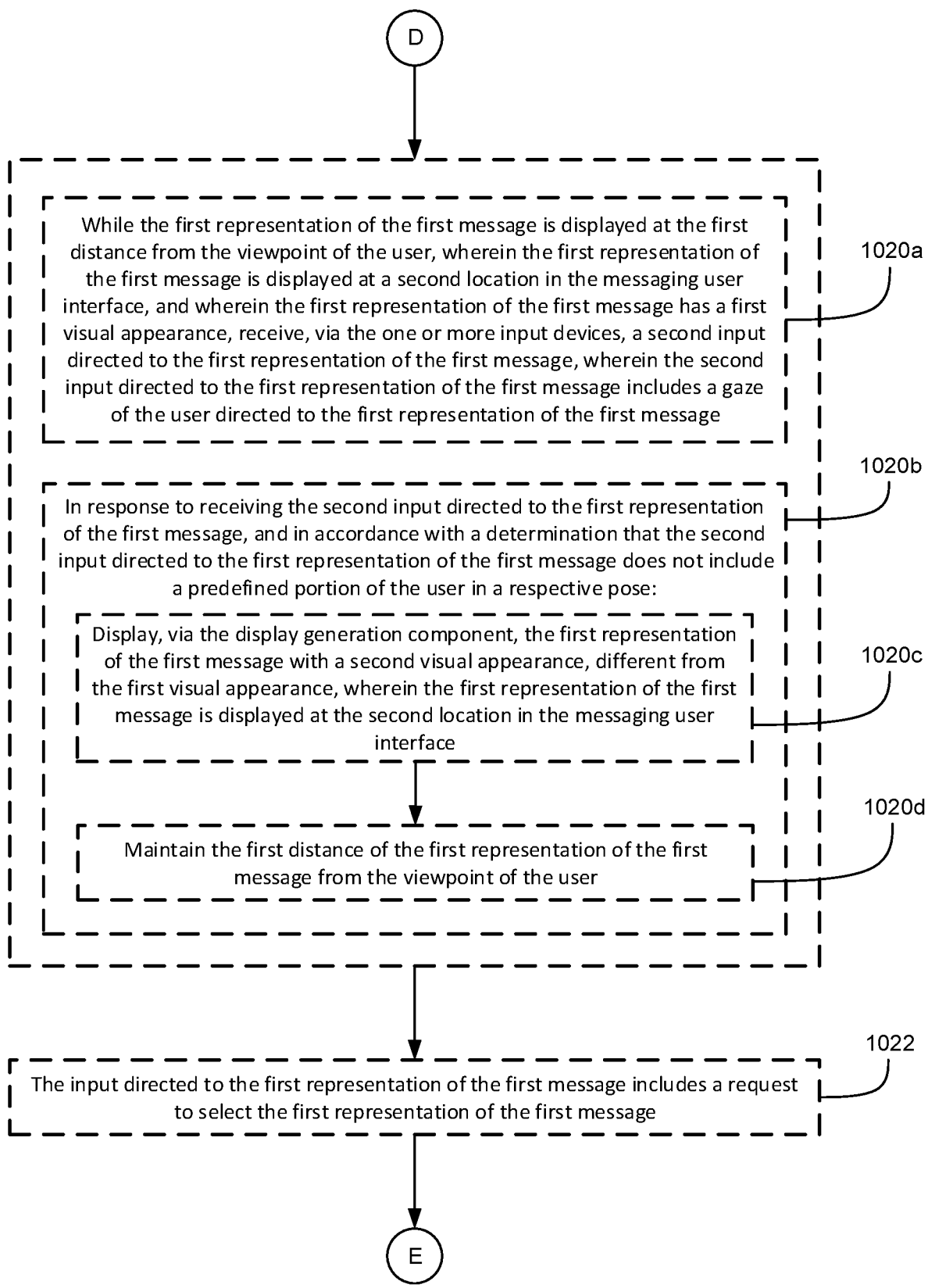
Figure 10F:
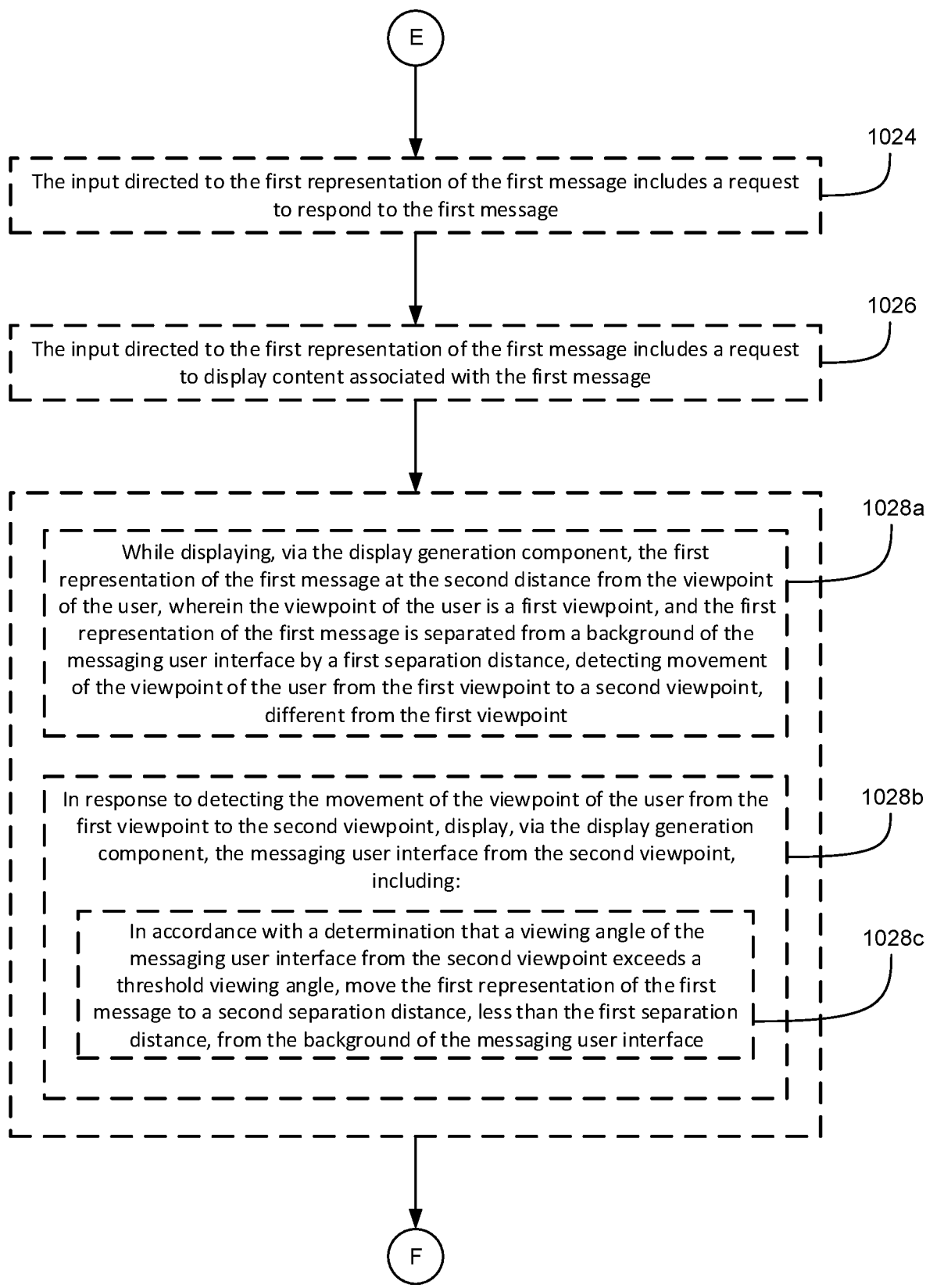
Figure 10G:
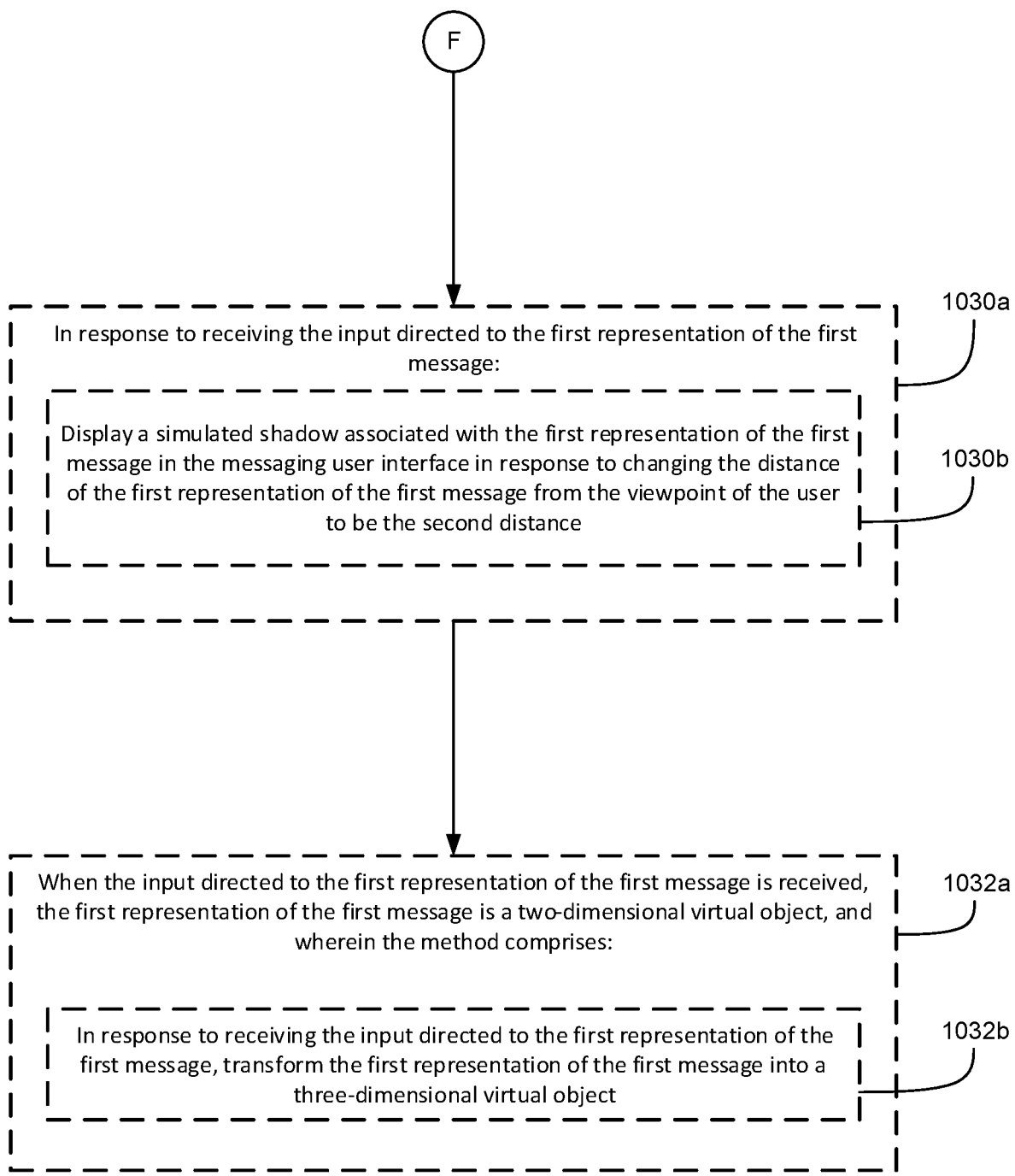

FIG. 9E illustrates display of the three-dimensional environment 900, in which the representation of the message 910C includes a second visual appearance different from a first visual appearance, in accordance with some embodiments of the present disclosure. The representation of the message 910C is displayed with the second visual appearance different from the visual appearance of the representation of the message 910C in, for example, any of FIGS. 9A-9C in response to the computer system 101 receiving the gaze input 920 directed to the representation of the message 910C without receiving a hand input (e.g., from the hand 922 of FIG. 9A) directed to the representation of the message 910C and/or without receiving a required hand input from hand 922 (e.g., without detecting hand 922 in the ready state).

In the illustrated embodiment, in response to such an input directed to the representation of the message 910C, the representation of the message 910C remains in contact with the background 916 of the messaging user interface 908 (e.g., at the first distance 921 from the viewpoint 902 of the user). The representation of the message 910C is optionally displayed with a highlight 950 effect applied to the representation of the message 910C that distinguishes the representation of the message 910C from other representations of the messages in the messaging user interface 908; however, the representation of the message 910C optionally does not change from being two-dimensional to being three-dimensional.

FIGS. 10A-10E include a flowchart illustrating a method 1000 for changing a distance between a representation of a message and the viewpoint of the user in accordance with some embodiments of the disclosure. In some embodiments, the method 1000 is performed at a computer system (e.g., computer system 101 in FIG. 1) including a display generation component (e.g., the display generation component 120 of FIGS. 1, 3, and 4) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a tangible non-transitory computer-readable storage medium and that are executed by one or more processors of a computer system, such as the one or more processors 202 of the computer system 101 (e.g., control unit 110 in FIG. 1A). Some operations in method 1000 are optionally combined and/or the order of some operations is optionally changed.

The method 1000 is optionally performed at a computer system (e.g., the computer system 101) in communication with a display generation component (e.g., the display generation component 120) and one or more input devices (e.g., the image sensors 314). In some embodiments, the computer system has one or more characteristics of the computer system of the method 800. In some embodiments, the display generation component has one or more characteristics of the display generation component of the method 800. In some embodiments, the one or more input devices have one or more of the characteristics of the one or more input devices of the method 800.

In some embodiments, the computer system displays (1002*a*), via the display generation component, a messaging user interface at a first location (e.g., the messaging user interface 908 of FIG. 9A in a user interface region, such as the user interfaces of methods 800 and/or 1200) in a three-dimensional environment (e.g., the three-dimensional environment has one or more of the characteristics of the environments of methods 800 and/or 1200) from a viewpoint of a user. The messaging user interface optionally includes a plurality of representations of messages (e.g., the plurality of representations of messages 914 of FIG. 9A, the representations of messages have one or more of the characteristics of the representations of messages and/or user interface objects of methods 800 and/or 1200), and the plurality of representations of messages includes a first representation of a first message (e.g., the representation of the message 910B of FIG. 9A) displayed at a first distance from the viewpoint of the user (e.g., the first distance 921 from the viewpoint 902 of the user of FIG. 9A).

In some embodiments, the computer system displays, via the display generation component, the three-dimensional environment from the viewpoint of the user at a location in the three-dimensional environment corresponding to the physical location of the computer system or user in the physical environment of the computer system. In some embodiments, displaying the three-dimensional environment from the viewpoint of the user includes displaying the three-dimensional environment from a perspective associated with the location of the viewpoint of the user in the three-dimensional environment. The plurality of representations of messages optionally include text content, image content, or a combination thereof.

In various embodiments, the representations of messages are displayed on, against, and/or in front of a background (e.g., backplane) of the messaging user interface. The background of the messaging user interface is optionally located at a distance from the viewpoint of the user. The distance of the background of the messaging user interface from the viewpoint of the user is optionally called the background distance. The first representation of the first message is optionally displayed with no separation distance from the background of the messaging user interface or optionally displayed with a first amount of separation distance (e.g., 0.1 cm, 0.2 cm, 0.5 cm, 1 cm, 3 cm, 5 cm, 10 cm or 20 cm) from the background of the messaging user interface (e.g., between a back portion of the first representation of the first message and a front portion of the background of the messaging user interface). The distance from the viewpoint of the user to the first representation of the first message is optionally the first distance. As such, when the first representation of the first message is optionally displayed with no separation distance from the background of the messaging user interface, the first distance is substantially similar or identical to the distance from the background of the messaging user interface to the viewpoint of the user. Likewise, when the first representation of the first message is optionally displayed with the first amount of separation distance from the background of the messaging user interface, the first distance is optionally the distance from the viewpoint of the user to the first representation of the first message, which, in this case, is optionally the first amount of separation distance subtracted from the distance from the viewpoint of the user to the background of the messaging user interface.

It should be noted that, in some embodiments, other representations of other messages of the plurality of representations of messages are at a same distance or a substantially similar distance to the viewpoint of the user as the first distance. Also, in some embodiments, other representations of other messages of the plurality of representations of messages are at a same or substantially similar distance to the background of the messaging user interface. Further, it should be noted that in some embodiments no input (e.g., gaze/interaction input) directed to the plurality of representations of messages including the first representation of the first message is detected while the distance of the first representation of the first message from the viewpoint of the user is the first distance.

In some embodiments, while displaying (1002*b*) the messaging user interface including the first representation of the first message displayed at the first distance from the viewpoint of the user, the computer system receives (1002*c*), via the one or more input devices, an input directed to the first representation of the first message (e.g., the gaze input 920, the input from the hand 922 of FIG. 9A). For example, in some embodiments, the input directed to the first representation of the first message includes user attention directed to the first representation of the first message (e.g., sight or gaze directed to the first representation of the first message), a hand of a user in a particular pose (e.g., raised at a position in front of the user, in a pre-pinch hand shape) at greater than a threshold hand distance (e.g., 0.2 cm, 0.5 cm, 1 cm, 2 cm, 3 cm, 5 cm, 10 cm, 20 cm, 40 cm, 100 cm, 200 cm or 500 cm) from the first representation of the first message, or any combination of the user attention, the hand of the user in the particular pose, and/or the hand of the user at the threshold hand distance.

In some embodiments, in response to receiving the input directed to the first representation of the first message, the computer system changes (1002*d*) a distance of the first representation of the first message from the viewpoint of the user to be a second distance (e.g., the second distance 930 from the viewpoint 902 of the user of FIG. 9B), different from (e.g., less than) the first distance (e.g., the first distance 921 from the viewpoint 902 of the user of FIG. 9B), while continuing to display the messaging user interface at the first location in the three-dimensional environment. For example, a depth of the first representation of the first message from the viewpoint of the user is changed. The first representation of the first message is optionally displayed with a second amount of separation distance (e.g., greater than the first amount of separation distance) from the background of the messaging user interface (e.g., the background 916 of the messaging user interface 908 of FIG. 9B) in response to receiving the input.

In some embodiments, the computer system displays an animation of the first representation of the first message moving away from the background of the messaging user interface (e.g., towards the viewpoint of the user) in response to receiving the input while the messaging user interface and/or background of the messaging user interface do not move in the three-dimensional environment (e.g., do not move towards, away from and/or relative to the viewpoint of the user). For example, the animation is optionally the animation 934 of FIG. 9C and/or the simulated shadow 942 of FIG. 9C growing in size until the representation of the message 910C is located at the second distance 930 from the viewpoint 902 of the user.

In some embodiments, the distances of different representations of different messages from the viewpoint of the user are changed based upon a direction associated with the input. For example, in response to the input being directed towards the first representation of the first message, the first representation of the first message optionally moves closer to the viewpoint of the user (and optionally the area of the field of view from the viewpoint of the user consumed by the first representation of the first message is increased by the computer system) while a second representation of a second message does not move closer to the viewpoint of the user. In response to the input being directed away from the first representation of the first message, the first representation of the first message optionally moves away from the viewpoint of the user (and optionally the area of the field of view from the viewpoint of the user consumed by the first representation is decreased by the computer system). In some embodiments, changing the distance of the first representation of the first message from the viewpoint of the user to be a second distance includes the second distance being greater than the first distance. For example, while the computer system 101 is displaying the messaging user interface 908 of FIG. 9A, in response to receiving input directed to the representation of the message 910B, the computer system optionally displays the messaging user interface 908 of FIG. 9B, in which the representation of the message 910B is located at the second distance 930. While the computer system 101 is displaying the messaging user interface 908 of FIG. 9B, in response to receiving input directed to the representation of the message 910C (e.g., input directed away from the representation of the message 910B), the computer system 101 optionally displays the representation of the message 910B at the first distance 921 from the viewpoint 902 of the user, which is optionally a distance greater than the second distance 930 from the viewpoint 902 of the user.

In some embodiments, the input directed to the first representation of the first message includes a selection of a button or icon (real or virtual) corresponding to a selection of the first representation of the first message (e.g., the representation of the message 910B of FIG. 9B) via a device of the one or more input devices (e.g., via a stylus, or via a mouse).

In some embodiments, before the input directed to the first representation of the first message is received, representations of the messages of the plurality of representations of messages are arranged in a first arrangement relative to each other and/or the viewpoint of the user (e.g., the arrangement of the representations of messages 910 in FIG. 9A). In some embodiments, the representations of the messages of the plurality of representations of messages are optionally displayed via the display generation component at a same distance from the background of the messaging user interface (e.g., at a substantially similar distance from the viewpoint of the user, such as the first distance 921 from the viewpoint 902 of the user in FIG. 9A). In some embodiments, when the input directed to the first representation of the first message is received, the first representation of the first message optionally moves relative to one or more other representations of other messages of the plurality of representations of messages to result in a second arrangement of the plurality of representations of messages, different from the first arrangement of the plurality of representations of messages, relative to each other and/or the viewpoint of the user (e.g., the arrangement of the representations of messages 910 of FIG. 9A, in which the representation of the message 910B is moved relative to other representations of messages 910).

The computer system optionally moves the first representation of the first message to a certain distance (e.g., 0.1 cm, 0.3 cm, 0.5 cm, 1 cm, 3 cm, 5 cm, 10 cm, or 20 cm) from the background of the messaging user interface (e.g., the third distance 931 from the background 916 in FIG. 9B) and maintains the first representation of the first message at that distance from the background of the messaging user interface until input (e.g., second input) is directed away from the first representation of the first message. It should be noted that the background distance of the background of the messaging user interface and/or the location of the background of the messaging user interface in the three-dimensional environment is optionally not changed in response to receiving the input. Also, other representations of other messages in the messaging user interface optionally do not incur a change in distance from the viewpoint of the user nor from the background of the messaging user interface in response to receiving the input.

In some embodiments, if a second input directed to a second representation of a second message of the plurality of representations of messages is received after the first input directed to the first representation of the first message of the plurality of representations of messages is received, then the computer system optionally changes both the distance of the first representation of the first message from the viewpoint of the user and the distance of the second representation of the second message from the viewpoint of the user. For example, in some embodiments, changing the distance of the first representation of the first message optionally involves increasing a distance of the first representation of the first message from the viewpoint of the user (e.g., moving the first representation of the first message back towards the background of the messaging user interface) and decreasing a distance of the second representation of the second message from the viewpoint of the user (e.g., moving the second representation of the second message away from the background of the messaging user interface). For example, while the computer system 101 is displaying the messaging user interface 908 of FIG. 9A, in response to receiving input directed to the representation of the message 910C, the computer system optionally displays the messaging user interface 908 of FIG. 9C, in which the representation of the message 910C is located at the second distance 930. While the computer system 101 is displaying the messaging user interface 908 of FIG. 9C, in response to receiving input directed to the representation of the message 910B (e.g., input directed away from the representation of the message 910C), the computer system 101 optionally displays the representation of the message 910C at the first distance 921 from the viewpoint 902 of the user, which is optionally a distance greater than the second distance 930 from the viewpoint 902 of the user.

Modifying the distance between a representation of a message and the viewpoint of the user in response to input directed to the representation of the message clearly indicates to which message further input will be directed, reducing errors in interaction with the computer system.

In some embodiments, the messaging user interface includes (1004*a*) a background (e.g., the background 916 of the messaging user interface 908 of FIG. 9B), different from the plurality of representations of messages, and when (1004b) the input directed to the first representation of the first message is received, the background of the messaging user interface has a first spatial relationship (e.g., distance and/or orientation) relative to the viewpoint of the user while displaying the messaging user interface including the first representation of the first message displayed at the first distance from the viewpoint of the user. The background of the messaging user interface optionally maintains (1004c) the first spatial relationship relative to the viewpoint of the user in response to receiving the input directed to the first representation of the first message.

The background of the messaging user interface is optionally positioned at a distance from the viewpoint of the user referred to herein as a background distance (e.g., the background distance 918 of FIG. 9A). The background of the messaging user interface optionally remains at the background distance when the input directed to the first representation the first message is received. In some embodiments, the orientation of the messaging user interface relative to the viewpoint of the user is additionally or alternatively maintained in response to receiving the input directed to the first representation of the first message. Representations of messages of the plurality of representations of messages of the messaging user interface are optionally arranged in front of the background of the messaging user interface from a perspective of the viewpoint of the user (e.g., the representations of messages 910A of FIG. 9A). Thus, in some embodiments, a distance between the representations of messages and the viewpoint of the user is optionally less than the background distance (e.g., the first distance 921 from the viewpoint 902 of the user is optionally less than the background distance 918 from the viewpoint 902 of the user in FIG. 9A). In some embodiments, a separation distance is optionally present between the representations of the messages and the background of the messaging user interface. In some embodiments, one or more representations of messages are superimposed on (e.g., in contact with) a portion of the background of the messaging user interface (e.g., the representation of the message 910C of FIG. 9A). For example, at the first distance from the viewpoint of the user, a two-dimensional representation of a message is optionally arranged on the messaging user interface such that the representation of the message is superimposed on the portion of the background of the message of user interface. In this case, the first distance between the viewpoint of the user and the representation of the message is optionally equal to (or substantially equal to) the background distance, when the representation of the message is at the first distance from the viewpoint of the user (e.g., the distance of the representation of the message 910C in FIG. 9A from the viewpoint 902 of the user is optionally equal to (or substantially equal to) the background distance 918 from the viewpoint 902). The background of the messaging user interface maintaining its spatial relationship relative to the viewpoint of the user in response to receiving the input directed to the first representation of the first message avoids excessive changes to the display of content, and thus reduces errors in user interaction with the computer system.

The messaging user interface optionally includes (1006a) an outer boundary corresponding to an edge of the messaging user interface. In some embodiments, the computer system displays (1006b), via the display generation component, an animation corresponding to a respective representation of a respective message in the messaging user interface (e.g., the animation 934 of FIG. 9B), wherein the animation extends beyond the outer boundary of the messaging user interface in the three-dimensional environment.

The outer boundary of the messaging user interface corresponding to the edge of the messaging user interface optionally extends perpendicular to a direction of movement of the first representation of the first message from the first distance from the viewpoint of the user to the second distance from the viewpoint of the user. The animation extending beyond the outer boundary of the messaging user interface is optionally displayed in multiple locations in the three-dimensional environment beyond the outer boundary of the messaging user interface. In some embodiments, the animation corresponding to the respective representation of the respective message is displayed in response to input (such as described above with reference to the first representation of the first message) directed to the respective representation.

In some embodiments, different representations of different messages are associated with different such animations. In some embodiments, the animation includes one or more of: virtual lighting effects (e.g., fireworks, laser effects, or another simulated 3D effect) applied to one or more portions of the messaging user interface and/or regions of the three-dimensional environment outside of the messaging user interface; or display of one or more virtual objects (e.g., balloons) separate from the respective representation moving across the three-dimensional environment. Displaying the animation corresponding to a respective representation of a respective message in the messaging user interface beyond the outer boundary of the messaging user interface provides a more immersive experience in the three-dimensional environment.

In some embodiments, the messaging user interface is displayed (1008a) within a messaging user interface region in the three-dimensional environment. In some embodiments, the computer system receives (1008b), via the one or more input devices, a second input directed to the first representation of the first message. The second input directed to the first representation of the first message optionally includes movement corresponding to a movement of the first representation of the first message to a location outside of the messaging user interface region. In response to receiving the second input directed to the first representation of the first message, the computer system optionally moves (1008c) the first representation of the first message to a location within the messaging user interface region and forgoes moving the first representation of the first message to the location outside of the messaging user interface region. For example, second input from the hand 922 of FIG. 9B optionally includes movement corresponding to a movement of the representation of the message 910B of FIG. 9B to a location outside of the messaging user interface region. In response to receiving the second input directed to the representation of the message 910B, the computer system optionally moves the representation of the message 910B to a location within the messaging user interface region (e.g., to a boundary of the user interface region) and forgoes moving the representation of the message 910B to the location outside of the messaging user interface region.

The messaging user interface region optionally includes an edge that encloses a messaging user interface along one or more axes perpendicular to a direction of movement of the first representation of the first message from the first distance from the viewpoint of the user to the second distance from the viewpoint of the user (e.g., an edge or border of the messaging user interface 908 of FIG. 9B perpendicular to the direction of movement of the representation of the message 910B of FIG. 9B). The first representation of the first message optionally does not move along the one or more axes to a position that is beyond the edge of the messaging user interface (e.g., the first representation of the first message is optionally constrained to movement within the boundaries of the messaging user interface). Keeping the plurality of representations of messages close to each other by foregoing moving the first representation of the first message to the location outside of the messaging user interface region reduces an amount of time of interaction with the computer system involved in a user attempt to locate a representation of a message of the plurality of representations of messages.

The plurality of representations of messages optionally includes (1010) a second representation of a second message. The first representation of the first message optionally includes a first type of content enclosed in a first three-dimensional virtual object of a third type (e.g., the representation of the message 910A of FIG. 9A) and the second representation of the second message optionally includes a second type of content enclosed in a second three-dimensional virtual object of the third type (e.g., the representation of the message 910D of FIG. 9A). The first representation of the first message optionally includes the content of the first message, such as text content, video content, image content, emoji content, three-dimensional content, or a combination thereof. The second representation of the second message optionally includes the content of the second message, such as text content, video content, image content, emoji content, three-dimensional content, or combination thereof, but different from the content of the first representation of the first message. The first three-dimensional virtual object of the third type is optionally a three-dimensional message bubble (or balloon) having a first set of visual characteristics (e.g., the representation of the message 910A of FIG. 9A). The first set of visual characteristics is optionally based upon whether the content enclosed by the first three-dimensional virtual object of the third type is content sent to a user of the computer system (e.g., from a user of a different computer system) or from the user of the computer system (e.g., to a user of a different computer system). For example, if the content enclosed by the first three-dimensional virtual object of the third type is content sent to the user of the computer system, the first three-dimensional virtual object of the third type optionally includes or has a first color (e.g., blue) that is different from a color of a three-dimensional virtual object corresponding to content sent from the user of the computer system. In some embodiments, the three-dimensional virtual object(s) of the third type are at least partially transparent such that the content in (e.g., inside) such virtual object(s) of the third type is visible from the viewpoint of the user. Displaying different types of message content in three-dimensional virtual objects of the third type provides consistency of presentation.

The first type of content and the second type of content are optionally (1012) two-dimensional content (e.g., the content of the representation of the message 910C of FIG. 9A); the plurality of representations of messages optionally includes a representation of a message including three-dimensional content (e.g., the representation of the message 910G of FIG. 9A); the three-dimensional content is optionally not enclosed in a three-dimensional virtual object of the third type. The first type of content and the second type of content are optionally as described above. For example, the first type of content is optionally text content, and the second type of content is optionally video content, image content, emoji content, three-dimensional content, or a combination thereof (that optionally includes text content). It should be noted that a given representation of a message optionally includes multiple types of content. For example, a representation of a message optionally includes the first type of content and the second type of content. In some embodiments, the three-dimensional content of the representation of the message is not (e.g., visually) enclosed in a or any three-dimensional virtual object, in contrast to two-dimensional message content that is optionally enclosed in a three-dimensional virtual object, as described above. In some embodiments, the three-dimensional content of the representation of the message is displayed in front of a background of the message of user interface. Displaying three-dimensional content that is not enclosed in a three-dimensional virtual object of the third type causes the messaging user interface to be less crowded with user interface elements, which reduces errors in user interaction with the messaging user interface.

In some embodiments, the plurality of representations of messages (1014a) include a second representation of a second message (e.g., the representation of the message 910D of FIG. 9A). The first message is optionally (1014b) sent by a first user (e.g., the user of the computer system sent the first message to a different user of a different computer system). The second message is optionally (1014c) sent by a second user, different from the first user (e.g., a user of a different computer system sent the second message to the user of the computer system (e.g., the computer system 101 of FIG. 9A)). The messaging user interface optionally includes a first set of representations of messages including the first representation of the first message and having first visual characteristics (e.g., the representations of messages 910A-C) and a second set of representations of messages including the second representation of the second message and having second visual characteristics (e.g., the representations of messages 910D-G), different from the first visual characteristics. In some embodiments, the first set of representations of messages includes representations of messages sent by the first user and the second set of representations of messages includes representations of messages sent by the second user different from the first user. As such, inclusion of a message in the first set of representations of messages is optionally based upon whether the message is sent by the first user and inclusion of a message in the second set of representations of messages is optionally based upon whether the second message is sent by a user different from the first user. Also, in some embodiments, a message sent to the first user and a message sent from the first user are optionally the same message (e.g., a user sending a message to the user). In such a case, the content within the message sent to the first user and from the first user is optionally the same, and on the messaging user interface, the content of such a message is optionally included in a representation of a message in the first set of representations of messages and in a representation of a message in the second set of representations of messages.

The first visual characteristics corresponding to the first set of representations of messages including the first representation of the first message (e.g., the representations of messages 910A-C) optionally include a first arrangement of the first set of representations of messages including the first representation of the first message in the messaging user interface. The second visual characteristics corresponding to the second set of representations of messages including the second representation of the second message (e.g., the representations of messages 910D-G) optionally include a second arrangement of the second set of representations of messages including the second representation of the second message in the messaging user interface, different from the first arrangement of the first set of representations of messages. For example, the first set of representations of messages is optionally arranged on the messaging user interface at a first portion (e.g., first region) or in a first alignment (e.g., left-aligned) in the messaging user interface, and the second set of representations of messages is optionally arranged on the messaging user interface at a second portion (e.g., second region, different from the first region) or in a second alignment (e.g., right-aligned) in the messaging user interface.

Additionally or alternatively, the first visual characteristics corresponding to the first set of representations of messages (e.g., the representations of messages 910A-C) optionally correspond to a first color, and the second visual characteristics corresponding to the second set of representations of messages (e.g., the representations of messages 910D-G) optionally correspond to a second color different from the first color. For example, the first set of representations of messages is optionally enclosed in a first set of corresponding three-dimensional objects having the first color, and the second set of representations of messages is optionally enclosed in a second set of corresponding three-dimensional objects having the second color. It should be noted that one or more visual characteristics of the first visual characteristics and/or of the second visual characteristics are optionally not based on a type of content in the plurality of representations of messages. For example, the second set of representations of messages may include a representation of a message including three-dimensional content (e.g., the representation of the message 910G). In this example, the representation of the message including the three-dimensional content may include the second arrangement of the first set of representations of messages without including the second color of the second set of the representations of messages (e.g., the representation of the message including three-dimensional content is not enclosed in a three-dimensional object of the third type). As such, in some embodiments, the set of representations of messages optionally includes at least one shared visual characteristic that is not based on a type of content in the plurality of representations of messages. Displaying representations of messages sent by a first user (e.g., sender messages) and representations of messages sent by a second user different from the first user (e.g., recipient messages) allows the user to have access to messages from multiple relevant users.

The input directed to the first representation of the first message optionally (1016) includes a gaze of the user (e.g., the gaze input 920 of FIG. 9A) directed to the first representation of the first message. The computer system optionally detects the gaze of the user directed to the first representation of the first message when or as the user of the computer system is looking at the first representation of the first message. Allowing interaction with representations of messages based on the gaze of the user allows for easier and more seamless interaction with the messaging user interface of the computer system.

The input directed to the first representation of the first message optionally (1018) includes a predefined portion of the user in a respective pose (e.g., the input from the hand 922 of FIG. 9A). The predefined portion of the user optionally includes one or more limbs of the user, one or more fingers of the user, one or more hands of the user, one or more other portions of the user, or a combination thereof. In some embodiments, the predefined portion of the user optionally includes any portion of a body of the user. The predefined portion of the user in a respective pose is optionally the predefined portion of the user in a particular position and/or orientation relative to a portion of the user, the computer system, or a combination thereof. For example, the predefined portion of the user in a respective pose is optionally a finger of the user pointing toward the first representation of the first message (e.g., a hand in ready state, as described above in this present disclosure) or the hand of the user in any pose corresponding to the ready state. In this case, the input directed to the first representation of the first message optionally includes the finger of the user pointing toward the first representation of the first message and a gaze of the user looking toward the first representation of the first message. Any one or combination of the predefined portion of the user, as described above, in any pose(s) is optionally included in the input directed to the first representation of the first message. The input directed to the first representation of the first message including the gaze of the user directed to the first representation of the first message and a predefined portion of the user in a respective pose avoids unintentional interaction with the first representation of the first message.

In some embodiments, while the first representation of the first message is displayed at the first distance from the viewpoint of the user, wherein the first representation of the first message is displayed at a second location in the messaging user interface, and wherein the first representation of the first message has a first visual appearance (e.g., the representation of the message 910C of FIG. 9A), the computer system receives (1020a), via the one or more input devices, a second input directed to the first representation of the first message, wherein the second input directed to the first representation of the first message includes a gaze of the user directed to the first representation of the first message (e.g., the gaze input 920 on the representation of the message 910C of FIG. 9A).

The computer system optionally detects the gaze of the user directed to the first representation of the first message. The first visual appearance of the first representation of the first message is optionally an appearance of the first representation of the first message without a highlight having been applied to the first representation of the first message (e.g., the appearance of the representation of the message 910C of FIG. 9A). The first visual appearance of the message representation of the first message is optionally an appearance of the first representation of the first message being two-dimensional and/or in contact with the background of the messaging user interface (e.g., being the first distance from the viewpoint of the user).

In some embodiments, in response to receiving the second input directed to the first representation of the first message (1020b), and in accordance with a determination that the second input directed to the first representation of the first message does not include a predefined portion of the user in a respective pose (e.g., the hand of the user is not in a ready state pose), the computer system displays (1020c), via the display generation component, the first representation of the first message with a second visual appearance, different from the first visual appearance (e.g., the representation of the message 910C of FIG. 9E). The first representation of the first message is optionally displayed at the second location in the messaging user interface. The second visual appearance of the first representation of the first message is optionally a highlighted appearance of the first representation of the first message.

In some embodiments, in response to receiving the second input directed to the first representation of the first message, and in accordance with a determination that the second input directed to the first representation of the first message does not include a predefined portion of the user in a respective pose, the computer system maintains (1020*d*) the first distance of the first representation of the first message from the viewpoint of the user (e.g., the representation of the message 910C of FIG. 9E).

In some embodiments, the first representation of the first message is a two-dimensional virtual object. In some embodiments, in response to receiving the first input directed to the first representation of the first message, the computer system optionally changes a distance of the first representation of the first message from the viewpoint of the user to be the second distance from the viewpoint of the user, different in the first distance from the viewpoint of the user, as described previously. In some embodiments in which the first representation of the first message is a two-dimensional object, in response to receiving the first input directed to the first representation of the first message, the computer system optionally causes the displayed first representation of the first message to transform from a two-dimensional virtual object to a three-dimensional virtual object, optionally in addition to changing a distance of the first representation of the first message from the viewpoint of the user to be the second distance from the viewpoint of the user, different in the first distance from the viewpoint of the user, as described previously.

In contrast, in some embodiments, in response to receiving the second input directed to the first representation of the first message, and in accordance with the determination that the second input directed to the first representation of the first message does not include a predefined portion of the user in a respective pose, the first representation of the first message does not transform into a three-dimensional virtual object. Instead, the first representation of the first message optionally modifies its two-dimensional characteristics. For example, in response to receiving the second input directed to the representation of the message 910C of FIG. 9A, and in accordance with the determination that the second input directed to the representation of the message 910C does not include a predefined portion of the user in a respective pose, the computer system optionally causes the display generation component to display the representation of the message 910C with a highlight applied to at least a portion of the first representation of the first message or changes any other visual characteristic of the representation of the message 910C (e.g., brightness, saturation, opacity and/or color) to visually differentiate the first representation of the first message from other representations of other messages in the messaging user interface (e.g., the visual appearance of the representation of the message 910C of FIG. 9E is different from the visual appearance of the other representations of messages 910 in FIG. 9E due to the highlight 950 applied to the representation of the message 910C). Changing the visual appearance of the first representation of the first message without changing the distance between the representation of the message and the viewpoint of the user indicates that input is directed to the first representation of the first message but that additional input can still be provided to interact with the first representation of the first message.

The input directed to the first representation of the first message optionally includes (1022) a request to select the first representation of the first message. The request to select the first representation of the first message optionally corresponds to the input including attention of the user (e.g., the gaze input 920 of the user) directed to the first representation of the first message (e.g., the representation of the message 910B of FIG. 9A) and/or a predefined portion of the user (e.g., a hand of the user) in a respective pose (e.g., such as described above) and/or performing a respective gesture, such as an air pinch gesture in which the thumb and index finger of the hand of the user come together and touch. The request to select the first representation of the first message optionally causes the computer system to change the distance of the first representation of first message from the viewpoint of the user in one or more of the ways described herein. Modifying the distance between a representation of a message and the viewpoint of the user in response to detecting that the input directed to the first representation of the first message includes a request to select the first representation of the first message conveys to the user of the computer system which representation of a message is the target of the selection input.

In some embodiments, the input directed to the first representation of the first message includes (1024) a request to respond to the first message. The request to respond to the first message optionally involves a "tap back" (e.g., a quick response) corresponding to initiating a response to the first message. The tap back corresponding to initiating the response to the first message is optionally a request to respond to the first message with one or more preselected effects or expressions (e.g., a love expression, a laugh expression, a question expression, a thumbs-up expression, or a thumbs-down expression). In some embodiments, the input directed to the first representation of the first message corresponds to a request to respond in non-preselected ways to the first message. For example, the computer system 101 optionally moves the representation of the message 910B to the second distance 930 from the viewpoint 902 of the user in response to the input directed to the representation of the message 910B including a request to respond to the message. Modifying the distance between a representation of a message and the viewpoint of the user in response to detecting the input directed to the first representation of the first message includes a request to respond to the first message conveys clarity to the user of the computer system with regard to which message is being replied-to.

In some embodiments, the input directed to the first representation of the first message includes (1026) a request to display content (e.g., image or video content) associated with the first message. In some embodiments, the content associated with the first message is not displayed prior to receiving the input directed to the first representation of the first message. In some embodiments, in response to receiving the input directed to the first representation of the first message, the content associated with the first message is optionally displayed. For example, if the content associated with the first message is video content (e.g., the first message is a link to the video content), in response to the input directed to the first representation of the first message, the computer system displays the video content in the three-dimensional environment. As another example, the computer system 101 optionally moves the representation of the message 910C to the second distance 930 from the viewpoint 902 of the user, as illustrated in FIG. 9C, in response to the input directed to the representation of the message 910C including a request to display content associated with the message. At the distance of the representation of the message 910C in FIG. 9A from the viewpoint 902 of the user, which is optionally similar to the background distance 918 from the viewpoint 902 of the user, some content associated with the representation of the message 910C is optionally not displayed. At the second distance 930 from the viewpoint 902 of the user, the computer system 101 optionally causes display of the content associated with the message. Modifying the distance between a representation of a message and the viewpoint of the user in response to detecting the input directed to the first representation of the first message conveys clarity to the user of the computer system with regard to the message associated with the displayed content.

In some embodiments, while displaying, via the display generation component, the first representation of the first message at the second distance from the viewpoint of the user, wherein the viewpoint of the user is a first viewpoint (e.g., a first distance and/or orientation relative to the messaging user interface and/or three-dimensional environment), and the first representation of the first message is separated from a background of the messaging user interface by a first separation distance, the computer system detects (1028*a*) movement of the viewpoint of the user from the first viewpoint to a second viewpoint, different from the first viewpoint (e.g., the position of the viewpoint 902 of the user in FIG. 9B to the position of viewpoint of the user in FIG. 9D). The background of the messaging user interface is optionally fixed in the three-dimensional environment. In some embodiments, the input to move the viewpoint of the user from the first viewpoint to the second viewpoint corresponds to corresponding movement of the user in the physical environment (e.g., movement of the user, a change in orientation of the head of the user and/or a change in orientation of the torso of the user).

In some embodiments, in response to detecting the movement of the viewpoint of the user from the first viewpoint to the second viewpoint, the computer system displays (1028*b*), via the display generation component, the messaging user interface from the second viewpoint (e.g., the representations of the messages 910A-910C of FIG. 9D). Displaying the messaging user interface from the second viewpoint optionally includes, in accordance with a determination that a viewing angle of the messaging user interface from the second viewpoint exceeds a threshold viewing angle (e.g., relative to the normal of the messaging user interface), moving (1028*c*) the first representation of the first message to a second separation distance (e.g., 0, 0.1, 0.3, 0.5, 1, 3, 5, or 10 cm), less than the first separation distance, from the background of the messaging user interface (e.g., the representations of the messages 910A-910C of FIG. 9D).

The plurality of representations of messages including the first representation of the first message optionally change distance(s) (e.g., separation distances) from the background of messaging user interface based upon a viewing angle of the messaging user interface from the viewpoint of the user. For example, when the viewing angle of the messaging user interface from the viewpoint of the user is within a threshold viewing angle (e.g., 9 degrees, 20 degrees 40 degrees, or 80 degrees), the plurality of representations of messages are optionally displayed, via the display generation component, at their default and/or extended distances (e.g., in response to user input, as previously described) from the background of the messaging user interface (e.g., the representations of messages 910 of FIGS. 9A-C and/or 9E). In some embodiments, the viewing angle is determined based on a viewing angle of the background of the messaging user interface. When the viewing angle of the messaging user interface from the viewpoint of the user exceeds the threshold viewing angle, the plurality of representations of messages are optionally displayed, via the display generation component, in another arrangement (e.g., the arrangement of the representations of messages 910 of FIG. 9D). Specifically, in some embodiments, in accordance with the determination that a viewing angle of the messaging user interface from the viewpoint of the user exceeds the threshold viewing angle, the plurality of representations of messages including the first representation of the first message optionally move to a distance closer to the background of the messaging user interface (reducing a separation distance of the plurality of representations of message from the background of the messaging user interface).

Moving the first representation of the first message to the second separation distance, less than the first separation distance, from the background of the messaging user interface, in accordance with the determination that a viewing angle of the messaging user interface from the second viewpoint exceeds a threshold viewing angle reduces obstruction of the three-dimensional environment with representations of messages that are separated from the background of the messaging user interface when the viewpoint of a user is above the threshold viewing angle.

In some embodiments, in response (1030*a*) to receiving the input directed to the first representation of the first message, the computer system displays (1030*b*) a simulated shadow associated with the first representation of the first message in the messaging user interface in response to changing the distance of the first representation of the first message from the viewpoint of the user to be the second distance (e.g., the simulated shadow 934 of FIG. 9B and the simulated shadow 942 of FIG. 9C). For example, in response to receiving the input directed to the first representation of the first message, the first representation of the first message optionally translates to the second distance from the viewpoint of the user that is closer than the first distance from the viewpoint of the user. The other representations of the other messages of the messaging user interface optionally remain at their respective distances from the background of the messaging user interface (e.g., respective background distances) and from the viewpoint of the user as before the translation of the first representation of the first message to the second distance. The computer system optionally simulates a shadow associated with the first representation of the first message on at least one other representation of a message of the plurality of representations of messages and/or the background of the messaging user interface. In some embodiments, the simulated shadow associated with the first representation of the first message and on the at least one of the representations of the message of the plurality of representations of messages grows in area/size during the translation of the first representation of the first message to the second distance from the viewpoint of the user (e.g., the size of the simulated shadow increases as the separation distance of the first representation of the first message increases). Additionally or alternatively, a level of blurriness of the simulated shadow optionally increases in response to the first representation of the first message increasing in separation distance. Additionally or alternatively, a level of darkness associated with the simulated shadow optionally decreases in response to the first representation of the first message increasing in separation distance. It should be noted that the dimensionality of the first representation of the first message is optionally up to three-dimensions. Accordingly, a simulated shadow associated with the first representation of the first message is optionally associated with a representation of a message that is two-dimensional or three-dimensional. Displaying a simulated shadow associated with the first representation of the first message in the messaging user interface in response to changing the distance of the first representation of the first message from the viewpoint of the user to be the second distance further conveys to the user that the first representation of the first message is the target of the user input.

In some embodiments, when the input directed to the first representation of the first message is received, the first representation of the first message is a two-dimensional virtual object (e.g., the representation of the message 910C of FIG. A). In some embodiments, in response to receiving the input directed to the first representation of the first message, the computer system transforms (1032b) the first representation of the first message into a three-dimensional virtual object (e.g., the representation of the message 910C of FIG. 9C). In some embodiments, the first representation of the first message is a two-dimensional virtual object. In some embodiments, the content of the first representation of the first message is optionally no more than two-dimensional content. In response to receiving the input directed to the first representation of the first message, the first representation of the first message optionally transforms into a three-dimensional virtual object. In such cases, the transformation of the first representation of the first message into the three-dimensional virtual object optionally involves displaying the content of the first representation of the first message within a three-dimensional virtual object of the third type, as described above in this present disclosure. In some embodiments, one or more characteristics of transitioning the two-dimensional virtual object into the three-dimensional virtual object are optionally as described with reference to methods 800 and/or 1200. Transforming the first representation of the first message from a two-dimensional virtual object into a three-dimensional virtual object further conveys to the user that the first representation of the first message is the target of the user input.

It should be understood that the particular order in which the operations in method 1000 have been described is merely exemplary and is not intended to indicate that the described order is the only order in which the operations could be performed. One of ordinary skill in the art would recognize various ways to reorder the operations described herein.

FIGS. 11A-11C illustrate examples of a computer system transitioning virtual objects from a three-dimensional appearance to a two-dimensional appearance and from a two-dimensional appearance to a three-dimensional appearance in accordance with some embodiments.

FIG. 11A illustrates a three-dimensional environment 1107 visible via a display generation component (e.g., display generation component 120 of FIG. 1) of a computer system 101, the three-dimensional environment 1107 visible from a viewpoint of a user. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 11A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1107 and/or the physical environment is visible in the three-dimensional environment 1107 via the display generation component 120. For example, three-dimensional environment 1107 visible via display generation component 120 includes representations of the physical floor and back and side walls of the room in which computer system 101 is located. Three-dimensional environment 1107 also includes sofa 1108.

In FIG. 11A, three-dimensional environment 1107 also includes virtual objects 1101 (corresponding to object 1101 in the side view 1106), 1104a (corresponding to object 1104a in the side view 1106), and 1105a (corresponding to object 1105a in the side view 1106). In the example illustrated embodiment of FIG. 11A, virtual object 1101 is a two-dimensional object and is a messaging user interface 1101, such as described in more detail with reference to method 1200. The messaging user interface 1101 includes one or more virtual objects 1104a and 1105a. As will be shown and described later, virtual objects 1104a and 1105a are scrollable three-dimensional objects and are representations of conversational messages, respectively, as described in more detail with reference to method 1200. In some embodiments, virtual objects 1104a and 1105a include respective three-dimensional properties 1104b and 1105b, as described in more detail with reference to method 1200, that are adjusted to provide a visual appearance, wherein the visual appearance of the virtual objects 1104a and 1105a gradual changes from a three-dimensional appearance to a two-dimensional appearance or from a two-dimensional appearance to a three-dimensional appearance based on the scrolling position of the virtual objects in the messaging user interface 1101, as will be described in more detail below.

In some embodiments, the virtual objects 1104a and 1105a located or provided at a particular location are optionally rendered for display having the three-dimensional appearance, as will be described in more detail below. For example, in FIG. 11A, virtual objects 1104a and 1105a are located in the middle (e.g., between the top boundary 1101a and the bottom boundary 1101b) of the messaging user interface as reflected in a side view glyph 1106. Glyph 1106 illustrates the side view of a portion of the three-dimensional environment 1107 presented via display generation component 120. The glyph 1106 indicates the relative positions and/or separations of the messaging user interface 1101 and virtual objects 1104a and 1105a in the three-dimensional environment 1107. In FIG. 11A, virtual objects 1104a and 1105a have a three-dimensional visual appearance (e.g., have a thickness or depth according to their position in the messaging user interface 1101) in the three-dimensional environment 1107, as shown in glyph 1106. Further, virtual objects 1104a and 1105a are separated from the surface of messaging user interface 1101, as shown in glyph 1106. In FIG. 11A, virtual objects 1104a and 1105a's respective three-dimensional property corresponds to a degree (e.g., darker, and/or more visible) of simulated shadow cast by virtual objects 1104a and 1105a, respectively. Example visual appearances for virtual objects 1104a and 1105a are provided below in the description of method 1200.

In some embodiments, the computer system 101 updates the positions of virtual objects 1104a and 1105a in the messaging user interface 1101 in accordance with a scrolling input provided by a hand 1103 of the user of computer system 101 to move one or more of the virtual objects 1104a and 1105a within the messaging user interface 1101, accordingly. For example, a scrolling input optionally includes movement the hand 1103 of the user of computer system 101 while in a pinch hand shape (e.g., a pinch air gesture input as described with reference to method 1200).

As shown in FIG. 11A, the computer system 101 detects an input directed to the messaging user interface 1101 that includes detecting an air gesture (e.g., a direct input or an indirect input described herein) performed with hand 1103 that corresponds to a request to scroll the one or more of the virtual objects 1104a and 1105a. In some embodiments, detecting the air gesture includes detecting the hand 1103 of the user performing an air pinch gesture (e.g., two or more fingers of a user's hand such as the thumb and index finger moving together and touching each other) to form a pinch hand shape while attention (e.g., gaze) of the user is directed to a region of the messaging user interface 1101 and/or one or more of the virtual objects 1104a and 1105a, followed by movement of the hand in the pinch hand shape upward or downward, which optionally causes the virtual objects 1104a and 1105a to scroll upward or downward, respectively, in messaging user interface 1101. In some embodiments, the input corresponds to a gesture other than the air pinch gesture, such as a forward pointing gesture (e.g., a forward movement of a user's hand while one or more fingers of the user's hand are extended towards one or more of the virtual objects 1104a and 1105a) or a tap gesture with a finger of the user's hand (e.g., a forward movement by a finger of the user's hand such that the finger touches one or more of the virtual objects 1104a and 1105a or the region of the messaging user interface 1101 or approaches within a threshold distance of one or more of the virtual objects 1104a and 1105a or the region of the messaging user interface 1101), following by upward/downward movement of the hand while the finger(s) is touching the virtual objects 1104a and 1105a and/or the messaging user interface 1101. In some embodiments, in response to the input illustrated in FIG. 11A, the computer system 101 scrolls the virtual objects 1104a and 1105a in accordance with the user input as described above. Scrolling the virtual objects 1104a and 1105a optionally includes updating their locations (e.g., moving towards a top boundary 1101a of the messaging user interface 1101). In some embodiments, while moving the virtual objects 1104a and 1105a, the computer system 101 gradually changes the visual appearances of the virtual objects 1104a and 1105a based on the updated locations of virtual objects 1104a and 1105a (e.g., having a reduced thickness or depth, and/or separation from messaging user interface 1101 according to their position in the messaging user interface 1101) in the three-dimensional environment 1107, as shown in FIGS. 11B and 11C.

FIG. 11B illustrates how the computer system 101 gradually changes the visual appearances of the virtual objects 1104a and 1105a based on the updated locations of virtual objects 1104a and 1105a. In some embodiments, in response to receiving the input to scroll the virtual objects 1104a and 1105a from FIG. 11A to 11B, the computer system 101 scrolls the virtual objects 1104a and 1105a in an upwards direction 1102 towards the top boundary 1101a of the messaging user interface 1101. In some embodiments, in response to receiving the input to scroll the virtual objects 1104a and 1105a, the computer system 101 displays the virtual objects 1104a and 1105a at different locations from FIG. 11A to 11B. For example, FIG. 11B shows the location of virtual objects 1104a and 1105a closer to the top boundary 1101a of the messaging user interface 1101 than in FIG. 11A when the location of virtual objects 1104a and 1105a were at a middle point (e.g., in-between the top boundary 1101a and bottom boundary 1101b) of the messaging user interface 1101. In FIG. 11B, the locations of virtual objects 1104a and 1105a are within a threshold distance (e.g., 0.1, 0.3, 0.5, 1, 3, 5, 10, 20, 50 or 100 cm) from the top boundary of 1101a of the messaging user interface 1101.

In some embodiments, in response to receiving the input to scroll the virtual objects 1104a and 1105a and because the virtual objects 1104a and 1105a are within the threshold distance of the top boundary 1101a of messaging user interface 1101, the computer system 101 displays virtual objects 1104a and 1105a at their respective locations in the messaging user interface 1101 with a changed visual appearance (e.g., modification of the visual appearances of virtual objects 1104a and 1105a from FIG. 11A to FIG. 11B). In FIG. 11A, virtual object 1104a has (e.g., is displayed with) a first visual appearance having a first three-dimensional property with a first value (e.g., has a first size, has a first brightness/light, has a first position, has a first color, and/or has a first effect) different from (e.g., greater than, less than, more pronounced than, less pronounced than) a second value, such as the visual appearance of virtual object 1104a shown in FIG. 11B (e.g., a second size less than the first size, a second brightness/light less than the first brightness/light, a second position closer to the messaging user interface 1101 than the first position, a second color less vibrant than the first color, a second effect less pronounced than the first effect). For example, in FIG. 11A, virtual object 1104a and virtual object 1105a have a first degree of specular highlight (e.g., 1104b and 1105b) for the first three-dimensional property brightness/light. The first degree to which virtual objects 1104a and 1105a respective specular highlight is displayed optionally appears more intense (shiner) than the second degree of specular highlight (e.g., 1104b and 1105b) for the first three-dimensional property brightness/light as displayed in FIG. 11B. Virtual objects 1104a and 1105a having the second degree of specular highlight (e.g., 1104b and 1105b) optionally creates the appearance that virtual objects 1104a and 1105a are less intense, dull in FIG. 11B. In some embodiments, virtual objects 1104a and 1105a are within the threshold distance from the top boundary of 1101a of the messaging user interface 1101, but virtual object 1104a is closer to the top boundary 1101a than virtual object 1105a as shown in FIG. 11B. Optionally, the first three-dimensional property of virtual object 1104a has a value corresponding to a lesser degree (e.g., dimmer, smaller, and/or less intense) of specular highlighting 1104b displayed on virtual object 1104a compared to the first three-dimensional property of virtual object 1105a with a value corresponding to a brighter, larger, and/or an intense specular highlighting 1105b displayed on virtual object 1105a as shown in FIG. 11B. In some embodiments, the above change in visual appearance of virtual objects 1104a and 1105a additionally or alternatively applies to other virtual objects (e.g., virtual object 1110a) that are moved/relocated in the messaging user interface 1101 in response to the first input.

In some embodiments, scrolling the virtual objects 1104a and 1105a in the upwards direction 1102 using hand 1103 reveals additional virtual objects 1109a and 1110a at the bottom of the messaging user interface 1101. FIG. 11B includes glyph 1106 illustrating the relative positions and/or separations of the messaging user interface 1101 and virtual objects 1104a, 1105a, 1109a, and 1110a in the three-dimensional environment 1107. In FIG. 11B, virtual objects 1104a and 1105a have a three-dimensional visual appearance (e.g., have a thickness or depth and/or separation from messaging user interface 1101 according to their respective position in the messaging user interface 1101) in the three-dimensional environment 1107, as shown in glyph 1106. For example, virtual object 1104a located closer to the top boundary 1101a of the messaging user interface 1101 is shown with a smaller distance (e.g., separation) from the messaging user interface 1101 compared to virtual object 1105a, as shown in glyph 1106. Virtual object 1104a is optionally shown with the first three-dimensional property having a lesser degree of three-dimensional depth or thickness compared to virtual object 1105a. In some embodiments, virtual objects 1109a and 1110a are shown with no distance or separation from the messaging user interface 1101 which indicates that virtual objects 1109a and 1110a have a more two-dimensional visual appearance. In FIG. 11B, virtual objects 1104a and 1105a's respective three-dimensional property corresponds to a lesser degree (e.g., lighter, and/or less visible) of simulated shadow cast by virtual objects 1104a and 1105a, respectively. Example visual appearances for virtual objects 1104a, 1105a, 1109a, and 1110a are provided below in the description of method 1200.

In some embodiments, if the virtual object has a visual appearance corresponding to a two-dimensional object, then its visual appearance would remain unchanged regardless of the location of the virtual object. Glyph 1106 of FIG. 11B shows virtual object 1109a as flat (e.g., no three-dimensional depth or thickness) and/or having no separation (distance) between virtual object 1109a and the surface (backplane) of the messaging user interface 1101 because virtual object 1109a is a two-dimensional object, and will remain a two-dimensional object as will be described in FIG. 11C. Glyph 1106 of FIG. 11B also shows virtual object 1110a as flat and/or having no separation between virtual object 1110a and the surface of the messaging user interface 1101; however, in contrast to virtual object 1109a, virtual object 1110a will have a changed visual appearance (e.g., more three-dimensional) as virtual object 1110a scrolls upward, as will be described in FIG. 11C. In some embodiments, the type of virtual object indicates that virtual object 1109a is a two-dimensional object and that its visual appearance remain persistently two-dimensional. The types of two-dimensional virtual objects optionally include photo messages, video messages, webpage messages, attachment messages, and/or location messages.

From FIG. 11B to 11C, computer system 101 detects a continued upward scrolling input from hand 1103, and in response to receiving the input to scroll the messaging user interface 1101, the computer system 101 scrolls the virtual objects 1104a, 1105a, 1109a, and 1110a in an upwards direction 1102 further towards the top boundary 1101a of the messaging user interface 1101, as shown in FIG. 11C. In some embodiments, in response to receiving the input to scroll the messaging user interface 1101, the computer system 101 displays the virtual objects 1104a, 1105a, 1109a, and 1110a at different locations from FIG. 11B to 11C. For example, FIG. 11C shows the location of virtual object 1105a even closer to the top boundary 1101a of the messaging user interface 1101 than in FIG. 11B. Virtual object 1104a has now reached the top boundary 1101a of the messaging user interface 1101, and in response, the computer system 101 displays virtual object 1104a faded, visually deemphasized, see-through, blurred, and/or having a more transparent visual appearance, and then subsequently and in accordance with further upward movement of virtual object 1104a, optionally displays an animation of virtual object 1104a fading away and/or ceasing display. In some embodiments, such reduced opacity and/or fading away of virtual objects also occurs when virtual objects are near or straddle bottom boundary 1101b of messaging user interface 1101.

As shown in FIG. 11C, virtual object 1105a is located even closer to the top boundary 1101a of the messaging user interface 1101 than in FIG. 11B and optionally includes a degree of specular highlight (e.g., 1105b) for the first three-dimensional property brightness/light. The degree to which virtual object 1105a specular highlight is displayed optionally appears even more dimmer, smaller, and/or with even less intensity compared to when the virtual object 1105a was located further from the top boundary 1101a and closer to the middle of the messaging user interface 1101, as shown in FIG. 11B. In contrast, virtual object 1110a has been scrolled away from the bottom 1101b boundary of the messaging user interface 1101 and is now located at a location within a threshold distance from the bottom 1101b boundary. In some embodiments, the computer system 101 displays virtual object 1110a with a first three-dimensional property having a value corresponding to a greater degree of specular highlight (e.g., brighter, larger, and/or more intense) and as such, virtual object 1110a is rendered for display having a more three-dimensional appearance and/or less of a two-dimensional appearance, as shown in FIG. 11C.

In some embodiments, the above change in visual appearance does not apply to other virtual objects that are moved/reoriented in messaging user interface 1101 and/or the three-dimensional environment 1107 in response to the scrolling input. For example and as shown in FIG. 11C, in response to receiving the input to scroll the virtual objects 1109a and 1110a upward, the computer system 101 scrolls the virtual objects 1109a and 1110a in an upwards direction 1102 towards the top boundary 1101a of the messaging user interface 1101. In some embodiments, computer system 101 optionally does not automatically change the visual appearance of virtual object 1109a—instead, virtual object 1109a optionally remains having a visual appearance corresponding to a two-dimensional object while moving locations in the messaging user interface 1101 as shown in FIG. 11C, even if virtual object 1109a is further than the above-described threshold distance of the top boundary 1101a and/or bottom boundary 1101b of messaging user interface 1101. Thus, in some embodiments, a required condition for changing the visual appearance of virtual objects is that the virtual object corresponds to a first type of content (e.g., text content), as described in more detail with reference to method 1200.

FIG. 11C also includes glyph 1106 illustrating the relative positions and/or separations of the messaging user interface 1101 and virtual objects 1104a, 1105a, 1109a, and 1110a in the three-dimensional environment 1107. In FIG. 11C, virtual objects 1104a and 1105a have more of a two-dimensional visual appearance (e.g., have a thickness or depth and/or separation from messaging user interface 1101 according to their respective position in the messaging user interface 1101) in the three-dimensional environment 1107, as shown in glyph 1106. For example, virtual object 1104a has reached the top boundary 1101a of the messaging user interface 1101 and is shown only partially displayed compared to virtual object 1105a which is displayed with an even smaller distance (e.g., separation) from the messaging user interface 1101 and having a lesser degree of three-dimensional depth or thickness compared to virtual object 1110a, as shown in glyph 1106. In some embodiments, virtual object 1109a does not meet the required condition for changing its visual appearance from two-dimensional to three-dimensional and thus, is still shown with no distance or separation from the messaging user interface 1101 and with no thickness (e.g., same as in FIG. 11B), which indicates that virtual object 1109a has maintained its two-dimensional visual appearance. In some embodiments, virtual object 1110a does meet the required condition for changing its visual appearance from two-dimensional to three-dimensional and is shown with some distance separation from the messaging user interface 1101 (e.g., more than in FIG. 11B) and with increased thickness as compared to FIG. 11B, which indicates the virtual object 1110a has more of a three-dimensional visual appearance according to its position in the messaging user interface 1101 in the three-dimensional environment 1107, as shown in FIG. 11C.

FIGS. 12A-12I is a flowchart illustrating an exemplary method 1200 of transitioning virtual objects from a three-dimensional appearance to a two-dimensional appearance and from a two-dimensional appearance to a three-dimensional appearance in accordance with some embodiments. In some embodiments, the method 1200 is performed at a computer system (e.g., computer system 101 in FIG. 1) including a display generation component (e.g., the display generation component 120 of FIGS. 1, 3, and 4) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a tangible non-transitory computer-readable storage medium and that are executed by one or more processors of a computer system, such as the one or more processors 202 of the computer system 101 (e.g., control unit 110 in FIG. 1A). Some operations in method 1200 are optionally combined and/or the order of some operations is optionally changed.

In some embodiments, method 1200 is performed at a computer system (e.g., 101) in communication with a display generation component (e.g., 120) and one or more input devices (e.g., 314). In some embodiments, the computer system has one or more characteristics of the computer system of methods 800 and/or 1000. In some embodiments, the display generation component has one or more characteristics of the display generation component of methods 800 and/or 1000. In some embodiments, the one or more input devices have one or more of the characteristics of the one or more input devices of methods 800 and/or 1000.

In some embodiments, the computer system displays (1202a), via the display generation component, a user interface region (e.g., in a three-dimensional environment. The three-dimensional environment optionally has one or more of the characteristics of the three-dimensional environments of methods 800 and/or 1000). For example, the user interface region is optionally a messaging user interface region (e.g., for a messaging application that enables electronic messaging between one or more computer systems). The user interface region optionally has one or more of the characteristics of the user interface regions and/or messaging user interfaces of methods 800 and/or 1000. The user interface region optionally includes hidden or visible boundaries (e.g., top and bottom boundaries). In some embodiments, the plurality of user interface objects include bubbles, platters, or other containers for a message (e.g., text and/or graphics), image, and/or multimedia in a conversation transcript of a messaging session between one or more computer systems. In some embodiments, the user interface region is or includes a user interface of an application accessible by the computer system, such as a word processing application with a plurality of words, an application launch user interface with a plurality of application icons, a photo management application with a plurality of representations of photos, a spreadsheet application with a plurality of data cells, a presentation application with a plurality of slides or other graphical user interface objects, a messaging application with a plurality of message and/or an email application with a plurality of emails.

In some embodiments, the user interface region includes a plurality of user interface objects, including a first three-dimensional user interface object at a first location in the user interface region, such as virtual object 1104a in FIG. 11A. For example, the first three-dimensional user interface object is provided at a first location and rendered for display having three-dimensional properties (e.g., size, light, position, color, and/or effect). Additional or alternative details about three-dimensional properties are described later. In some embodiments, the first location of the first three-dimensional user interface object in the user interface region corresponds to a chronological position of the first three-dimensional user interface object in the messaging conversation. For example, the first three-dimensional user interface object is shown in a chronological order relative to other user interface objects (e.g., messages) that were received before and/or after the first three-dimensional user interface object. For example, when a new three-dimensional user interface object is received by the computer system, the new three-dimensional user interface object is located in the first location towards the bottom boundary of the user interface region, such as virtual object 1105a in FIG. 11A and earlier user interface objects are moved to another location (e.g., towards the top boundary of the user interface region), such as virtual object 1104a in FIG. 11A.

In some embodiments, the first three-dimensional user interface object (e.g., 1104a) includes a first visual appearance having a first value for a first three-dimensional property, such as three-dimensional property 1104b in FIG. 11A (e.g., size, light, position, color, and/or effect). For example, a first value for the first three-dimensional property "size" includes for example, a first thickness, a first depth, and/or a first width; a first value for the first three-dimensional property "light" includes for example, a first shadow, a first silhouette, a first outline, a first degree of specular highlight, a first degree of reflection, a first illumination, and/or a first degree of gloss; a first value for the first three-dimensional property of "position" includes for example, a first distance from the messaging user interface and/or a viewpoint of the user; a first value for the first three-dimensional property of "color" includes for example a first degree of focus, a first coloring, and/or a first opacity; and a first value for the first three-dimensional property of "effect" includes for example, a first animation. The first visual appearance of the first three-dimensional object is changed using a first value indicative of a level of three-dimensional property, including an associated degree to which the first three-dimensional user interface object appears having three-dimensional depth and/or simulated three-dimensional depth, an associated degree to which the first three-dimensional user interface object's shadow and/or simulated shadow is cast (e.g., the shadow is more intense (distinct, and/or darker)), an associated degree to which the first three-dimensional user interface object is separated from the surface of the user interface region (e.g., the three-dimensional user interface object rests on, is a distance away from/elevated above/in front, or below/recede into the backplane/surface of the user interface region), an associated degree to which the first three-dimensional user interface object's specular highlight appears (e.g., the specular highlight is more intense (shinier)), an associated degree to which the first three-dimensional user interface object's reflection appears (e.g., tight reflection, half reflection, and/or full reflection), an associated degree to which the first three-dimensional user interface object appears illuminated (lit from within), an associated degree to which the first three-dimensional user interface object appears glossy (sheen, and/or luster), an associated degree to which the first three-dimensional user interface object is in focus (e.g., the three-dimensional user interface object is more clear (sharper, and/or bolder), an associated degree to which the first three-dimensional user interface object appears having animation (e.g., the three-dimensional user interface object morphs, and/or fades), an associated degree to which the first three-dimensional user interface object's is colorized (e.g., colored to convey various depths) and/or an associated degree to which the first three-dimensional user interface object appears opaque (e.g., the first three-dimensional user interface object is transparent, fairly opaque, or very opaque). For example, the first three-dimensional user interface object having the first visual appearance including having a first value for a first three-dimensional property (e.g., a first distance from the messaging user interface and/or a viewpoint of the user) optionally creates the appearance that the first three-dimensional user interface object is positioned in front of the user interface region, is separated from the backplane of the user interface region and/or is positioned closer to the user's viewpoint as compared to when the first three-dimensional user interface object has a second visual appearance including having a second value for the first three-dimensional property, as will be described in more detail later. Additional or alternative details about three-dimensional user interface objects are described later.

In some embodiments, while displaying the user interface region (1202*b*), the computer system receives, via the one or more input devices, a first input corresponding to a request to scroll the first three-dimensional user interface object in a first direction (e.g., upwards direction 1102 in FIG. 11A) towards a first boundary (e.g., top boundary 1101*a* in FIG. 11A) of the user interface region. For example, a drag gesture starting at the first location of the first three-dimensional user interface object (or other location in the user interface region) and dragging/moving in a first direction towards a first boundary of the user interface region. The drag gesture optionally comprises contact (e.g., touch event (finger or stylus contact) on a touch-sensitive surface and/or display generation component and/or user interface region) on the first three-dimensional user interface object or other location in the user interface region for a predetermined amount of time and movement across the touch-sensitive display generation component and/or user interface region. Additionally or alternatively, the first input corresponding to a request to scroll includes movement of a cursor of a mouse input instead of detection of movement of the finger or stylus contact. In some embodiments, the first input corresponding to a request to scroll includes an air gesture provided by a user (e.g., by a hand of a user, eye tracking, and/or any combination thereof). In some embodiments, receiving the first input includes detecting the hand of the user performing an air pinch gesture (e.g., two or more fingers of a user's hand such as the thumb and index finger moving together and touching each other) to form a pinch hand shape while attention (e.g., gaze) of the user is directed to the user interface region and/or the first three-dimensional user interface object, followed by movement of the hand in the pinch hand shape upward or downward. In some embodiments, the first input corresponds to a gesture other than an air pinch gesture, such as a forward pointing gesture (e.g., a forward movement of a user's hand while one or more fingers of the user's hand are extended towards the first three-dimensional user interface object) or a tap gesture with a finger of the user's hand (e.g., a forward movement by a finger of the user's hand such that the finger touches the first three-dimensional user interface object or user interface region or approaches within a threshold distance of the first three-dimensional user interface object or user interface region). In some embodiments, a pinch and drag gesture that is an air gesture includes the pinch gesture performed in conjunction with (e.g., followed by) a drag input that changes a position of the user's hand from a first position (e.g., a start position of the drag) to a second position (e.g., an end position of the drag). In some embodiments, the user maintains the pinch hand shape while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, the first input corresponds to an attention-only (e.g., gaze-only) input to scroll through the messaging user interface, such as a gaze directed to a bottom or top portion of the messaging user interface causing the messaging user interface to scroll its content downward or upward, respectively.

In some embodiments, in response to receiving the first input (1202*c*), the computer system scrolls (1202*d*) the first three-dimensional user interface object to a second location (e.g., virtual object 1104*a* in FIG. 11B), different from the first location (e.g., virtual object 1104*a* in FIG. 11A), in the user interface region in accordance with the first input. For example, scrolling the first three-dimensional object towards a boundary of the user interface region. In some embodiments, scrolling the first three-dimensional user interface object to a second location also shifts a displayed portion of the conversation transcript in the same direction, towards the boundary of the user interface region. In some embodiments, movement of the first three-dimensional user interface object has a speed (magnitude/rate at which the first three-dimensional user interface object changes location), velocity (speed and direction), and/or an acceleration (rate at which speed and/or direction changes) corresponding to the speed, velocity and/or acceleration of the movement of the hand of the user in the first input. In some embodiments, moving the first three-dimensional user interface object in the user interface region in accordance with movement of the hand of the user includes moving the first three-dimensional user interface object based on a magnitude and/or direction of the movement of the hand of the user. For example, if the hand of the user moves up or down, moving the first three-dimensional object up or down, respectively—or if the hand of the user moves left or right, moving the first three-dimensional object left or right, respectively. The amount/magnitude of the movement of the first three-dimensional object is optionally also controlled by the magnitude of the movement of the hand of the user.

In some embodiments, the computer system displays (1202*e*) the first three-dimensional user interface object at the second location with a second visual appearance, different from the first visual appearance, such as the display of virtual object 1104*a* in FIG. 11B. Moving the first three-dimensional user interface object from the first location to the second location optionally causes the appearance of the first three-dimensional user interface object to change from the first visual appearance to the second visual appearance. Additionally or alternatively, the computer system optionally determines that the first three-dimensional user interface object is within a threshold distance from the top (or other) boundary of the user interface region and, in accordance with the determination, causes the appearance of the first three-dimensional user interface object to change from the first visual appearance to the second visual appearance; thus, in some embodiments, creating the appearance that the first three-dimensional user interface object changes from a three-dimensional object to a two-dimensional object. For example, movement of the first three-dimensional user interface object towards the top boundary of the user interface region optionally triggers reduction in the first size (e.g., first thickness) of the first three-dimensional property of the first three-dimensional user interface object, which in turn optionally causes a decrease in the three-dimensional visual effect of the first three-dimensional user interface object. (e.g., the greater the movement of the three-dimensional user interface object closer to the top boundary of the user interface region, the greater the three-dimensional visual effect of the three-dimensional user interface object is reduced) and movement of the first three-dimensional object outside the threshold distance from the top (or other) boundary of the user interface region causes the first three-dimensional property of the first three-dimensional user interface object to be increased in the first size based on the amount of such movement (e.g., the greater the movement of the three-dimensional user interface object away from the top boundary of the user interface region, the greater the three-dimensional visual effect of the three-dimensional user interface object); thus, in some embodiments, the computer system displays the first three-dimensional user interface object at the first location with a first visual appearance (e.g., a higher degree of three-dimensional depth and/or simulated three-dimensional depth), such as the display of virtual object 1104*a* in FIG. 11A compared to when the first three-dimensional user interface object is at the second location and has a second visual appearance (e.g., a lesser degree of three-dimensional depth and/or simulated three-dimensional depth), such as the display of virtual object 1104*a* in FIG. 11B.

In some embodiments, displaying the first three-dimensional user interface object with the second visual appearance includes displaying the first three-dimensional user interface object with the first three-dimensional property having a second value (e.g., three-dimensional property 1104*b* in FIG. 11B), different from the first value (e.g., the first three-dimensional user interface object is displayed with a different size, light, position, color, and/or effect). For example, the first three-dimensional user interface object having the first visual appearance is displayed with a greater size (e.g., greater thickness, greater depth, and/or increased width), a higher degree of light (e.g., darker shadow, distinct silhouette, greater outline, greater specular highlight, greater reflection, higher illumination, a greater gloss and/or a greater focus), a greater position (e.g., positive range of z-coordinates), greater color intensity (e.g., more colored to convey various depths and/or greater opacity), and/or a greater degree of effect (e.g., greater animation). In contrast, the first three-dimensional user interface object having the second visual appearance is displayed with a smaller size (e.g., less thickness, less depth, and/or less width), a smaller degree of light (e.g., less intense shadow, less intense silhouette, smaller outline, less specular highlight, smaller reflection, less illumination, less gloss and/or less focus), a smaller position (e.g., negative range of z-coordinates), less color intensity (e.g., less colored, and/or transparent), and/or a smaller degree of effect (e.g., less to no animation).).

In some embodiments, the first three-dimensional property (e.g., virtual object 1104*b* having a thickness and/or separation from messaging user interface 1101) is different from the scrolling of the first three-dimensional user interface object to the second location. For example, a first three-dimensional property other than and/or in addition to a visual appearance associated with a size/shape/perspective resulting from scrolling the first three-dimensional user interface object in the three-dimensional environment, and the corresponding change in spatial arrangement of the first three-dimensional user interface object relative to the viewpoint of the user, such as described in more detail with reference to method 800. For example, the change in the first three-dimensional property is optionally different from the first three-dimensional user interface object looking smaller from the viewpoint of the user due to being further from the viewpoint of the user and/or different from a shape of the area of the field of view of the user consumed by the first three-dimensional user interface object changing due to the first three-dimensional user interface object having a different orientation (e.g., tilt) relative to the viewpoint of the user. Changing the visual appearance of the first three-dimensional user interface object from three-dimensional to two-dimensional prevents obscuring portions of the user interface, other portions of other user interfaces and/or the three-dimensional environment, thereby improving user interaction.

In some embodiments, the second location is within a threshold distance (e.g., 0.1, 0.3, 0.5, 1, 3, 5, 10, 20, 50 or 100 cm) of the first boundary (1204) (e.g., top, bottom, right or left boundary of the messaging user interface). Thus, in some embodiments, the first three-dimensional user interface object is scrolled to or close to the first boundary in response to the first input, such as virtual object 1104*a* in FIG. 11B. Taking into consideration the location of boundaries of the user interface ensures that three-dimensional objects do not obscure portions of the user interface and/or three-dimensional environment, thereby improving user interaction.

In some embodiments, the first three-dimensional property corresponds to a thickness of the first three-dimensional user interface object, such as the thickness of virtual object 1104*a* in glyph 1106 of FIG. 11A, and the second value is less than the first value (1206), such as the thickness of virtual object 1104*a* in glyph 1106 of FIG. 11B. In some embodiments, the computer system displays the first three-dimensional user interface object within the threshold distance from the top (or other) boundary of the user interface region with the first three-dimensional property having the second value corresponding to a lesser degree of three-dimensional depth or thickness and/or simulated three-dimensional depth or thickness compared to when the first three-dimensional user interface object is outside the threshold distance from the top (or other) boundary of the user interface region and has the first three-dimensional property with the first value (e.g., a greater degree of three-dimensional depth or thickness and/or simulated three-dimensional depth or thickness). Changing the visual appearance of the first three-dimensional user interface object from three-dimensional to (more) two-dimensional prevents obscuring portions of the user interface and/or other portions of other user interfaces and/or the three-dimensional environment, thereby improving user interaction.

In some embodiments, the first three-dimensional property corresponds to a degree of a simulated shadow cast by the first three-dimensional user interface object, such as the darker, more visible simulated shadow cast by virtual object 1104*a* in FIG. 11A, and the second value is less than the first value (1208), such as the lighter, less visible simulated shadow cast by virtual object 1104*a* in FIG. 11B. In some embodiments, the computer system displays the first three-dimensional user interface object within the threshold distance from the top (or other) boundary of the user interface region with the first three-dimensional property having the second value corresponding to a lesser degree (e.g., lighter, smaller, less sharp (more blurry), less opaque and/or less distinct) of simulated shadow cast onto the user interface region (e.g., background of the messaging user interface) by the first three-dimensional user interface object compared to when the first three-dimensional user interface object is outside the threshold distance from the top (or other) boundary of the user interface region and has the first three-dimensional property with the first value (e.g., a darker, larger, sharper, more opaque and/or more distinct simulated shadow cast onto the user interface region by the first three-dimensional user interface object). Changing the visual appearance of the first three-dimensional user interface object from three-dimensional to (more) two-dimensional prevents obscuring portions of the user interface and/or other portions of other user interfaces and/or the three-dimensional environment, thereby improving user interaction.

In some embodiments, the first three-dimensional property corresponds to a degree of specular highlighting displayed on the first three-dimensional user interface object, and the second value is less than the first value (1210), such as first three-dimensional property 1104*b* in FIG. 11B corresponding to a degree of specular highlighting and represented as a star polygon having less points (e.g., five-pointed star) than the first three-dimensional property 1104*b* in FIG. 11A represented as a star polygon having seven points (e.g., seven-point star). In some embodiments, the computer system displays the first three-dimensional user interface object within the threshold distance from the top (or other) boundary of the user interface region with the first three-dimensional property having the second value corresponding to a lesser degree (e.g., dimmer, smaller, and/or less intense) of specular highlighting displayed on the first three-dimensional user interface object compared to when the first three-dimensional user interface object is outside the threshold distance from the top (or other) boundary of the user interface region and has the first three-dimensional property with the first value (e.g., an intense, larger, and/or brighter specular highlighting displayed on the first three-dimensional user interface object). Changing the visual appearance of the first three-dimensional user interface object from being displayed with more specular highlighting to being displayed with less specular highlighting reduces distraction from user interface objects as they approach boundaries of the user interface region, thereby improving user interaction.

In some embodiments, the first three-dimensional property corresponds to a separation between the first three-dimensional user interface object and the user interface region, and the second value is less than the first value (1212), such as virtual object 1104*a* in glyph 1106 as shown in FIG. 11B with a smaller distance (e.g., separation) from the messaging user interface 1101 than virtual object 1104*a* in glyph 1106 as shown in FIG. 11A with a greater distance from the messaging user interface 1101. In some embodiments, the computer system displays the first three-dimensional user interface object within the threshold distance from the top (or other) boundary of the user interface region with the first three-dimensional property having the second value (e.g. 0.1, 0.3, 0.5, 1, 3, 5, 10, 20, 50 or 100 cm) corresponding to an associated degree to which the first three-dimensional user interface object is separated (elevated) from the surface (backplane) of the user interface region (in the z-coordinate direction towards the viewpoint of the user) compared to when the first three-dimensional user interface object is outside the threshold distance from the top (or other) boundary of the user interface region and has the first three-dimensional property with the first value (e.g. 0.1, 0.3, 0.5, 1, 3, 5, 10, 20, 30, 50, 100, 250 or 500 cm) corresponding to an associated degree to which the first three-dimensional user interface object is separated (elevated) from the surface (backplane) of the user interface region (in the z-coordinate direction towards the viewpoint of the user). Additionally and/or alternatively, and in some embodiments, the first and second values correspond to an associated degree to which the first three-dimensional user interface object is separated from the viewpoint of the user. For example, the computer system displays the first three-dimensional user interface object within the threshold distance from the top (or other) boundary of the user interface region with the first three-dimensional property having the second value (e.g. 0.1, 0.3, 0.5, 1, 3, 5, 10, 20, 50, 100, 500, 1000 or 5000 cm) corresponding to a distance between the first three-dimensional user interface object and the viewpoint of the user as compared to the first value (e.g. 1, 3, 5, 10, 20, 30, 50, 100, 200, 500 or 1000 cm); thus, a change from the second value to the first value in the first three-dimensional property creates the appearance that the first three-dimensional user interface object is positioned in front of (protruding out from) the backplane of the user interface and/or is positioned closer to the user's viewpoint and a change from the first value to the second value in the first three-dimensional property creates the appearance that the first three-dimensional user interface object is positioned closer to (receding into) the backplane of the user interface and/or is positioned farther from the user's viewpoint. Changing the visual appearance of the first three-dimensional user interface object from having a greater associated degree to which the first three-dimensional user interface object is separated from the surface of the user interface region to a lesser associated degree to which the first three-dimensional user interface object is separated from the surface of the user interface region prevents obscuring portions of the user interface and/or other portions of other user interfaces and/or the three-dimensional environment, thereby improving user interaction.

In some embodiments, displaying the first user interface object with the first visual appearance includes displaying the first user interface object with a first level of opacity (1214*a*), such as virtual object 1104*a* in FIG. 11B. In some embodiments, when the first three-dimensional user interface object is outside the threshold distance from the top (or other) boundary of the user interface region and has the first three-dimensional property with the first value corresponding to a level of opacity, the computer system displays the first three-dimensional object with the first visual appearance (e.g., non-transparent, fully visible, and/or cannot be seen through). In some embodiments, displaying the first user interface object with the second visual appearance includes displaying the first user interface object with a second level of opacity, less than the first level of opacity (1214*b*), such as virtual object 1104*a* in FIG. 11C. In some embodiments, the computer system displays the first three-dimensional user interface object within the threshold distance from the top (or other) boundary of the user interface region with the first three-dimensional property having the second value corresponding to a lesser degree (e.g., see-through, transparent, and/or less visible) of opacity displayed by the first three-dimensional user interface object. In some embodiments, once the first three-dimensional user interface object reaches the threshold distance from the top (or other) boundary of the user interface region, the computer system displays the first three-dimensional user interface object with a gradually changing level/degree of opacity as the first three-dimensional user interface object is further scrolled to the boundary and/or completely scrolled off the user interface region (e.g., past the top (or other) boundary of the user interface region) until the first three-dimensional property corresponds to fading away and/or ceasing display of the first user interface object. Decreasing opacity of (e.g., fading out) the first-three-dimensional user interface object prevents obscuring portions of the user interface and/or other portions of other user interfaces and/or the three-dimensional environment, thereby improving user interaction.

In some embodiments, while displaying the user interface region, the computer system receives (1216*a*), via the one or more input devices, a second input corresponding to a request to scroll the first three-dimensional user interface object in the first direction towards the first boundary of the user interface region, such as upward direction 1102 shown in FIG. 11B, wherein the first boundary is located at a third location in the user interface region. For example, the second input corresponds to a drag gesture, movement of a cursor, a mouse input, a finger, a stylus, an air gesture, an attention-only (e.g., gaze-only) input, and/or a combination of any of the above as described in more detail herein, and the response of the computer system to characteristics of the scrolling input is optionally as described in more detail herein. In some embodiments, the third location of the first boundary is optionally located at the top, above the center of the messaging user interface, or another predefined location in the messaging user interface.

In some embodiments, in response to receiving the second input (1216*b*), the computer system scrolls (1216*c*) the first three-dimensional user interface object to a fourth location, different from the third location and between the first location and the second location, in the user interface region in accordance with the second input, such as moving virtual object 1105*a* from the location shown in FIG. 11A to a different location (e.g., a location in between the location of virtual object 1105*a* in FIG. 11A and the location of virtual object 1105*a* in FIG. 11B) by scrolling virtual object 1105*a* in the upwards direction 1102 using hand 1103. For example, the fourth location of the first three-dimensional user interface object located in between the first location and the second location optionally includes any location between the two points. In some embodiments, the fourth location is optionally a location in the first direction towards the first boundary of the user interface region (e.g., on a directional line/path between the first location and the second location).

In some embodiments, while scrolling the first three-dimensional user interface object to the fourth location, the computer system changes a visual appearance of the first three-dimensional user interface object away from the first visual appearance, including changing the first three-dimensional property away from the first value (1216*d*), such as virtual object 1105*a* in FIG. 11A having a degree of specular highlight (e.g., 1105*b*) that is changing to a lesser degree of specular highlight (e.g., 1105*b* in FIG. 11B). For example, changing the visual appearance away from the first visual appearance optionally creates the appearance that the first three-dimensional user interface object is changing away from a three-dimensional object towards becoming a two-dimensional object, thus the three-dimensional object has a different visual appearance (e.g., reduction in three-dimensional visual effect). In some embodiments, once the first three-dimensional user interface object is located within the threshold distance from the top (or other) boundary of the user interface region, the computer system displays the first three-dimensional user interface object with a gradually changing level/degree of, for example, specular highlighting; thus, changing the first three-dimensional property away from the first value, in one example, optionally corresponds to the first specular highlighting value moving away from an intense, larger, and/or brighter specular highlighting displayed on the first three-dimensional user interface object towards a less intense, smaller and/or less bright specular highlighting displayed on the first three-dimensional user interface object. Changing the visual appearance of the first three-dimensional user interface object away from the first visual appearance (e.g., three-dimensional visual appearance) prevents obscuring portions of the user interface and/or other portions of other user interfaces and/or the three-dimensional environment, thereby improving user interaction.

In some embodiments, while displaying the user interface region and scrolling the first three-dimensional user interface object towards the first boundary in accordance with the second input, the computer system detects, via the one or more input devices, an end of the second input (1218*a*), such as a stop in scrolling virtual object 1105*a* in the upwards direction 1102 using hand 1103 in FIG. 11A. For example, the computer system stops scrolling the first three-dimensional user interface object towards the first boundary in response to a stop in movement of the second input corresponding to a drag gesture, movement of a cursor, a mouse input, a finger, a stylus, an air gesture, and/or an attention-only (e.g., gaze-only) input. In some embodiments, the computer system stops scrolling in response to a change in attention/gaze (e.g., away from portions of the user interface region causing scrolling of the first three-dimensional user interface object). In some embodiments, in response to detecting the end of the second input (1218*b*), the computer system ceases scrolling the first three-dimensional user interface object (1218*c*), and while the scrolling of the first three-dimensional user interface object is ceased, displaying the first three-dimensional user interface object at a fifth location, between the first location and the second location, including displaying the first three-dimensional user interface object with the first three-dimensional property having a third value, between the first value and the second value (1218*d*), such as virtual object 1105*a* having a location in between the location of virtual object 1105*a* in FIG. 11A and the location of virtual object 1105*a* in FIG. 11B and the virtual object 1105*a* having a reduced thickness or depth compared to when the virtual object 1105*a* was in the location shown in FIG. 11A, but with a greater thickness or depth compared to when the virtual object 1105*a* was in the location shown in FIG. 11B. For example, the fifth location of the first three-dimensional user interface object located in between the first location and the second location optionally includes any location between the two points. In some embodiments, the fifth location is optionally a location in the first direction towards the first boundary of the user interface region (e.g., on a directional line/path between the first location and the second location). In some embodiments, displaying the first three-dimensional user interface object with the first three-dimensional property having a third value in between the first value and the second value optionally includes any associated degree to which the first three-dimensional user interface object is separated from the surface of the user interface region that is in between the first value and the second value. For example, movement of the first three-dimensional user interface object stops at the fifth location, and at that location, the first three-dimensional property optionally has the third value corresponding to a smaller distance between the first three-dimensional user interface object and the backplane of the messaging user interface and/or a greater distance between the first three-dimensional user interface object and the viewpoint of the user. For example, the first three-dimensional user interface object having the third value appears to be positioned closer to, on, or more flush with the user interface region and is positioned farther from the user's viewpoint as compared to when the first three-dimensional user interface object has the first value corresponding to a greater distance between the first three-dimensional user interface object and the backplane of the messaging user interface and/or a smaller distance between the first three-dimensional user interface object and the viewpoint of the user. Additionally or alternatively, as compared to when the first three-dimensional user interface object has the second value corresponding to a much smaller distance between the first three-dimensional user interface object and the backplane of the messaging user interface and/or a much greater distance between the first three-dimensional user interface object and the viewpoint of the user, the first three-dimensional user interface object having the third value appears to be positioned at a relatively small distance between the first three-dimensional user interface object and the backplane of the messaging user interface and/or a relatively large distance between the first three-dimensional user interface object and the viewpoint of the user. Thus, in some embodiments, as the first three-dimensional user interface object is scrolled closer and closer to the top boundary, the first three-dimensional user interface object exhibits a visual transition that appears more and more towards a two-dimensional object (more and more away from a three-dimensional object), and at points in between the first (or other) location and the second (or other) location, the first three-dimensional user interface object is optionally displayed at varying degrees of said transition, including when the first three-dimensional user interface object is stopped at those points in between. Stopping the transitioning of the visual appearance of the user interface object in response to ceasing to scroll the user interface object provides the user with feedback about progress towards or away from scrolling the user interface object out of the user interface region.

In some embodiments, while displaying the user interface region including the first three-dimensional user interface object with the first three-dimensional property having the third value at the fifth location, the computer system receives, via the one or more input devices, a third input (1220a), such as input provided by the hand 1103 of the user of computer system 101 to move one or more of the virtual objects 1104a and 1105a within the messaging user interface 1101 in FIG. 11B. For example, the third input corresponds to a drag gesture, movement of a cursor, a mouse input, a finger, a stylus, an air gesture, an attention-only (e.g., gaze-only) input, and/or a combination of any of the above as described in more detail herein, and the response of the computer system to characteristics of the scrolling input is optionally as described in more detail herein. In some embodiments, in response to receiving the third input (1220b), and in accordance with a determination that the third input corresponds to a request to scroll the first three-dimensional user interface object towards the first boundary, scrolling the first three-dimensional user interface object towards the first boundary in accordance with the third input and while scrolling the first three-dimensional user interface object towards the first boundary, changing the visual appearance of the first three-dimensional user interface object towards the first three-dimensional property having the second value (1220c), such as virtual object 1105a having less separation (distance) from the messaging user interface 1101 in glyph 1106 of FIG. 11C. In some embodiments, while scrolling the first three-dimensional user interface object, the computer system displays the first three-dimensional user interface object with the first three-dimensional property changing towards the second value corresponding to a lesser degree (e.g., lighter, smaller, less sharp (more blurry), less opaque and/or less distinct) of simulated shadow cast onto the user interface region (e.g., background of the messaging user interface) by the first three-dimensional user interface object compared to when the first three-dimensional user interface object was at the fifth location and with the first three-dimensional property having the third value (e.g., somewhat darker, larger, sharper, more opaque and/or more distinct simulated shadow cast onto the user interface region by the first three-dimensional user interface object).

In some embodiments, in accordance with a determination that the third input corresponds to a request to scroll the first three-dimensional user interface object away from the first boundary (1220d), the computer system scrolls the first three-dimensional user interface object away from the first boundary in accordance with the third input and while scrolling the first three-dimensional user interface object away from the first boundary, such as virtual object 1110a moving away from bottom boundary 1101b in FIG. 11C, changing the visual appearance of the first three-dimensional user interface object towards the first three-dimensional property having the first value such as virtual object 1110a having greater separation (distance) from the messaging user interface 1101 in glyph 1106 of FIG. 11C. In some embodiments, while scrolling the first three-dimensional user interface object, the computer system displays the first three-dimensional user interface object with the first three-dimensional property changing towards the first value (e.g., a darker, larger, sharper, more opaque and/or more distinct simulated shadow cast onto the user interface region by the first three-dimensional user interface object). Thus, in some embodiments, resuming the scrolling of the first three-dimensional user interface object closer and closer to the top boundary will resume the first three-dimensional user interface object's visual transition of appearing more and more towards a two-dimensional object (more and more away from a three-dimensional object), and at points in between the first (or other) location and the second (or other) location, the first three-dimensional user interface object is optionally displayed at varying degrees of said transition, including when the first three-dimensional user interface object is stopped and then resumes movement at those points in between. Resuming the transitioning of the visual appearance of the user interface object in response to resuming to scroll the user interface object provides the user with feedback about progress towards or away from scrolling the user interface object out of the user interface region.

In some embodiments, while displaying the user interface region including the first three-dimensional user interface object at the second location having the second visual appearance with the first three-dimensional property having the second value, the computer system receives (1222a), via the one or more input devices, a second input corresponding to a request to scroll the first three-dimensional user interface object in a second direction, different from (e.g., opposite to) the first direction and away from the first boundary of the user interface region, such as moving virtual object 1105a from the location shown in FIG. 11C to a different location (e.g., its previous location shown in FIG. 11B or another location in between the location of virtual object 1105a in FIG. 11C and the location of virtual object 1105a in FIG. 11B) by scrolling virtual object 1105a in a downwards direction (opposite from the upwards direction 1102 using hand 1103). For example, the second input corresponds to a drag gesture, movement of a cursor, a mouse input, a finger, a stylus, an air gesture, an attention-only (e.g., gaze-only) input, and/or a combination of any of the above as described in more detail herein, and the response of the computer system to characteristics of the scrolling input is optionally as described in more detail herein. In some embodiments, the computer system scrolls the first three-dimensional user interface object away from/ outside the threshold distance from the top (or other) boundary of the user interface region.

In some embodiments, in response to receiving the second input (1222b), the computer system scrolls the first three-dimensional user interface object to a third location, different from the second location, in the user interface region in accordance with the second input, wherein the third location is further from the first boundary than the second location (1222c), such as the location of virtual object 1105a in FIG. 11A. For example, the third location of the first three-dimensional user interface object located further from the first boundary than the second location is optionally outside the threshold distance from the top (or other) boundary of the user interface region while the second location is within the threshold distance from the top (or other) boundary of the user interface region. In some embodiments, the third location is optionally a location in the second direction away from the second location and even further from the first boundary of the user interface region than the second location. In some embodiments, the computer system displays (1222d) the first three-dimensional user interface object at the third location with a third visual appearance, different from the second visual appearance, wherein displaying the first three-dimensional user interface object with the third visual appearance includes displaying the first three-dimensional user interface object with the first three-dimensional property having a third value, different from the second value, and at least partially reversing the change in the visual appearance of the first three-dimensional user interface object towards the first three-dimensional property having the second value, such as reversing the degree of specular highlight (e.g., 1105b) for the first three-dimensional property brightness/light of virtual object 1105a in FIG. 11C to appear brighter, larger, and/or more intense as shown in FIG. 11B. The computer system optionally at least partially reverses changes made to the first three-dimensional user interface object with the first three-dimensional property towards the second value. For example, the first-three dimensional user interface object has begun it's visual transition to appear more and more towards a two-dimensional object (e.g., a lesser degree of simulated shadow cast onto the user interface region by the first three-dimensional user interface object (e.g., lighter, smaller, less sharp (more blurry), less opaque and/or less distinct), and the computer system optionally reverses said visual transition progress such that the simulated shadow cast onto the user interface region by the first three-dimensional user interface object is somewhat darker, larger, sharp, opaque and/or distinct. In some embodiments, said reversing is optionally based on the magnitude of the scrolling input (e.g., the greater the magnitude of scrolling, the more the change is reversed, and the less the magnitude of scrolling, the less the change is reversed). Changing the visual appearance of the first three-dimensional user interface object from (more) two-dimensional to (more) three-dimensional provides a more visually prominent user interface object as the object moves towards a more central portion of the user interface region and improves user interaction.

In some embodiments, while displaying the user interface region including the first three-dimensional user interface object at the first location having the first visual appearance with the first three-dimensional property having the first value, the computer system receives (1224a), via the one or more input devices, the second input corresponding to a request to scroll the first three-dimensional user interface object in the first direction towards a second boundary, different from the first boundary, of the user interface region, such as scrolling virtual object 1104a in a rightwards, leftwards, or downwards direction (opposite from the upwards direction 1102 using hand 1103) in 11B. For example, the second input corresponds to a drag gesture, movement of a cursor, a mouse input, a finger, a stylus, an air gesture, an attention-only (e.g., gaze-only) input, and/or a combination of any of the above as described in more detail herein, and the response of the computer system to characteristics of the scrolling input is optionally as described in more detail herein. In some embodiments, the second boundary is a left, right, or other boundary of the user interface region (e.g., other than the top boundary of the user interface region). In some embodiments, in response to receiving the fifth input (1224b), the computer system scrolls (1224c) the first three-dimensional user interface object to a third location, different from the first location, in the user interface region in accordance with the fifth input, such as moving virtual object 1104a from the location shown in FIG. 11A to a different location (e.g., a location to the right of virtual object 1104a, such as the location of virtual object 1109a in FIG. 11C). For example, the computer system displays the first three-dimensional user interface object at the third location within the threshold distance from the left (or other) boundary of the user interface region.

In some embodiments, the computer system displays (1224d) the first three-dimensional user interface object at the third location with a third visual appearance, different from the first visual appearance, such as virtual object 1105a having a more two-dimensional appearance and/or less of a three-dimensional appearance, as shown in FIG. 11C. For example, the computer system displays the first three-dimensional user interface object with the first three-dimensional property having the third visual appearance similar to the second visual appearance; thus, in some embodiments, creating the appearance that the first three-dimensional user interface object changes from a three-dimensional object to a two-dimensional object (e.g., with the first three-dimensional property having a second value corresponding to a lesser degree (e.g., see-through, transparent, and/or less visible) of specular highlighting displayed on the first three-dimensional user interface object). Thus, in some embodiments, similar to how the first three-dimensional user interface object is scrolled closer and closer to the top (or other) boundary and the appearance of the first three-dimensional user interface object changes from a three-dimensional object to a two-dimensional object, the first three-dimensional user interface object is optionally changed at multiple different boundaries of the user interface region, including the particular boundaries described herein. Changing the visual appearance of the first three-dimensional user interface object from three-dimensional to (more) two-dimensional in the context of multiple boundaries of the user interface region prevents obscuring portions of the user interface and/or other portions of other user interfaces and/or the three-dimensional environment regardless of the boundary towards which the first three-dimensional user interface object is moved, thereby improving user interaction.

In some embodiments, the user interface region is a two-dimensional user interface object (e.g., a two-dimensional user interface of a messaging application) defined as an area enclosed by one or more outer boundaries, including the first boundary (1226), such as messaging user interface 1101 in FIG. 11A. For example, the computer system displays the first three-dimensional user interface object in, on and/or in front of the two-dimensional user interface, such as for example the messaging user interface 1101 of FIG. 11A. In some embodiments, the two-dimensional user interface includes at top boundary, a bottom boundary, a left boundary, and a right boundary. For example, the first boundary corresponds to a top (or other) boundary. Additionally or alternatively, the two-dimensional user interface includes a plurality of regions and a plurality of boundaries between the plurality of regions, including the first boundary corresponding to an outer boundary. Thus, in some embodiments, the first three-dimensional user interface object is displayed as part of displaying the two-dimensional user interface object. Controlling display of the first three-dimensional user interface object based on the boundaries of the two-dimensional user interface ensures that three-dimensional objects do not obscure portions of the user interface and/or three-dimensional environment, thereby improving user interaction.

In some embodiments, while receiving the first input and while scrolling the first three-dimensional user interface object, the computer system changes display of the first three-dimensional user interface object to be different from the first visual appearance before the first three-dimensional user interface object reaches the second location in the user interface region (1228), such as changing the visual appearance of virtual object 1105a from three-dimensional to two-dimensional (or greater degree of three-dimensional property to lesser degree of three-dimensional property) as shown by the changed visual appearance of virtual object 1105a in FIG. 11A to the virtual object 1105a shown in FIG. 11B. For example, movement of the first three-dimensional user interface object optionally triggers displaying changes to the visual appearance of the first three-dimensional user interface object that continue and/or increase in magnitude as the first three-dimensional user interface object moves closer to the first boundary of the user interface region. Changing the visual appearance of the first three-dimensional user interface object from three-dimensional to (more) two-dimensional prevents obscuring portions of the user interface and/or other portions of other user interfaces and/or the three-dimensional environment, thereby improving user interaction.

In some embodiments, changing the display of the first three-dimensional user interface object to be different from the first visual appearance includes gradually transitioning the first three-dimensional property from having the first value to having the second value as the first three-dimensional user interface object is scrolled to the second location (1230), such as virtual object 1104a having a gradual, lesser degree of three-dimensional depth or thickness in FIG. 11B compared to the virtual object 1104a in FIG. 11A. For example, the visual appearance of the first three-dimensional user interface object is changed gradually rather than instantaneously and in accordance with the degree of movement of the three-dimensional user interface object (e.g., the greater the movement of the three-dimensional user interface object closer to the top boundary of the user interface region, the greater the three-dimensional visual effect of the three-dimensional user interface object is reduced). Gradually changing the visual appearance of the first three-dimensional user interface object from three-dimensional to (more) two-dimensional gives the user the ability to reverse the movement of the three-dimensional user interface object if desired before display of the object transitions to two-dimensional and/or before the object is ceased to be displayed.

In some embodiments, the user interface region includes a second three-dimensional user interface object at a third location, and the first input is detected while displaying the user interface region including the second three-dimensional user interface object having a third visual appearance including having a third value for the first three-dimensional property (1232a), such as virtual object 1110a in FIG. 11B. For example, the second three-dimensional user interface object optionally corresponds to communication messages, graphics, links, photos, audio files, video files and/or other rich multimedia, such as described with reference to the first three-dimensional user interface object. The second three-dimensional user interface object optionally has one or more of the characteristics of the first three-dimensional user interface object described herein. In some embodiments, the third visual appearance is the same as the first visual appearance (e.g., same thickness, same separation from the user interface region, and/or same degree of simulated shadow); in some embodiments, the third visual appearance is different from the first visual appearance (e.g., different thickness, different separation from the user interface region, and/or different degree of simulated shadow). In some embodiments, in response to detecting the first input (1232b), the computer system scrolls the second three-dimensional user interface object to a fourth location, different from the third location, in the user interface region in accordance with the first input (1232c) such as moving virtual object 1110a from the location shown in FIG. 11B to a different location shown in FIG. 11C (e.g., a location above the location of virtual object 1110a in FIG. 11B) by scrolling virtual object 1110a in the upwards direction 1102 using hand 1103. In some embodiments, the fourth location of the second three-dimensional user interface object in the user interface region corresponds to a chronological position of the second three-dimensional user interface object in the messaging conversation. For example, the second three-dimensional user interface object is shown in a chronological order relative to other user interface objects (e.g., the first three-dimensional user interface object) that were received before and/or after the second three-dimensional user interface object. For example, when a new (third) three-dimensional user interface object is received by the computer system, the new three-dimensional user interface object is located in the first location towards the bottom (or other) boundary of the user interface region and earlier user interface objects (the first and second three-dimensional user interface objects) are moved to another location (e.g., towards the top boundary of the user interface region).

In some embodiments, the computer system displays the second three-dimensional user interface object at the fourth location with a fourth visual appearance, different from the third visual appearance (1232d), such as virtual object 1110a having a two-dimensional visual appearance in FIG. 11B to having a more three-dimensional appearance as shown by the virtual object 1110a in FIG. 11C. The computer system optionally determines that the second three-dimensional user interface object is within a threshold distance from the top (or other) boundary of the user interface region and, in accordance with the determination, causes the appearance of the second three-dimensional user interface object to change from the third visual appearance to the fourth visual appearance; thus, in some embodiments, creating the appearance that the second three-dimensional user interface object changes from a three-dimensional object to a two-dimensional object. The change in appearance of the second three-dimensional user interface object away from the third visual appearance optionally occurs in one or more of the ways described herein with reference to changing of the visual appearance of the first three-dimensional user interface object away from the first visual appearance. Applying visual appearance changes to a plurality of three-dimensional user interface objects from three-dimensional to (more) two-dimensional provides the user with consistency and predictability, thereby reducing user distraction and improving user interaction and satisfaction.

In some embodiments, the user interface region includes a first two-dimensional user interface object having the second visual appearance at the first location in the user interface region (1234a), such as virtual object 1109a of FIG. 11B (e.g., before or after receiving the first input, the scroll position in the user interface region is such that the first two-dimensional user interface object is at the first location). For example, the first two-dimensional user interface object optionally corresponds to communication messages, graphics, links, photos, audio files, video files and/or other rich multimedia, such as described in more detail with reference to representations of messages in method 1000. In some embodiments, while displaying the user interface region including the first two-dimensional user interface object, receiving, via the one or more input devices, a second input corresponding to a request to scroll the first two-dimensional user interface object to the second location (1234b), such as moving virtual object 1109a from the location shown in FIG. 11B to the location of virtual object 1109a in FIG. 11C by scrolling virtual object 1109a in the upwards direction 1102 using hand 1103 (e.g., an input having one or more of the characteristics of the first input, previously described). In some embodiments, in response to detecting the second input (1234c), the computer system scrolls the first two-dimensional user interface object to the second location in the user interface region in accordance with the second input (1234d), such as the location of virtual object 1109a in FIG. 11C. In some embodiments, the computer system displays (1234e) the first two-dimensional object at the second location with the second visual appearance, such as virtual object 1109a having a two-dimensional appearance as shown in FIG. 11C. The computer system optionally maintains the second visual appearance of the first two-dimensional user interface object (e.g., does not change visual appearance from three-dimensional to two-dimensional or three-dimensional to two-dimensional in the case of a scrolling of the first two-dimensional user interface object from the second location to the first location), in contrast with the change in appearance of the first three-dimensional user interface object. Maintaining the visual appearance of two-dimensional user interface objects reduces unnecessary changes in the display of objects in the environment, thereby reducing user distraction and improving user interaction.

One of ordinary skill in the art would recognize various ways to reorder the operations described herein. In some embodiments, aspects/operations of methods 800, 1000 and/or 1200 may be interchanged, substituted, and/or added between these methods. For example, the three-dimensional environments of methods 800, 1000 and/or 1200, the messages and/or representations of messages in methods 800, 1000 and/or 1200, and/or the messages user interfaces of methods 800, 1000 and/or 1200 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, TWITTER IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:
at a computer system in communication with a display generation component and one or more input devices:
displaying, via the display generation component, a user interface region from a first viewpoint corresponding to a location and a direction in a three-dimensional environment, wherein:
the user interface region includes a plurality of user interface objects that have a first spatial arrangement relative to the first viewpoint, including a first user interface object that includes one or more edges,
the plurality of user interface objects are displayed with a first three-dimensional visual effect, including a virtual lighting effect, having a first visual appearance, and
displaying the plurality of user interface objects with the first three-dimensional visual effect having the first visual appearance includes displaying the one or more edges of the first user interface object with a first edge visual appearance based on the virtual lighting effect in accordance with the first spatial arrangement;
while displaying the user interface region in the three-dimensional environment, detecting a change in a spatial arrangement of the plurality of user interface objects relative to a viewpoint from the first spatial arrangement to a second spatial arrangement, different from the first spatial arrangement, including detecting a change in a viewpoint from the first viewpoint to a second viewpoint, different from the first viewpoint, wherein detecting the change in the viewpoint includes detecting a change in the location and/or the direction of the viewpoint; and
in response to detecting the change in the spatial arrangement of the plurality of user interface objects relative to the viewpoint from the first spatial arrangement to the second spatial arrangement, displaying, via the display generation component, the user interface region including the plurality of user interface objects, wherein:
the plurality of user interface objects are displayed with the first three-dimensional visual effect having a second visual appearance, different from the first visual appearance, based on the changed spatial arrangement of the plurality of user interface objects relative to the viewpoint, and
displaying the plurality of user interface objects with the first three-dimensional visual effect having the second visual appearance includes displaying the one or more edges of the first user interface object with a second edge visual appearance, different from the first edge visual appearance, based on the virtual lighting effect in accordance with the second spatial arrangement.

2. The method of claim 1, wherein:
displaying the plurality of user interface objects with the first three-dimensional visual effect having the first visual appearance includes displaying the plurality of user interface objects with the virtual lighting effect having a third visual appearance, and
displaying the plurality of user interface objects with the first three-dimensional visual effect having the second visual appearance includes displaying the plurality of user interface objects with the virtual lighting effect having a fourth visual appearance, different from the third visual appearance.

3. The method of claim 2, wherein:
the virtual lighting effect includes a virtual reflection corresponding to an element in the three-dimensional environment,
displaying the plurality of user interface objects with the first three-dimensional visual effect having the first visual appearance includes displaying the plurality of user interface objects with the virtual reflection having a third visual appearance, and
displaying the plurality of user interface objects with the first three-dimensional visual effect having the second visual appearance includes displaying the plurality of user interface objects with the virtual reflection having a fourth visual appearance, different from the third visual appearance.

4. The method of claim 2, wherein:
the virtual lighting effect is based on a simulated light source associated with the three-dimensional environment,
displaying the plurality of user interface objects with the first three-dimensional visual effect having the first visual appearance includes displaying the plurality of user interface objects with a simulated lighting effect based on the simulated light source having a third visual appearance, and
displaying the plurality of user interface objects with the first three-dimensional visual effect having the second visual appearance includes displaying the plurality of user interface objects with the simulated lighting effect based on the simulated light source having a fourth visual appearance, different from the third visual appearance.

5. The method of claim 2, wherein:
the virtual lighting effect is based on a physical light source associated with the three-dimensional environment,
the physical light source exists in a physical environment of a user of the computer system,
displaying the plurality of user interface objects with the first three-dimensional visual effect having the first visual appearance includes displaying the plurality of user interface objects with a simulated lighting effect based on the physical light source having a third visual appearance, and
displaying the plurality of user interface objects with the first three-dimensional visual effect having the second visual appearance includes displaying the plurality of user interface objects with the simulated lighting effect based on the physical light source having a fourth visual appearance, different from the third visual appearance.

6. The method of claim 2, wherein:
the plurality of user interface objects includes a first user interface object that includes one or more surfaces,
displaying the first user interface object with the first three-dimensional visual effect having the first visual appearance includes displaying the first user interface object with the one or more surfaces of the first user interface object having a third appearance based on the virtual lighting effect, and
displaying the first user interface object with the first three-dimensional visual effect having the second visual appearance includes displaying the first user interface object with the one or more surfaces of the first user interface object having a fourth appearance based on the virtual lighting effect, the fourth appearance different from the third appearance.

7. The method of claim 1, wherein detecting the change in the spatial arrangement of the plurality of user interface objects relative to the viewpoint from the first spatial arrangement to the second spatial arrangement includes detecting movement of the user interface region in the three-dimensional environment.

8. The method of claim 1, wherein detecting the change in the spatial arrangement of the plurality of user interface objects relative to the viewpoint from the first spatial arrangement to the second spatial arrangement includes detecting scrolling of the plurality of user interface objects in the user interface region.

9. The method of claim 1, wherein the plurality of user interface objects correspond to a plurality of representations of messages, and the include text content that corresponds to content of the plurality of the messages.

10. The method of claim 1, wherein:
the plurality of user interface objects includes a first user interface object that includes first text content, and
displaying the first user interface object with the first three-dimensional visual effect having the first visual appearance includes:
displaying one or more portions of the first user interface object that do not occlude the first text content with a first amount of the first three-dimensional visual effect; and
displaying one or more portions of the first user interface object that do occlude the first text content with a second amount, less than the first amount, of the first three-dimensional visual effect.

11. The method of claim 1, wherein:
the plurality of user interface objects includes a first user interface object that includes first text content,
the first user interface object is three-dimensional and includes a front boundary and a rear boundary separated by a thickness of the first user interface object, and
the first text content is positioned between the front boundary and the rear boundary within the first user interface object.

12. The method of claim 1, wherein:
the plurality of user interface objects includes a first user interface object that includes first background content,
the first user interface object is three-dimensional and includes a front boundary and a rear boundary separated by a thickness of the first user interface object, and
the first background content is positioned at the rear boundary of the first user interface object.

13. The method of claim 1, wherein:
the plurality of user interface objects includes a first user interface object that includes first image content,
the first user interface object is three-dimensional and includes a front boundary and a rear boundary separated by a thickness of the first user interface object, and
the first image content is positioned at the rear boundary of the first user interface object.

14. The method of claim 13, wherein:
the front boundary of the first user interface object is connected to the rear boundary of the first user interface object via a side boundary of the first user interface object, and
the first user interface object further includes additional content corresponding to the first image content that is positioned along an inside of the front boundary and/or the side boundary of the first user interface object.

15. The method of claim 1, wherein:
the plurality of user interface objects includes a first user interface object that includes first text content, and
displaying the first user interface object with the first three-dimensional visual effect having the first visual appearance includes:
in accordance with a determination that the first text content has a third visual appearance, displaying the first three-dimensional visual effect with a respective visual characteristic having a first value; and
in accordance with a determination that the first text content has a fourth visual appearance, different from the third visual appearance, displaying the first three-dimensional visual effect with the respective visual characteristic having a second value, different from the first value.

16. The method of claim 1, wherein the plurality of user interface objects are two-dimensional user interface objects.

17. The method of claim 16, wherein the plurality of user interface objects includes a first user interface object, the method further comprising:
while displaying the first user interface object, wherein the first user interface object is two-dimensional, detecting, via the one or more input devices, a first input directed to the first user interface object; and
in response to detecting the first input, updating the first user interface object to be three-dimensional.

18. The method of claim 1, wherein the first three-dimensional visual effect includes a virtual specular highlight effect that is based on a simulated light source associated with the three-dimensional environment.

19. The method of claim 18, wherein one or more characteristics of the simulated light source change over time.

20. The method of claim 19, wherein the one or more characteristics of the simulated light source change based on a location of the sun in a physical environment of a user of the computer system.

21. The method of claim 18, wherein the first three-dimensional visual effect includes a virtual shadow effect that is based on the simulated light source.

22. The method of claim 1, wherein the user interface region includes a virtual object that includes the plurality of user interface objects, and the virtual object that includes the plurality of user interface objects is displayed with the first three-dimensional visual effect having a third visual appearance.

23. A computer system that is in communication with a display generation component and one or more input devices, the computer system comprising:
one or more processors;
memory; and
one or more programs, wherein the one or more programs are stored in the memory and are configured to be executed by the one or more processors, the one or more programs including instructions for:
displaying, via a display generation component, a user interface region from a first viewpoint corresponding to a location and a direction in a three-dimensional environment, wherein:
the user interface region includes a plurality of user interface objects that have a first spatial arrangement relative to the first viewpoint, including a first user interface object that includes one or more edges,
the plurality of user interface objects are displayed with a first three-dimensional visual effect, including a virtual lighting effect, having a first visual appearance, and
displaying the plurality of user interface objects with the first three-dimensional visual effect having the first visual appearance includes displaying the one or more edges of the first user interface object with a first edge visual appearance based on the virtual lighting effect in accordance with the first spatial arrangement;
while displaying the user interface region in the three-dimensional environment, detecting a change in a spatial arrangement of the plurality of user interface objects relative to a viewpoint from the first spatial arrangement to a second spatial arrangement, different from the first spatial arrangement, including detecting a change in a viewpoint from the first viewpoint to a second viewpoint, different from the first viewpoint, wherein detecting the change in the viewpoint includes detecting a change in the location and/or the direction of the viewpoint; and
in response to detecting the change in the spatial arrangement of the plurality of user interface objects relative to the viewpoint from the first spatial arrangement to the second spatial arrangement, displaying, via the display generation component, the user interface region including the plurality of user interface objects, wherein:
the plurality of user interface objects are displayed with the first three-dimensional visual effect having a second visual appearance, different from the first visual appearance, based on the changed spatial arrangement of the plurality of user interface objects relative to the viewpoint, and
displaying the plurality of user interface objects with the first three-dimensional visual effect having the second visual appearance includes displaying the one or more edges of the first user interface object with a second edge visual appearance, different from the first edge visual appearance, based on the virtual lighting effect in accordance with the second spatial arrangement.

24. A non-transitory computer readable storage medium storing one or more programs, the one or more programs comprising instructions, which when executed by one or more processors of a computer system that is in communication with a display generation component and one or more input devices, cause the computer system to perform operations comprising:
displaying, via a display generation component, a user interface region from a first viewpoint corresponding to a location and a direction in a three-dimensional environment, wherein:
the user interface region includes a plurality of user interface objects that have a first spatial arrangement relative to the first viewpoint, including a first user interface object that includes one or more edges,
the plurality of user interface objects are displayed with a first three-dimensional visual effect, including a virtual lighting effect, having a first visual appearance, and
displaying the plurality of user interface objects with the first three-dimensional visual effect having the first visual appearance includes displaying the one or more edges of the first user interface object with a first edge visual appearance based on the virtual lighting effect in accordance with the first spatial arrangement;

while displaying the user interface region in the three-dimensional environment, detecting a change in a spatial arrangement of the plurality of user interface objects relative to a viewpoint from the first spatial arrangement to a second spatial arrangement, different from the first spatial arrangement, including detecting a change in a viewpoint from the first viewpoint to a second viewpoint, different from the first viewpoint, wherein detecting the change in the viewpoint includes detecting a change in the location and/or the direction of the viewpoint; and in response to detecting the change in the spatial arrangement of the plurality of user interface objects relative to the viewpoint from the first spatial arrangement to the second spatial arrangement, displaying, via the display generation component, the user interface region including the plurality of user interface objects, wherein:

the plurality of user interface objects are displayed with the first three-dimensional visual effect having a second visual appearance, different from the first visual appearance, based on the changed spatial arrangement of the plurality of user interface objects relative to the viewpoint, and displaying the plurality of user interface objects with the first three-dimensional visual effect having the second visual appearance includes displaying the one or more edges of the first user interface object with a second edge visual appearance, different from the first edge visual appearance, based on the virtual lighting effect in accordance with the second spatial arrangement.

25. The computer system of claim 23, wherein:
displaying the plurality of user interface objects with the first three-dimensional visual effect having the first visual appearance includes displaying the plurality of user interface objects with the virtual lighting effect having a third visual appearance, and
displaying the plurality of user interface objects with the first three-dimensional visual effect having the second visual appearance includes displaying the plurality of user interface objects with the virtual lighting effect having a fourth visual appearance, different from the third visual appearance.

26. The computer system of claim 25, wherein:
the virtual lighting effect includes a virtual reflection corresponding to an element in the three-dimensional environment,
displaying the plurality of user interface objects with the first three-dimensional visual effect having the first visual appearance includes displaying the plurality of user interface objects with the virtual reflection having a third visual appearance, and
displaying the plurality of user interface objects with the first three-dimensional visual effect having the second visual appearance includes displaying the plurality of user interface objects with the virtual reflection having a fourth visual appearance, different from the third visual appearance.

27. The computer system of claim 25, wherein:
the virtual lighting effect is based on a simulated light source associated with the three-dimensional environment,
displaying the plurality of user interface objects with the first three-dimensional visual effect having the first visual appearance includes displaying the plurality of user interface objects with a simulated lighting effect based on the simulated light source having a third visual appearance, and displaying the plurality of user interface objects with the first three-dimensional visual effect having the second visual appearance includes displaying the plurality of user interface objects with the simulated lighting effect based on the simulated light source having a fourth visual appearance, different from the third visual appearance.

28. The computer system of claim 25, wherein:
the virtual lighting effect is based on a physical light source associated with the three-dimensional environment,
the physical light source exists in a physical environment of a user of the computer system,
displaying the plurality of user interface objects with the first three-dimensional visual effect having the first visual appearance includes displaying the plurality of user interface objects with a simulated lighting effect based on the physical light source having a third visual appearance, and
displaying the plurality of user interface objects with the first three-dimensional visual effect having the second visual appearance includes displaying the plurality of user interface objects with the simulated lighting effect based on the physical light source having a fourth visual appearance, different from the third visual appearance.

29. The computer system of claim 25, wherein:
the plurality of user interface objects includes a first user interface object that includes one or more surfaces,
displaying the first user interface object with the first three-dimensional visual effect having the first visual appearance includes displaying the first user interface object with the one or more surfaces of the first user interface object having a third appearance based on the virtual lighting effect, and
displaying the first user interface object with the first three-dimensional visual effect having the second visual appearance includes displaying the first user interface object with the one or more surfaces of the first user interface object having a fourth appearance based on the virtual lighting effect, the fourth appearance different from the third appearance.

30. The computer system of claim 23, wherein detecting the change in the spatial arrangement of the plurality of user interface objects relative to the viewpoint from the first spatial arrangement to the second spatial arrangement includes detecting movement of the user interface region in the three-dimensional environment.

31. The computer system of claim 23, wherein detecting the change in the spatial arrangement of the plurality of user interface objects relative to the viewpoint from the first spatial arrangement to the second spatial arrangement includes detecting scrolling of the plurality of user interface objects in the user interface region.

32. The computer system of claim 23, wherein the plurality of user interface objects correspond to a plurality of representations of messages, and include text content that corresponds to content of the plurality of the messages.

33. The computer system of claim 23, wherein:
the plurality of user interface objects includes a first user interface object that includes first text content, and
displaying the first user interface object with the first three-dimensional visual effect having the first visual appearance includes:

displaying one or more portions of the first user interface object that do not occlude the first text content with a first amount of the first three-dimensional visual effect; and displaying one or more portions of the first user interface object that do occlude the first text content with a second amount, less than the first amount, of the first three- dimensional visual effect.

34. The computer system of claim 23, wherein:
the plurality of user interface objects includes a first user interface object that includes first text content,
the first user interface object is three-dimensional and includes a front boundary and a rear boundary separated by a thickness of the first user interface object, and
the first text content is positioned between the front boundary and the rear boundary within the first user interface object.

35. The computer system of claim 23, wherein:
the plurality of user interface objects includes a first user interface object that includes first background content,
the first user interface object is three-dimensional and includes a front boundary and a rear boundary separated by a thickness of the first user interface object, and
the first background content is positioned at the rear boundary of the first user interface object.

36. The computer system of claim 23, wherein:
the plurality of user interface objects includes a first user interface object that includes first image content,
the first user interface object is three-dimensional and includes a front boundary and a rear boundary separated by a thickness of the first user interface object, and
the first image content is positioned at the rear boundary of the first user interface object.

37. The computer system of claim 23, wherein:
the plurality of user interface objects includes a first user interface object that includes first text content, and
displaying the first user interface object with the first three-dimensional visual effect having the first visual appearance includes:
in accordance with a determination that the first text content has a third visual appearance, displaying the first three-dimensional visual effect with a respective visual characteristic having a first value; and
in accordance with a determination that the first text content has a fourth visual appearance, different from the third visual appearance, displaying the first three-dimensional visual effect with the respective visual characteristic having a second value, different from the first value.

38. The computer system of claim 23, wherein the plurality of user interface objects are two-dimensional user interface objects.

39. The computer system of claim 38, wherein the plurality of user interface objects includes a first user interface object, the one or more programs further comprising instructions for:
while displaying the first user interface object, wherein the first user interface object is two-dimensional, detecting, via the one or more input devices, a first input directed to the first user interface object; and
in response to detecting the first input, updating the first user interface object to be three- dimensional.

40. The computer system of claim 23, wherein the first three-dimensional visual effect includes a virtual specular highlight effect that is based on a simulated light source associated with the three-dimensional environment.

41. The computer system of claim 40, wherein one or more characteristics of the simulated light source change over time.

42. The non-transitory computer readable storage medium of claim 24, wherein:
displaying the plurality of user interface objects with the first three-dimensional visual effect having the first visual appearance includes displaying the plurality of user interface objects with the virtual lighting effect having a third visual appearance, and
displaying the plurality of user interface objects with the first three-dimensional visual effect having the second visual appearance includes displaying the plurality of user interface objects with the virtual lighting effect having a fourth visual appearance, different from the third visual appearance.

43. The non-transitory computer readable storage medium of claim 42, wherein:
the virtual lighting effect includes a virtual reflection corresponding to an element in the three-dimensional environment,
displaying the plurality of user interface objects with the first three-dimensional visual effect having the first visual appearance includes displaying the plurality of user interface objects with the virtual reflection having a third visual appearance, and
displaying the plurality of user interface objects with the first three-dimensional visual effect having the second visual appearance includes displaying the plurality of user interface objects with the virtual reflection having a fourth visual appearance, different from the third visual appearance.

44. The non-transitory computer readable storage medium of claim 42, wherein:
the virtual lighting effect is based on a simulated light source associated with the three- dimensional environment,
displaying the plurality of user interface objects with the first three-dimensional visual effect having the first visual appearance includes displaying the plurality of user interface objects with a simulated lighting effect based on the simulated light source having a third visual appearance, and
displaying the plurality of user interface objects with the first three-dimensional visual effect having the second visual appearance includes displaying the plurality of user interface objects with the simulated lighting effect based on the simulated light source having a fourth visual appearance, different from the third visual appearance.

45. The non-transitory computer readable storage medium of claim 42, wherein:
the virtual lighting effect is based on a physical light source associated with the three- dimensional environment,
the physical light source exists in a physical environment of a user of the computer system,
displaying the plurality of user interface objects with the first three-dimensional visual effect having the first visual appearance includes displaying the plurality of user interface objects with a simulated lighting effect based on the physical light source having a third visual appearance, and
displaying the plurality of user interface objects with the first three-dimensional visual effect having the second visual appearance includes displaying the plurality of user interface objects with the simulated lighting effect based on the physical light source having a fourth visual appearance, different from the third visual appearance.

46. The non-transitory computer readable storage medium of claim 42, wherein:
the plurality of user interface objects includes a first user interface object that includes one or more surfaces,
displaying the first user interface object with the first three-dimensional visual effect having the first visual appearance includes displaying the first user interface object with the one or more surfaces of the first user interface object having a third appearance based on the virtual lighting effect, and
displaying the first user interface object with the first three-dimensional visual effect having the second visual appearance includes displaying the first user interface object with the one or more surfaces of the first user interface object having a fourth appearance based on the virtual lighting effect, the fourth appearance different from the third appearance.

47. The non-transitory computer readable storage medium of claim 24, wherein detecting the change in the spatial arrangement of the plurality of user interface objects relative to the viewpoint from the first spatial arrangement to the second spatial arrangement includes detecting movement of the user interface region in the three-dimensional environment.

48. The non-transitory computer readable storage medium of claim 24, wherein detecting the change in the spatial arrangement of the plurality of user interface objects relative to the viewpoint from the first spatial arrangement to the second spatial arrangement includes detecting scrolling of the plurality of user interface objects in the user interface region.

49. The non-transitory computer readable storage medium of claim 24, wherein the plurality of user interface objects correspond to a plurality of representations of messages, and include text content that corresponds to content of the plurality of the messages.

50. The non-transitory computer readable storage medium of claim 24, wherein:
the plurality of user interface objects includes a first user interface object that includes first text content, and
displaying the first user interface object with the first three-dimensional visual effect having the first visual appearance includes:
displaying one or more portions of the first user interface object that do not occlude the first text content with a first amount of the first three-dimensional visual effect; and
displaying one or more portions of the first user interface object that do occlude the first text content with a second amount, less than the first amount, of the first three- dimensional visual effect.

51. The non-transitory computer readable storage medium of claim 24, wherein:
the plurality of user interface objects includes a first user interface object that includes first text content,
the first user interface object is three-dimensional and includes a front boundary and a rear boundary separated by a thickness of the first user interface object, and
the first text content is positioned between the front boundary and the rear boundary within the first user interface object.

52. The non-transitory computer readable storage medium of claim 24, wherein:
the plurality of user interface objects includes a first user interface object that includes first background content,
the first user interface object is three-dimensional and includes a front boundary and a rear boundary separated by a thickness of the first user interface object, and
the first background content is positioned at the rear boundary of the first user interface object.

53. The non-transitory computer readable storage medium of claim 24, wherein:
the plurality of user interface objects includes a first user interface object that includes first image content,
the first user interface object is three-dimensional and includes a front boundary and a rear boundary separated by a thickness of the first user interface object, and
the first image content is positioned at the rear boundary of the first user interface object.

54. The non-transitory computer readable storage medium of claim 24, wherein:
the plurality of user interface objects includes a first user interface object that includes first text content, and
displaying the first user interface object with the first three-dimensional visual effect having the first visual appearance includes:
in accordance with a determination that the first text content has a third visual appearance, displaying the first three-dimensional visual effect with a respective visual characteristic having a first value; and
in accordance with a determination that the first text content has a fourth visual appearance, different from the third visual appearance, displaying the first three-dimensional visual effect with the respective visual characteristic having a second value, different from the first value.

55. The non-transitory computer readable storage medium of claim 24, wherein the plurality of user interface objects are two-dimensional user interface objects.

56. The non-transitory computer readable storage medium of claim 55, wherein the plurality of user interface objects includes a first user interface object, the operations further comprising:
while displaying the first user interface object, wherein the first user interface object is two-dimensional, detecting, via the one or more input devices, a first input directed to the first user interface object; and
in response to detecting the first input, updating the first user interface object to be three- dimensional.

57. The non-transitory computer readable storage medium of claim 24, wherein the first three-dimensional visual effect includes a virtual specular highlight effect that is based on a simulated light source associated with the three-dimensional environment.

58. The non-transitory computer readable storage medium of claim 57, wherein one or more characteristics of the simulated light source change over time.

* * * * *